(12) United States Patent
He

(10) Patent No.: US 12,075,947 B2
(45) Date of Patent: *Sep. 3, 2024

(54) AUTOMATIC COOKING SYSTEMS

(71) Applicant: Zhengxu He, Reno, NV (US)

(72) Inventor: Zhengxu He, Reno, NV (US)

( * ) Notice: Subject to any disclaimer, the term of this patent is extended or adjusted under 35 U.S.C. 154(b) by 975 days.

This patent is subject to a terminal disclaimer.

(21) Appl. No.: 17/069,707

(22) Filed: Oct. 13, 2020

(65) Prior Publication Data

US 2021/0052114 A1  Feb. 25, 2021

Related U.S. Application Data

(63) Continuation-in-part of application No. 16/155,895, filed on Oct. 10, 2018, now Pat. No. 10,869,575.
(Continued)

(51) Int. Cl.
*A47J 44/02* (2006.01)
*B25J 11/00* (2006.01)

(52) U.S. Cl.
CPC .......... *A47J 44/02* (2013.01); *B25J 11/0045* (2013.01)

(58) Field of Classification Search
CPC ...... A47J 27/004; A47J 36/165; A47J 43/046; A47J 27/002; A47J 43/044; A47J 43/082; A47J 27/00; A47J 43/0727; A47J 2043/04454; A47J 27/14; A47J 36/06; A47J 36/2483; A47J 36/26; A47J 36/32; A47J 36/34; A47J 37/047; A47J 43/042; A47J 43/06; A47J 43/0716; A47J 43/087; A47J 44/00; A47J 2043/04463; A47J 31/60; A47J 36/321; A47J 37/105; A47J 43/04; A47J 43/0766; A47J 43/0772; A47J 43/0777; A47J 43/08; A47J 43/085; H05B 2206/02; H05B 6/062; H05B 6/12; H05B 6/1227; A47L 15/4282; A47L 2601/16; F16H 1/16; F16H 1/14; F16H 1/2854; F16H 37/065;
(Continued)

(56) References Cited

U.S. PATENT DOCUMENTS 10,799,064 B2 * 10/2020 He .................. A47J 37/108
10,869,575 B2 * 12/2020 He .................. A47J 43/04
(Continued)

OTHER PUBLICATIONS

Cheng, CN 104873121 A (Year: 2015).*

*Primary Examiner* — Vy T Nguyen

(57) ABSTRACT

The present application discloses an automated cooking system including: a cooking apparatus comprising a cooking container and a stirring motion mechanism configured to produce a motion in the cooking container as to stir, mix or distribute the food or food ingredients held in the cooking container; ingredient containers to store food ingredients; an dispensing apparatus to dispense the food ingredients from an ingredient container into the cooking container; food containers to hold a cooked food; an unloading motion mechanism to turn the cooking container to dispense cooked food from the cooking container to a food container; a transfer apparatus configured to grip and move a food container; a food container transport system; a liquid dispensing apparatus to dispense liquid ingredients into the cooking container; and a cleaning apparatus; and a computer system with algorithms to control these mechanisms and apparatuses.

18 Claims, 32 Drawing Sheets

Related U.S. Application Data which is a continuation-in-part of application No. 15/924,749, filed on Mar. 19, 2018, now Pat. No. 11,641,980.

(58) Field of Classification Search
CPC . F16H 3/70; F16H 57/02; F16H 61/32; F16H 2001/325; F16H 3/724
USPC ........ 99/325 OR, 326 OR, 337 OR, 338 OR, 99/342 OR, 352 OR, 450.4 OR, 450.5 OR, 99/348 OR, 357 OR, 443 ROR, 486; 426/438 OR, 233 OR, 523 OR, 519; 219/438 OR, 429
See application file for complete search history.

(56) References Cited

U.S. PATENT DOCUMENTS

| | | | | |
|---|---|---|---|---|
| 11,641,980 B2* | 5/2023 | He | ................. | A47J 36/06 99/348 |
| 2008/0289510 A1* | 11/2008 | Liu | ................. | A47J 37/108 99/348 |
| 2014/0230660 A1* | 8/2014 | He | ................. | A47J 27/14 99/325 |
| 2014/0331869 A1* | 11/2014 | He | ................. | A47J 37/108 99/326 |

\* cited by examiner

AUTOMATIC COOKING SYSTEMS

This application is a continuation-in-part of the U.S. patent application Ser. No. 16/155,895 filed Oct. 10, 2018, which is a continuation-in-part of the U.S. patent application Ser. No. 15/924,749 filed Mar. 19, 2018.

CROSS-REFERENCE TO RELATED APPLICATIONS

U.S. Provisional Patent Application
Ser. No. 62/810,280, filed Feb. 25, 2019, Inventor: Zhengxu He.
U.S. patent applications
Ser. No. 15/706,136, filed Sep. 15, 2017, Inventor: Zhengxu He
Ser. No. 15/801,923, filed Nov. 2, 2017, Inventor: Zhengxu He
Ser. No. 15/798,357, filed Oct. 30, 2017, Inventor: Zhengxu He
Ser. No. 16/155,895, filed Oct. 10, 2018, Inventor: Zhengxu He
Ser. No. 16/510,982, filed Jul. 15, 2019, Inventor: Zhengxu He
Ser. No. 16/517,705, filed Jul. 22, 2019, Inventor: Zhengxu He
Ser. No. 16/997,196, filed Aug. 19, 2020, Inventor: Zhengxu He
Ser. No. 16/997,933, filed Aug. 20, 2020, Inventor: Zhengxu He US Patent U.S. Pat. No. 10,455,987, issued Oct. 29, 2019, Inventor: Zhengxu He.

BACKGROUND OF THE INVENTION

The present application relates to an automated cooking system configured to cook a food from food ingredients.

A cooking system may comprise a cooking apparatus comprising: a cooking container configured to hold food or food ingredients for cooking; a stirring motion mechanism configured to produce a movement in the cooking container as to stir, mix or distribute the food or food ingredients held in the cooking container; an unloading motion mechanism configured to produce a movement in the cooking container as to dispense the cooked food held in the cooking container. The cooking system may also comprise: a liquid dispensing apparatus; a cookware cleaning apparatus; a transfer apparatus configured to transfer a food container which may receive a cooked food from a cooking container; and an ingredient dispensing apparatus configured to dispense the food ingredients from an ingredient container which is located at a certain position into the cooking container.

A cooking system may also include a transport system which transports a food container configured to hold a cooked food to an area which is conveniently accessible by a human. The cooking system may cook specific dishes at specific times, in accordance with an order input of a computer system

BRIEF SUMMARY OF THE INVENTION

The present application discloses an automated cooking system configured to produce cooked foods from food ingredients. Implementations of our system may include one or more of the following.

Our automated cooking system may comprise a cooking apparatus comprising a cooking container configured to hold food or food ingredients during a cooking process. The cooking apparatus may comprise a stirring motion mechanism comprising a support component wherein the stirring motion mechanism is configured to produce a motion in the cooking container relative to the support component, as to stir, mix or distribute the food or food ingredients in the cooking container. The motion of the cooking container produced by the stirring motion mechanism may be cyclic, oscillatory, or vibratory motions, or a combination of these motions.

The cooking apparatus of the automated cooking system may also comprise an unloading motion mechanism configured to turn the cooking container as to dispense a cooked food from the cooking container to a food container which is positioned near to the cooking container. The automated cooking system may also comprise a transfer apparatus configured to hold a food container as to allow said unloading motion mechanism to dispense a cooked food from the cooking container into a food container.

Implementations of our cooking system may include one or more of the following. The stirring motion mechanism may comprise a support component and a motion mechanism configured to produce a motion in the cooking container relative to the support component, as to stir or mix the food or food ingredients in the cooking container. The stirring motion mechanism may comprise: a first shaft; a second shaft; a third shaft; a fourth shaft; and a fifth shaft; wherein the axes of the shafts may be configured to be parallel to each other. The unloading motion mechanism is configured to produce an axial rotation in the support component of said stirring motion mechanism as to dispense a cooked food from the cooking container; wherein the axis of the axial rotation is configured to be horizontal.

The automated cooking system may also comprise a cleaning apparatus configured to wash or otherwise clean the cooking container after a cooked food is produced.

The automated cooking system may also comprise a plurality of ingredient containers each configured to store food ingredients, and an ingredient dispensing apparatus configured to grab and move an ingredient container to dispense the food ingredients from the ingredient container into the cooking container. The automated cooking system may also comprise an ingredient container transfer apparatus configured to transport or move an ingredient container; wherein the food ingredients contained in the ingredient container, if any, may not be leaked out from the ingredient container during time periods when the ingredient container is moved by the ingredient container transfer apparatus.

Implementations of our cooking system may include one or more of the following. An ingredient dispensing apparatus may comprise: (1) a gripping mechanism comprising a support component, a pair of gripping devices (also referred to as grippers), and a motion mechanism configured to produce a rotation in the gripping devices relative to the support component as to grip or release an ingredient container; (2) a motion mechanism configured to produce a rotation in the support component of gripping mechanism, wherein the axis of rotation is horizontal.

The automated cooking system may comprise a transport system comprising a plurality of vehicles which may transport one or more food containers to an area accessible by humans.

An automated cooking system may comprise a computer system configured to control these mechanisms and apparatuses.

DETAILED DESCRIPTION OF THE INVENTION

For the present patent application, a food ingredient refers to any of the foods or substances that are combined to make a particular food. A food ingredient can be raw or pre-cooked. A food ingredient can be solid, powder, liquid, or a mixture, etc. Examples of food ingredient can be raw meat, sausage, fresh vegetable, dry vegetable, cooking oil, vinegar, soy source, water, or salt, etc.

For the present patent application, a computer system is meant to be any system or apparatus that includes one or more computers. A computer system may or may not include a database. A computer system may or may not include a network. A computer system may or may not include a memory shared by more than one computers. A computer system may include software. A single computer with software can be considered as a computer system.

For the present patent application, a shaft always comprises an axis. A shaft can have different shapes at different sections. The shape of a cross section of a shaft can be round or rectangular, or of other shape. For the present patent application, a rotational movement refers to a rotational movement around an axis. A rotational mechanism refers to any mechanism comprising two mating parts which are constrained to rotate relative to each other. An example of rotational mechanism comprises a shaft and a bearing housing as mating parts, wherein the shaft and bearing housing are connected by bearings and accessories.

For the present patent application, a motor comprises a base component (e.g., a frame) which is a stationary member of the motor, and a shaft which is a moving member of the motor, wherein a (usually rotational) motion of the shaft relative to the base component can be produced. A motor may be connected to a computer via wires, and/or through a driver, and/or a controller and/or a relay and/or a wireless communication device. The base component of a motor may be referred to as the support component of the motor.

Our cooking system comprises a computer and several apparatuses and mechanisms, including a cooking apparatus, a transfer apparatus, a dispensing apparatus, a cleaning apparatus, a transport system, etc.

Various parts of our cooking systems are described below.

Figure 1:
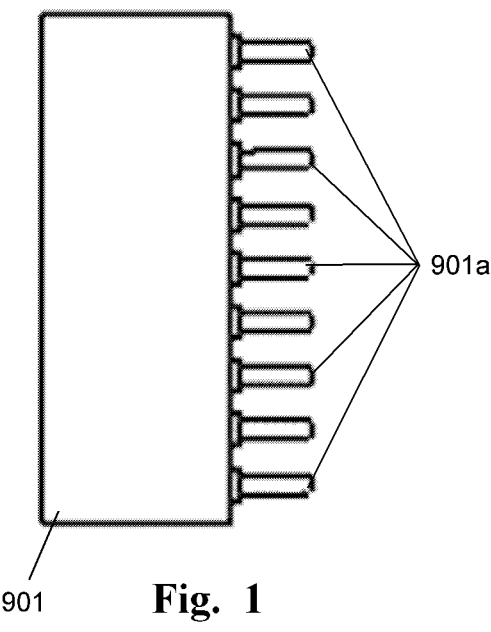
FIG. 1 shows an aerial view of a computer system.

Referring to FIG. 1, a computer system 901 comprises a computer with a plurality of i/o ports 901a. The i/o ports 901a can be connected to a plurality of electric or electronic devices including but not limited to: motors (including motors with controllers); actuators; inductive stoves, sensors, etc., so that the computer may communicate with said devices in the known technique. The connection of the computer to said electric or electronic parts may comprise wires, wireless communication devices, controllers, drivers, and/or circuit boards. The computer system 901 comprises a memory. The computer system 901 may store data in the computer system's memory. The computer system 901 may control motors, actuators; stoves or heaters; and other devices in the known technique.

It should be noted that the computer system 901 may further comprise additional computers, a computer network, a database, computer programs, wireless communication ports, and/or other electric and electronic components.

A connection of said computer system 901 to an electric or electronic device may comprise a (wired or wireless) connection of a computer of said computer system to said device. Thus, a device is connected to said computer system 901 if said device is connected to a computer of said computer system.

Figure 2B:
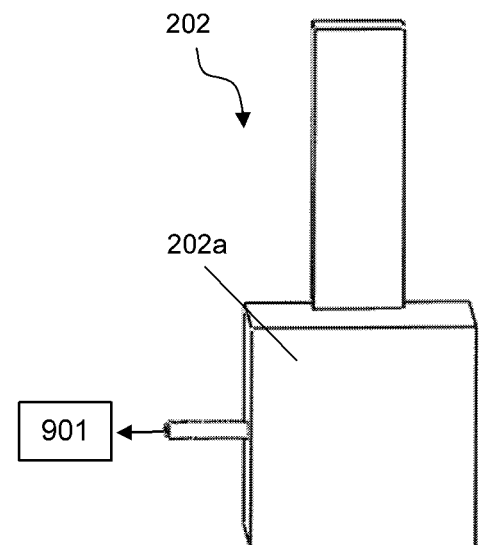
FIG. 2B shows an aerial view of a linear motion mechanism.
Figure 2A:
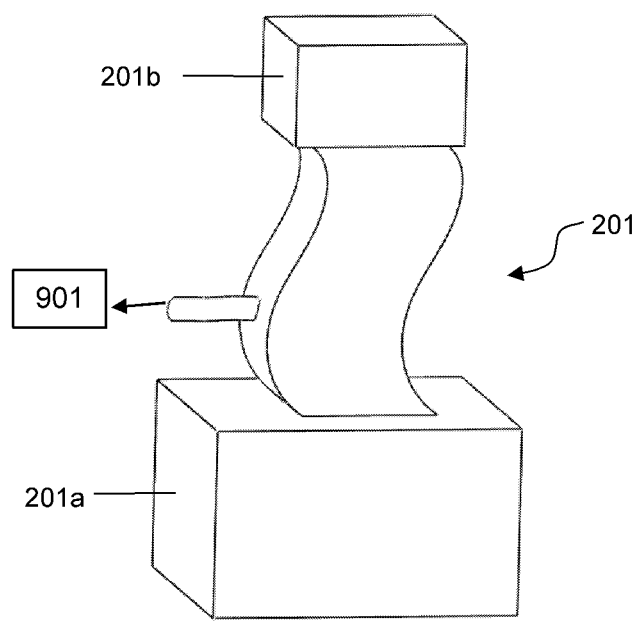
FIG. 2A shows an aerial view of a motion mechanism.

Referring to FIG. 2A, a motion mechanism 201 comprises a stationary member 201a and a moving member 201b, which is connected (but not rigidly connected) to the stationary member. In many applications the movement of the moving member 201b is constrained relative to the stationary member 201a. The motion mechanism 201 comprises a driving mechanism (not shown in figure) configured to produce a motion of the moving member 201b relative to the stationary member 201a. The motion mechanism 201 may be connected to the computer system 901 via wires or by wireless means and the computer system 901 may be configured to control the timing and speed of the motion mechanism 201.

The motion mechanism 201 is a generic motion mechanism. Implicitly, the motion mechanism 201 includes a connection configured to connect the moving member to the stationary member, wherein said connection may often comprise bearings, sliders, kinematic pairs, and/or transmission mechanisms. The driving mechanism may be connected to the computer system 901 (via wires or by wireless means). The driving mechanism may be powered by electricity or other energy sources. A typical example of driving mechanism is a motor.

Referring to FIG. 2B, a linear motion mechanism 202 comprises a stationary member 202a and a moving member 202b, wherein the moving member 202b is constrained to move linearly relative to the stationary member 202a. The linear motion mechanism 202 comprises a driving mechanism (not shown in figure) configured to produce a linear motion of the moving member 202b relative to the stationary member 202a. The linear motion mechanism 202 may be connected to the computer system 901 via wires or by wireless means, and the computer system 901 may be configured to control the timing and speed of the linear motion mechanism 202.

The linear motion mechanism 202 is a generic one. Example of linear motion mechanism includes but are not limited to: a linear actuator; a mechanism comprising linear rail, a slider configured to slide linearly on the linear rail, and a driving mechanism configured to drive the linear motion of the slider; etc.

It should be noted that the linear motion mechanism 202 may comprise an electric (or pneumatic, hydraulic) putter, or other types of putter. The linear motion mechanism 202 may include a motor which produces a rotational motion and a transmission mechanism configured to convert a rotation into a linear motion; wherein the transmission mechanism may optionally comprise a pair of gear and rack, a pair of screw rod and nut, or a pair of sprocket and chain, etc.

A linear motion mechanism (such as the mechanism 202) is called a vertical motion mechanism if the direction of the linear motion is vertical. A linear motion mechanism (such as the mechanism 202) is called a horizontal motion mechanism if the direction of the linear motion is horizontal.

Figure 2C:
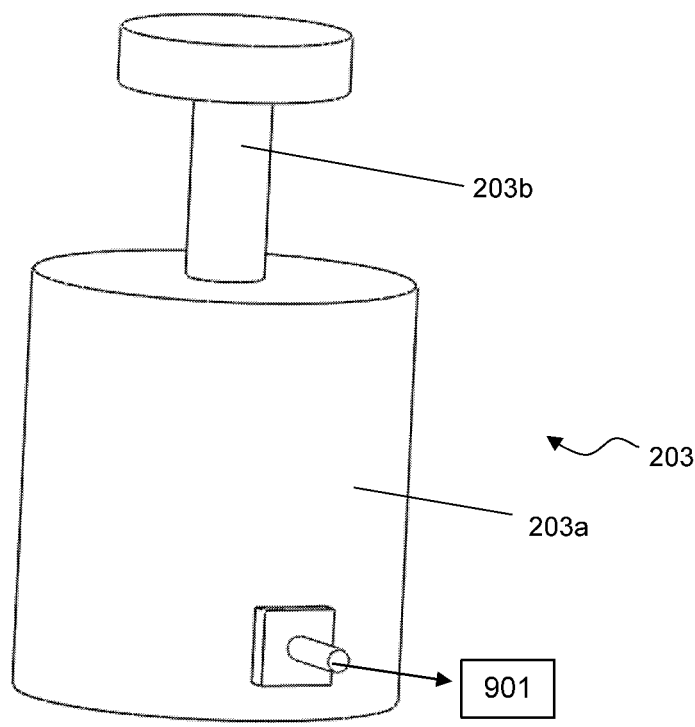
FIG. 2C shows an aerial view of a rotational motion mechanism.

Referring to FIG. 2C, a rotational motion mechanism 203 comprises a stationary member 203a and a moving member 203b which is constrained to rotate relative to the stationary member 203a. The rotational motion mechanism 203 comprises a driving mechanism (not shown in figure) configured to produce a rotation of the moving member 203b relative to the stationary member 203a around an axis, wherein the axis of the rotation is referred to as the axis of the rotational motion mechanism. The rotational motion mechanism 203 may be connected to the computer system 901 via wires or by wireless means, and the computer system 901 may be configured to control the timing and speed of the rotational motion mechanism 203.

Figure 2D:
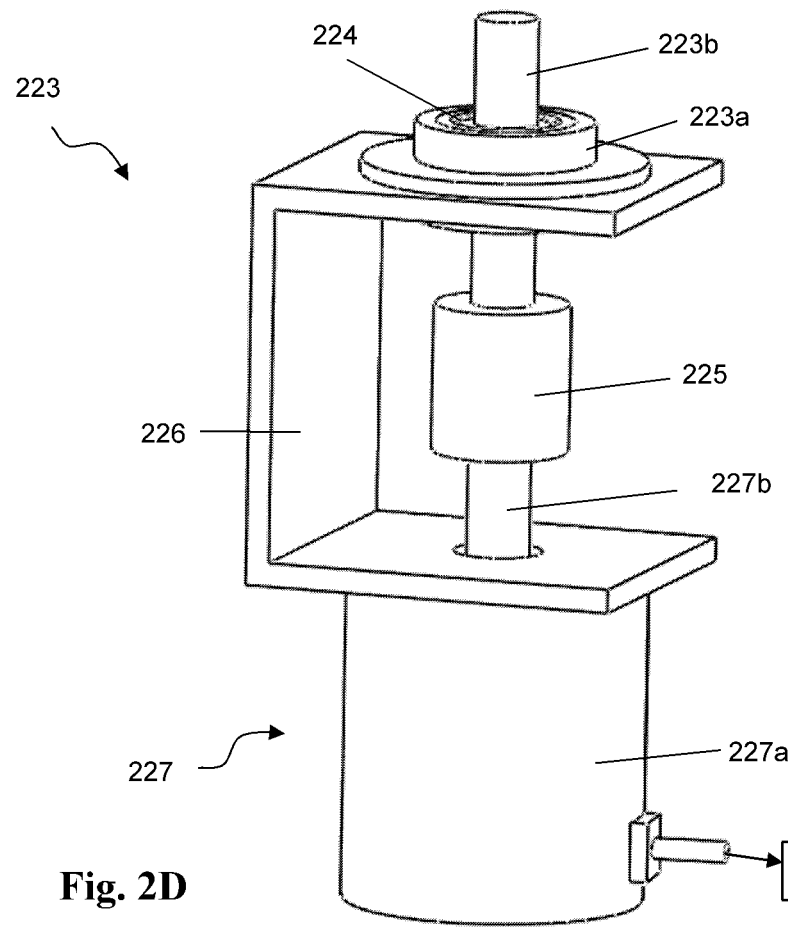
FIG. 2D shows an aerial view of a rotational motion mechanism.

Referring to FIG. 2D, a rotational motion mechanism 223 comprises: a bearing housing 223a as a stationary member; a shaft 223b as a moving member; and a motor 227 as a driving member, i.e., a driving mechanism. The bearing housing 223a and the shaft 223b are connected by bearings 224 and accessories so that the shaft 223b is constrained to rotate relative to the bearing housing 223a. The motor 227 comprises a base component 227a and a shaft 227b so that the motor may produce a rotation of the shaft 227b relative to the base component 227a. The base component 227a of the motor is rigidly or fixedly connected to the bearing housing 223a via a connector 226, and the shaft 227b of the motor is connected to the shaft 223b by a coupling 225. It should be clear that the motor 227 may produce a rotation of the shaft 223b relative to the bearing housing 223a. The motor 227 is a driving mechanism of the rotational mechanism 223.

It should be noted that the rotation produced by a rotational motion mechanism may be a continuous rotation, an intermittent motion, or a back-and-forth rotation between two end-positions.

Figure 2E:
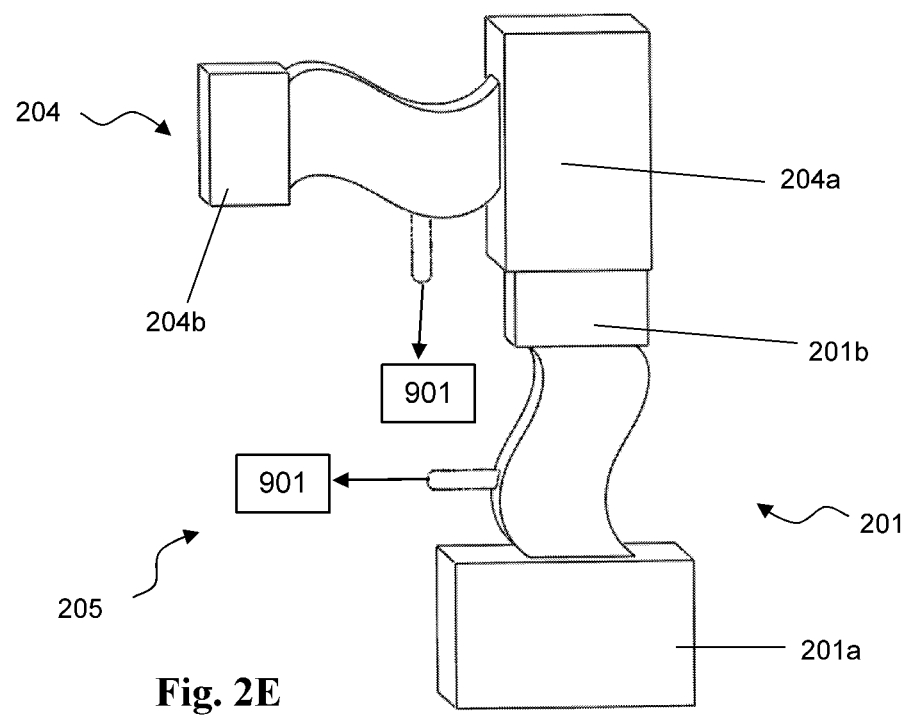
FIG. 2E shows an aerial view of a combination motion mechanism

Referring to FIG. 2E, a motion mechanism 205 is a combination of two motion mechanisms 201 and 204, which may also be referred to as motion sub-mechanisms; wherein the motion mechanism 201 is as described as in FIG. 2A; wherein the motion mechanism 204 is a motion mechanism comprising a stationary member 204a, and a moving member 204b which is connected to the stationary member 204a, and a driving mechanism (not shown in figure) configured to produce a motion of the moving member 204b relative to the stationary member 204a. The moving member 201b of the motion mechanism 201 is fixedly or rigidly connected to the stationary member 204a of the motion mechanism 204, so the motion mechanism 201 can produce a motion of the stationary member 204a relative to the stationary member 201a of the motion mechanism 201. The combination motion mechanism 205 may be connected to the computer system 901 in the sense that the motion sub-mechanisms 201 and 204 are connected to the computer system 901 via wires or by wireless means, and the computer system 901 may be configured to control the motions produced by the motion sub-mechanisms of the combination motion mechanism 205.

The motion mechanism 205 is referred to as a combination motion mechanism. It should be noted that the motion sub-mechanisms 201 and 204 may produce motions simultaneously. This applies to any combination motion mechanism in the following. Combination motion mechanisms are special cases of motion mechanisms.

Figure 2F:
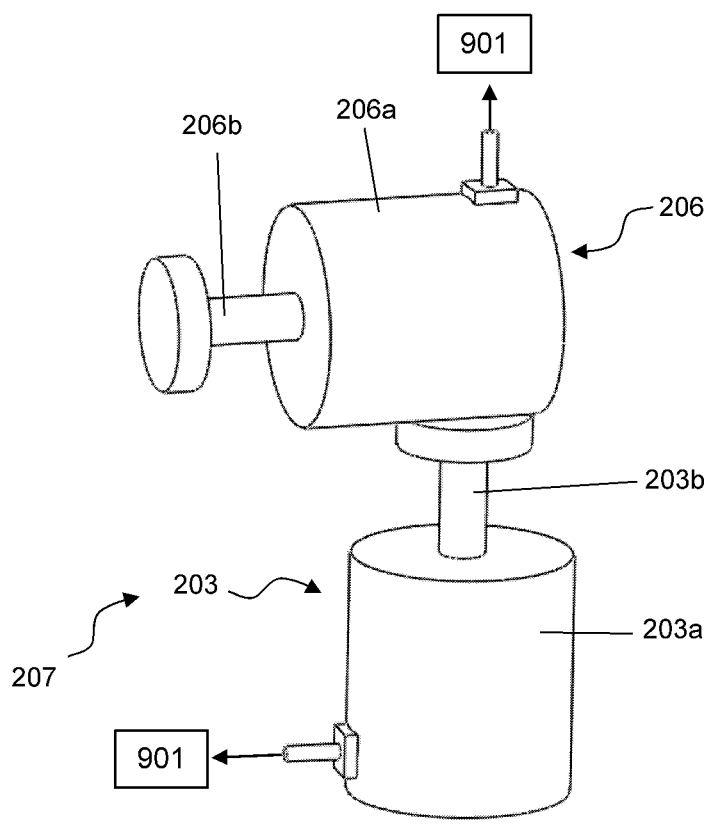
FIG. 2F shows an aerial view of a combination motion mechanism.

Referring to FIG. 2F, a combination motion mechanism 207 comprises rotational motion mechanisms 203 and 206, referred to as motion sub-mechanisms; wherein the motion mechanism 203 is described in FIG. 2C; wherein the motion mechanism 206 is a rotational motion mechanism comprising a stationary member 206a, and a moving member 206b which is constrained to rotate relative to the stationary member 206a, and a driving mechanism (not shown in figure) configured to produce a rotational motion of the moving member 206b relative to the stationary member 206a. The moving member 203b of the motion mechanism 203 is fixedly or rigidly connected to the stationary member 206a of the rotational motion mechanism 206, so the rotational motion mechanism 203 can produce a rotation of the stationary member 206a relative to the stationary member 203a around the axis of the rotational motion mechanism 203. The combination motion mechanisms 207 may be connected to the computer system 901 in the sense that the motion sub-mechanisms 203 and 206 are connected to the computer system 901 via wires or by wireless means, and the computer system 901 may be configured to control the motions produced by the motion sub-mechanisms of the combination motion mechanism 207.

Figure 2G:
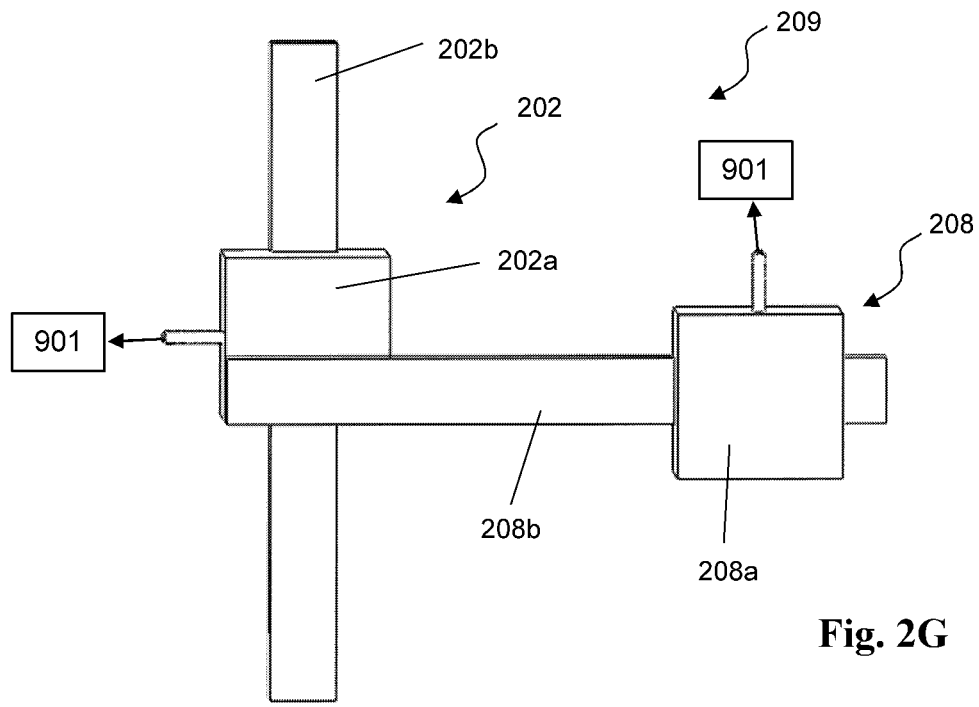
FIG. 2G shows an aerial view of a combination motion mechanism.

Referring to FIG. 2G, a combination motion mechanism 209 comprises two linear motion mechanisms 202 and 208, which may also be referred to as motion sub-mechanisms; wherein the motion mechanism 202 is described in FIG. 2B; wherein the motion mechanism 208 is a linear motion mechanism comprising a stationary member 208a, and a moving member 208b which is constrained to move linearly relative to the stationary member 208a, and a driving mechanism (not shown in figure) configured to produce a linear motion of the moving member 208b relative to the stationary member 208a. The moving member 208b of the linear motion mechanism 208 is rigidly or fixedly connected to the stationary member 202a of the linear motion mechanism 202, so the linear motion mechanism 208 can produce a linear motion of the stationary member 202a relative to the stationary member 208a. The combination motion mechanism 209 may be connected to the computer system 901 in the sense that the motion sub-mechanisms 202 and 208 are connected to the computer system 901 via wires or by wireless means, and the computer system 901 may be configured to control the motions produced by the motion sub-mechanisms of the combination motion mechanism 209.

Figure 2H:
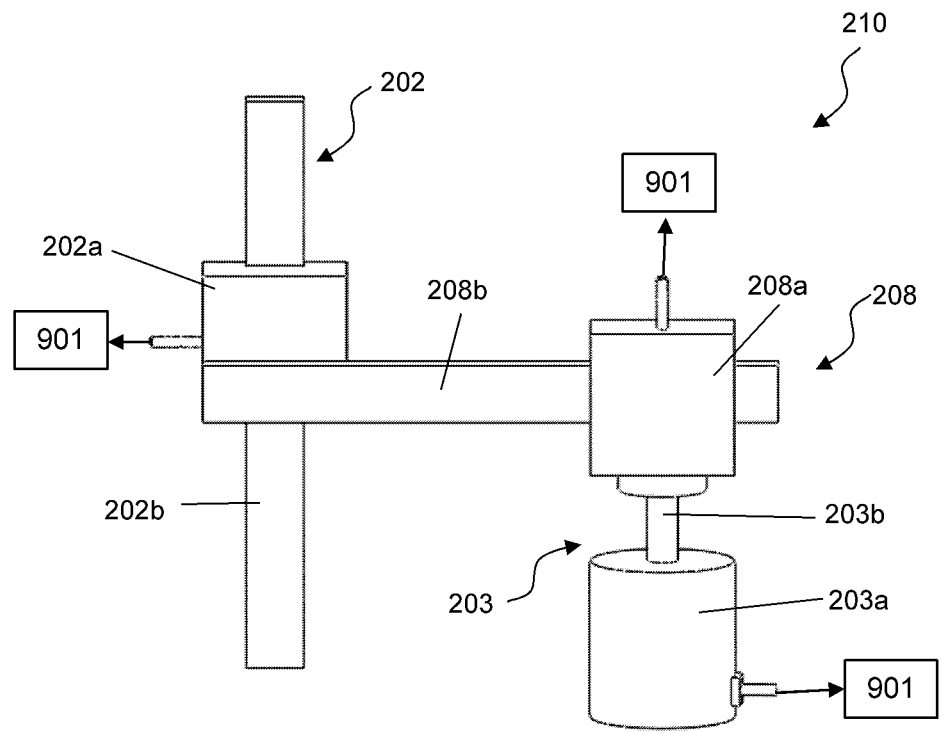
FIG. 2H shows an aerial view of a combination motion mechanism.

Referring to FIG. 2H, a combination motion mechanism 210 comprises a rotational motion mechanism 203 and two linear motion mechanisms 202 and 208; wherein motion mechanisms 203, 202 and 208 are referred to as motion sub-mechanisms. The moving member 208b of the linear motion mechanism 208 is rigidly or fixedly connected to the stationary member 202a of the linear motion mechanism 202, so the linear motion mechanism 208 can produce a linear motion of the stationary member 202a relative to the stationary member 208a of the linear motion mechanism 208. The moving member 203b is fixedly connected to the stationary member 208a of the linear motion mechanism 208, so the rotational motion mechanism 203 can produce a rotation of the stationary member 208a relative to the stationary member 203a. The combination motion mechanisms 210 may be connected to the computer system 901 in the sense that the motion sub-mechanisms 202, 203 and 208 are connected to the computer system 901 via wires or by wireless means, and the computer system 901 may be configured to control the motions produced by the motion sub-mechanisms of the combination motion mechanism 210.

Figure 2I:
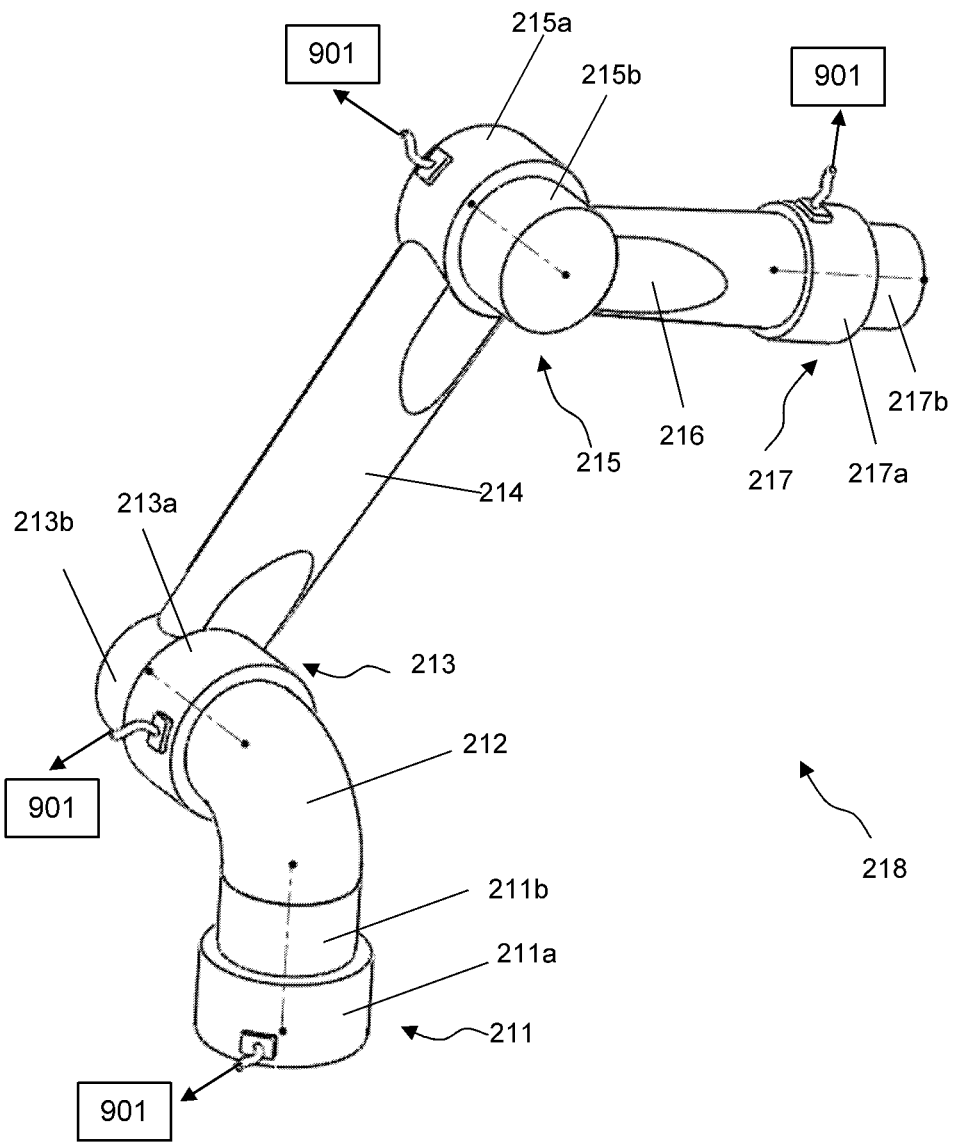
FIG. 2I shows an aerial view of a robot arm.

Referring to FIG. 2I, a robot arm 218 comprises a plurality of rotational motion mechanisms 211, 213, 215 and 217; wherein the motion mechanisms 211, 213, 215 and 217 are referred to as motion sub-mechanisms. The rotational motion mechanism 211, 213, 215 or 217 comprises: a stationary member 211a, 213a, 215, or respectively 217a; a moving member 211b, 213b, 215b, or respectively 217b which is constrained to rotate relative to the respective stationary member; and a driving member comprising a motor (not shown in figure) configured to drive a rotation of the respective moving member relative to the respective stationary member around an axis. The moving member 211b of the rotational motion mechanism 211 is rigidly connected to the stationary member 213a of the rotational motion mechanism 213 via a connector 212; wherein the axis of the rotational motion mechanism 211 may optionally be perpendicular to the axis of the rotational motion mechanism 213. Thus, the motion mechanism 211 can produce a rotation of the stationary member 213a relative to the stationary member 211a. The moving member 213b of the rotational motion mechanism 213 is rigidly connected to the stationary member 215a of the rotational motion mechanism 215 via a rigid connector 214; wherein the axis of the rotational motion mechanism 213 may optionally be parallel to the axis of the rotational motion mechanism 215. The rotational motion mechanism 213 can produce a rotation of the stationary member 215a relative to the stationary member 213a. The moving member 215b of the rotational motion mechanism 215 is rigidly connected to the stationary member 217a of the rotational motion mechanism 217 via a connector 216; wherein the axis of the rotational motion mechanism 215 may optionally be perpendicular to the axis of the rotational motion mechanism 217, and the rotational motion mechanism 215 can produce a rotation of the stationary member 217a relative to the stationary member 215a. The robot arm 218 may be connected to the computer system 901 in the sense that the motion sub-mechanisms 211, 213, 215 and 217 are connected to the computer system 901 via wires or by wireless means, and the computer system 901 may be configured to control the motions produced by the motion sub-mechanisms of the robot arm 218.

The robot arm 218 is a combination motion mechanism which is a combination of the motion sub-mechanisms 211, 213, 215 and 217. Any robot arm of prior art may be used as a motion mechanism for our applications. Any motion mechanism of prior art may be used for our applications.

It should be possible to construct a combination motion mechanism from a rather arbitrary sequence of motion mechanisms, referred to as motion sub-mechanisms.

Figure 3A:
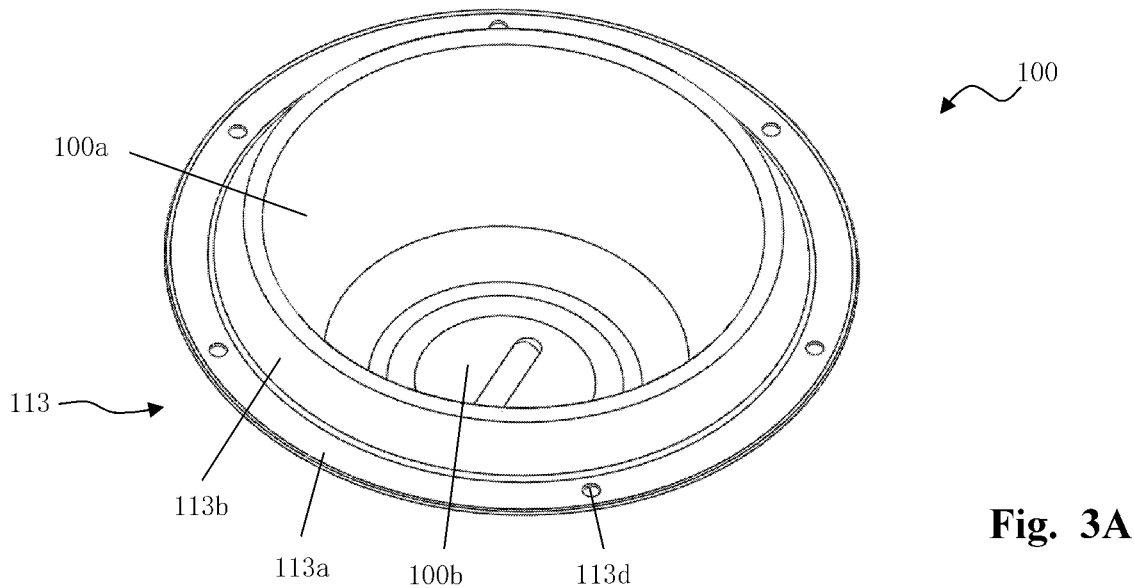
FIG. 3A shows an aerial view of a cooking container.
Figure 3B:
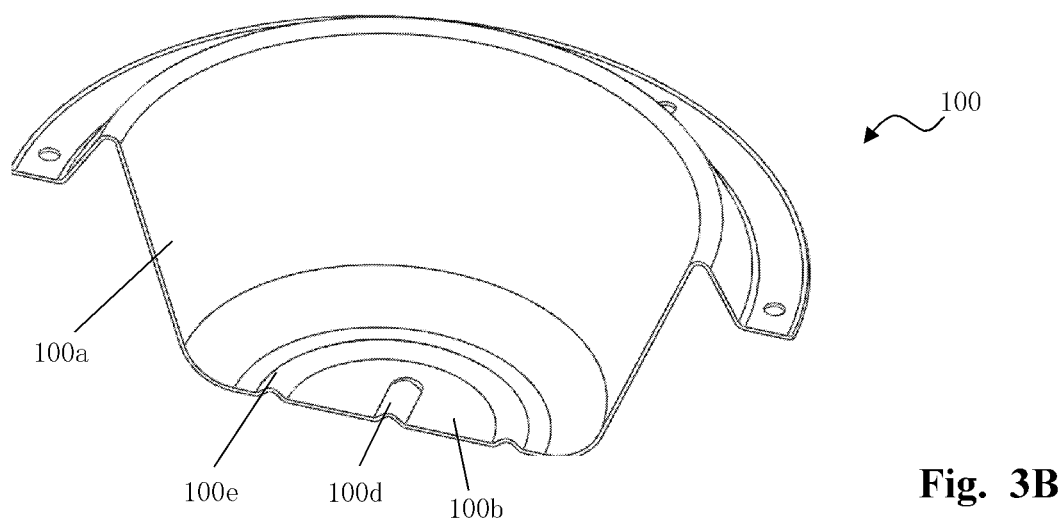
FIG. 3B shows a cut view of the cooking container.

Referring to FIGS. 3A-3B, a cooking container 100, positioned in an upright position, is configured to hold food or food ingredients for cooking. The cooking container 100 may have the shape of a wok. The cooking container 100 comprises a bottom 100b and a cone shaped wall 100a which is roughly rotationally symmetric around an axis, referred to as the axis of the cooking container 100. The axis of the cooking container 100 may be configured to be vertical or nearly vertical when the cooking container 100 is positioned in the upright position. The cooking container 100 further comprises a deformed metal sheet 113, which includes a flat part 113a and a curved part 113b. The flat part 113a has some round holes 113d. The flat part 113a and the curved part 113b may be both ring-shaped, although this is not a requirement. The deformed metal sheet 113 may be referred as the connecting component of the cooking container 100.

The cooking container 100 may further comprise: a barrier 100d comprising a linear ridge; and a barrier 100e comprising a circular or oval shaped ridge. The barriers 100d and 100e may obstruct the movements of the food or food ingredients in the cooking container when the cooking container 100 is fast moved. The bottom 100b and wall 100a are all coated with Teflon or other non-stick finish.

It should also be noted that it is not a strict requirement that the cooking container 100 to be rotationally symmetric around an axis. A cooking container may have other shape.

It should be noted that, without counting the holes, the ring-shaped objects 113a and 113b are perfectly round, but they may be substituted with other ring-shaped objects with holes surrounding the cooking container 100, where the "ring-shapes" are ring-shapes in topological sense. In the present patent application, "ring-shape" is meant ring-shape in topological sense.

It should be noted that the connecting component 113, the bottom 100b and the wall 100a are a whole, and the cooking container 100 is formed from a steel plate by casting, forging, or stamping.

Figure 3C:
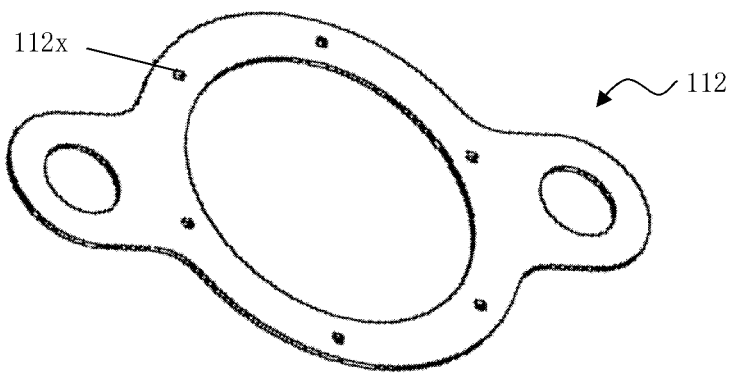
FIG. 3C shows an aerial view of a holder in the shape of a flat board, with round holes.
Figure 3D:
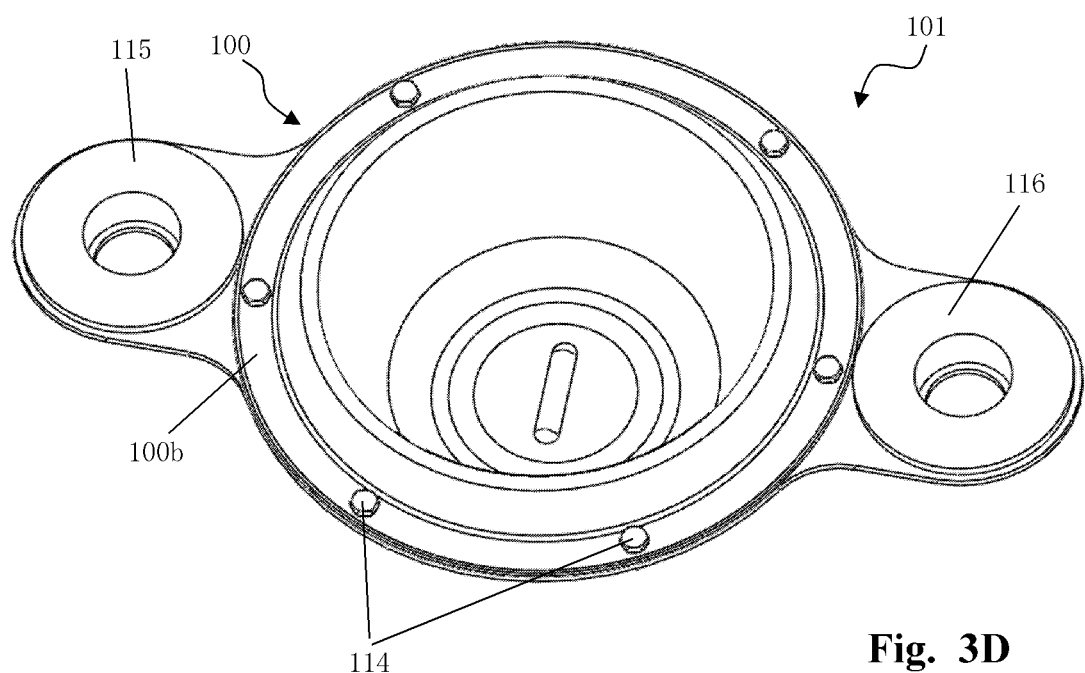
FIG. 3D shows an aerial view of the cooking container and a holder which are fixedly or rigidly connected by the connector.

Referring to FIG. 3C, a flat board 112 comprises some round holes 112x wherein the diameter of the said round holes is about the same as the diameter of the round holes 113d on the flat part 113a of the connecting component 113. Referring to FIG. 3D, a cooking device 101 comprises the cooking container 100 and a flat board 112. Two bearing housings 115 and 116 are rigidly connected to the flat board 112, and the rigid connection may be achieved by bolts and nuts, or by other means. Furthermore, the flat part 113a of the connecting component 113 is configured to be rigidly connected to the flat board 112 via a plurality of bolts 114 and corresponding nuts. The bolts 114 are inserted through the round holes 113d of the connecting component 113 and the round holes of the flat board 112. The flat part 113a and the flat board 112 may either touch each other or be separated by a ring-shaped heat-insulation flat board with holes.

The connector 112 may be referred to as a connector, or a connecting component which rigidly connects the cooking container 100 to some bearing housings. In the cooking device 101, the connector 112 is rigidly connected with the cooking container 100, if ignoring the elastic or other deformations. The connector 112 may be made of steel or aluminum alloy or other metal, carbonate fiber, durable plastic, or other durable material. The connector 112 may be substituted by a solid component of a different shape. It is not a requirement for the connector 112 to be flat or to be a board.

The flat part 113a may be placed either above or below the connector 112.

The rigid connection of the connector 112 with the cooking container 100 may be substituted by a different type of connection, such as an elastic connection comprising springs or other elastic devices, a connection comprising one or more kinematic pairs, etc.

It should also be noted that the bearing housings 115 and 116 may each comprise a flange configured to be rigidly connected with the connector 112 by a plurality of bolts and nuts. The techniques of using bolts and nuts to rigidly connect these are well-known.

It should also be noted that heat insulation materials may be inserted to separate the flat part 113a and the connector 112.

The cooking container 100 may be configured to have a flat edge on top, e.g., a circle, which may be configured to be horizontal when the cooking container is positioned in the upright position.

Figure 3E:
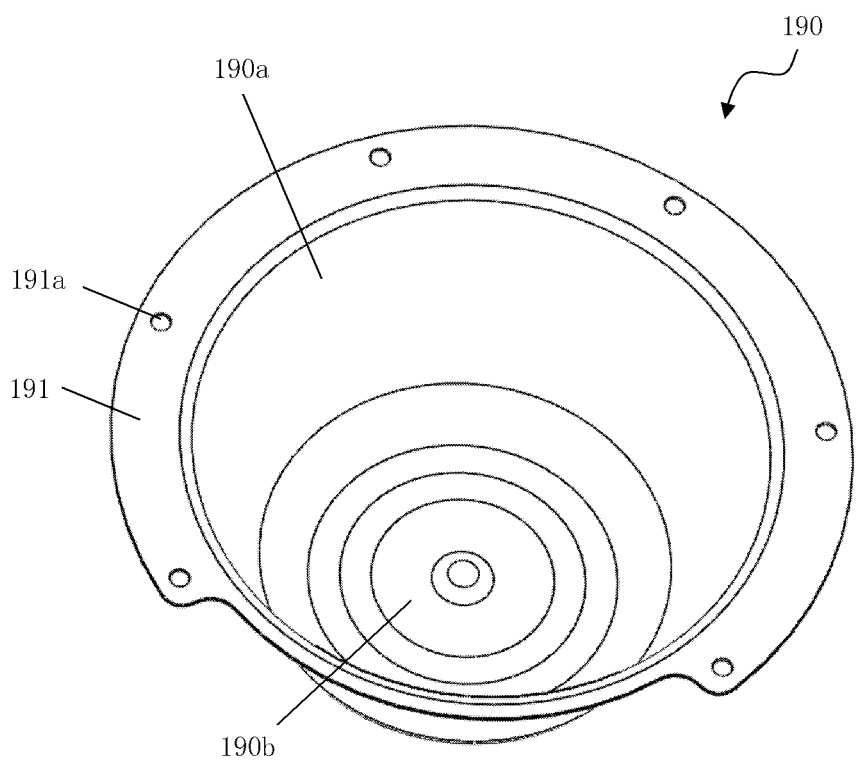
FIG. 3E shows an aerial view of another cooking container.
Figure 3F:
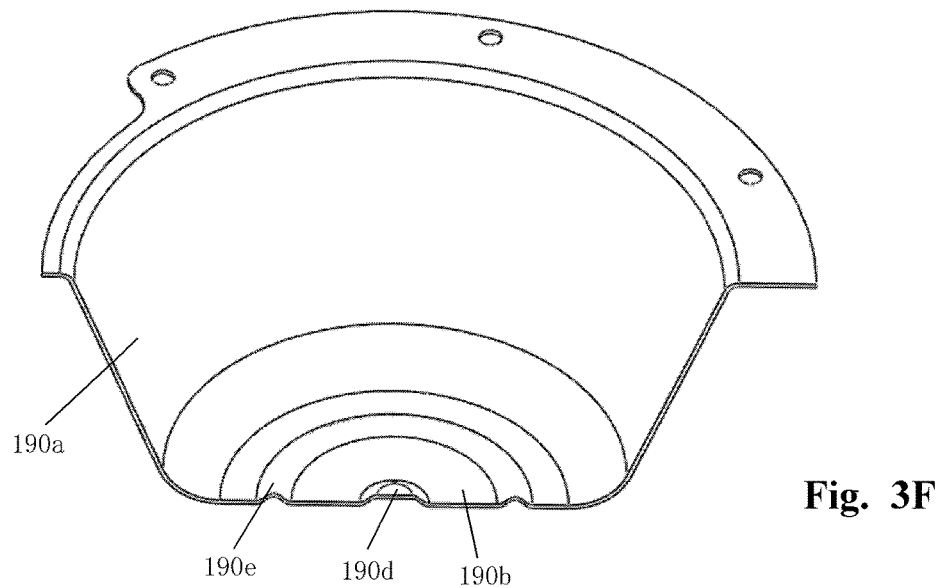
FIG. 3F shows a cut view of the cooking container.

Referring to FIGS. 3E-3F, a cooking container 190, positioned in an upright position, is configured to hold food or food ingredients for cooking. The cooking container 190 may have the shape of a wok. The cooking container 190 comprises a bottom 190b and a cone shaped wall 190a which is roughly rotationally symmetric around an axis, referred to as the axis of the cooking container 190. The axis of the cooking container 190 may be configured to be vertical or nearly vertical when the cooking container 190 is positioned in the upright position. The cooking container 190 further comprises a flat part 191 which has some round holes 191a. The flat part 191 may be referred as the connecting component of the cooking container 190. The cooking container 190 may further comprise barriers 190d and 190e, both of which are rotationally symmetric around the axis of the cooking container. The barriers 190d and 190e may help move the food or food ingredients in the cooking container when the cooking container 190 is fast moved. The bottom 190b and wall 190a are all coated with Teflon or other non-stick finish.

It should be noted that the cooking container 100 may be substituted by the cooking container 190. Also, the interior side of the cooking container 100 or 190 may be treated or coated with non-sticking material.

Figure 4:
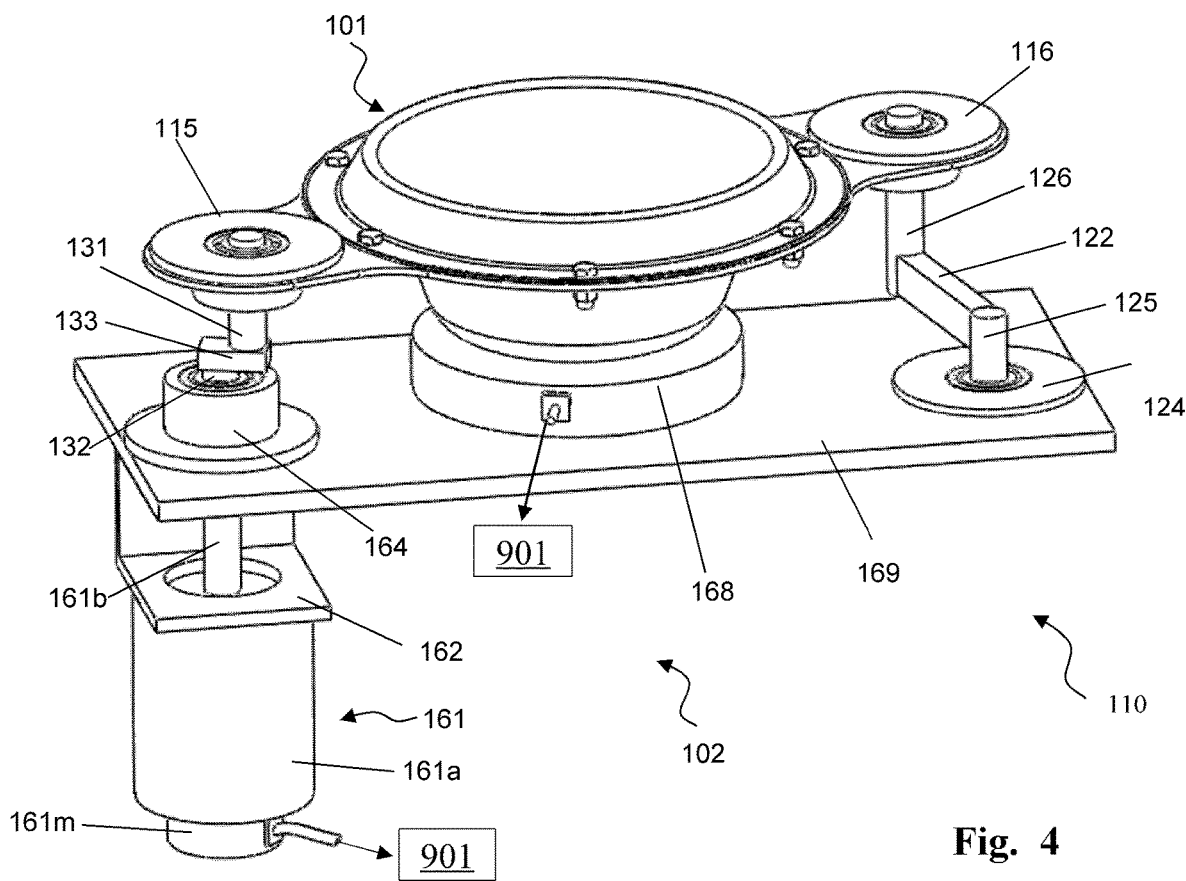
FIG. 4 shows an aerial view of a cooking sub-apparatus.

Referring to FIG. 4, a cooking sub-apparatus 110 comprises: the cooking device 101; a heater comprising an inductive stove 168; and temperature sensors (not showing in the figures) fixedly connected to the cooking container 100. The cooking container 100 is configured to contain or otherwise hold food or food ingredients during a cooking process, when the cooking container 100 is at or near an upright position. The cooking container 100 comprises ferromagnetic metal (or other ferromagnetic material) at bottom. The temperature sensors may sense the temperature of some surfaces of the cooking container 100. The temperature sensors are connected to the computer system 901 by wires or wireless means, and the computer system 901 is configured to read or estimate the temperatures of the cooking container 100. The inductive stove 168 can heat the ferromagnetic metal of the cooking container 100. The inductive stove 168 is fixedly connected to a support component 169. (Alternatively, the inductive stove 168 may be fixedly connected to the ground.)

The cooking sub-apparatus 110 further comprises a stirring motion mechanism 102, wherein the stirring motion mechanism 102 comprises: a first rotational mechanism comprising a shaft 131 and the bearing housing 115 which are constrained to rotate relative to each other; a second rotational mechanism comprising a shaft 132 and a bearing housing 164 which are constrained to rotate relative to each other; a third rotational mechanism comprising a shaft 125 and a bearing housing 124 which are constrained to rotate relative to each other; a fourth rotational mechanism comprising a shaft 126 and the bearing housing 116 which are constrained to rotate relative to each other.

The stirring motion mechanism 102 further comprises rigid connectors 122 and 133 The bearing housings 164 and 124 are rigidly connected to the support component 169. The rigid connector 133 rigidly connects the shafts 131 and 132. The rigid connector 122 rigidly connects the shafts 126 and 125.

The axes of the shafts 125, 126, 132 and 131 may be parallel to each other, and the distance between the axis of the shaft 132 and the axis of the shaft 131 is configured to be strictly less than the distance between the axis of the shaft 126 and the axis of the shaft 125. The distance between the axes of the shafts 132 and 131 is relatively small, usually not exceeding tens of millimeters. Although this is not a strict requirement, the axes of the shafts 131, 132, 125 and 126 are configured to be vertical and the top surface of the support component 169 is configured to be horizontal, when the cooking container 100 is at the upright position.

The stirring motion mechanism 102 further comprises a rotational motion mechanism 161 comprising a moving member 161b and a stationary member 161a. The moving member 161b is fixedly connected to the shaft 132, and the stationary member 161a is fixedly connected to the support component 169 via a rigid connector 162. The rotational motion mechanism 161 may produce a rotation of the moving member 161b and hence of the shaft 132, relative to the stationary member 161a (or equivalently, relative to the support component 169). The rotational motion mechanism 161 is driven by a motor 161m, which is connected to the computer system 901 via wires or by wireless means, and the computer system 901 may be configured to control the timing and speed of the rotational motion mechanism 161.

The rotational motion mechanism 161 may be substituted by other type of motion mechanism.

When the rotational motion mechanism 161 produces a rotation of the shaft 132 relative to the bearing housing 164 (or equivalently, relative to the support component 169), the connector 112 (and the bearing housings 115 and 116) makes a circular motion without self-rotation. Each point of the connector 112 (or of the bearing housings 115 and 116) is rotated in a circular motion relative to the support component 169, and the trajectory of the point is a circle whose radius is equal to the eccentricity of the stirring motion mechanism 102, wherein the circle lies on a plane which is perpendicular to the axes of the rotational mechanisms. This produces a cyclic, planar movement in the connector 112 and in the cooking container 100, if ignoring elastic and other deformations. The movement in the cooking container 100 may stir, mix, and distribute the food or food ingredients contained in the cooking container 100.

The distance between the axis of the first rotational mechanism and the axis of the second rotational mechanism is referred to as the eccentricity of the stirring motion mechanism 102.

In the cooking sub-apparatus 110, the cooking container 100 may be substituted by any cooking container configured to contain or otherwise hold food or food ingredients when it is at or near an upright position.

It should be noted that the cooking sub-apparatus 110 comprises: the cooking device 101 comprising a cooking container 100 configured to hold food or food ingredients; and a stirring motion mechanism 102 configured to produce a cyclic motion in the cooking device 101 and hence the stirring motion mechanism 102 configured to produce a cyclic motion in the cooking container 100 as stir, mix or distribute the food or food ingredients contained in the cooking container 100. The stirring motion mechanism 102 comprises:

(1) a first link comprising the bearing housings 116 and 115, the connector 112, and their rigid connections, wherein the connector 112 (and the first link) is bolted to the cooking container 100;
(2) a second link comprising the shaft 132, the shaft 131, and their rigid connection;
(3) a third link comprising the shaft 125, the shaft 126, and their rigid connection;
(4) a fourth link composing the support component 169, the bearing housings 164 and 124, and their rigid connections to each other;
(5) a first connection comprising bearings and accessories configured to connect the shaft 131 of the second link and the bearing housing 115 of the first link, so that the first link is constrained to rotate relative to the second link around the axis of the shaft 131;
(6) a second connection comprising bearings and accessories configured to connect the shaft 132 of the second link and the bearing housing 164 of the fourth link, so that the second link is constrained to rotate relative to the fourth link around the axis of the shaft 132;
(7) a third connection comprising bearing and accessories configured to connect the shaft 126 of the third link and the bearing housing 116 of the first link, so that the first link is constrained to rotate relative to the third link around the axis of the shaft 126;
(8) a fourth connection comprising bearings and accessories configured to connect the shaft 125 of the third link and the bearing housing 124 of the fourth link, so that the third link is constrained to rotate relative to the fourth link around the axis of the shaft 125;
(9) a motion mechanism configured to produce a rotation in the shaft 132 (of the second link) around the axis of the shaft 132 wherein the motion mechanism comprises the rotational motion mechanism 161, the fixed connection of the stationary member of the rotational motion mechanism 161 with the support component 169, and the connection of the moving member of the rotational motion mechanism 161 with the shaft 132, etc.

It should be noted that the first connection discussed above connects the first link and the second link, so that the first link is constrained to rotate relative to the second link; the second connection connects the second link and the fourth link so that the second link is constrained to rotate relative to the fourth link; the third connection connects the first link and the third link, so that the first link is constrained to rotate relative to the third link; the fourth connection connects the third link and the fourth link, so that the third link is constrained to rotate relative to the fourth link; the motion mechanism produces a motion of the second link relative to the fourth link.

It should also be noted that the above stirring motion mechanism comprises a crank-rocker mechanism comprising: the first link, second link, third link, fourth link, the first connection, the second connection, the third connection and the fourth connection.

It should be noted that the stirring motion mechanism comprises: (1) a first rotational mechanism comprising the shaft 126, the bearing housing 116, and a connection comprising bearing and accessories configured to constrain the relative movement of the shaft 126 and the bearing housing 116 to an axial rotation; (2) a second rotational mechanism comprising the shaft 131, the bearing housing 115, and a connection comprising bearing and accessories configured to constrain the relative movement of the shaft 131 and the bearing housing 115 to an axial rotation; (3) a third rotational mechanism comprising the shaft 132, the bearing housing 164, and a connection comprising bearing and accessories configured to constrain the relative movement of the shaft 132 and the bearing housing 164 to an axial rotation; (4) a fourth rotational mechanism comprising the shaft 125, the bearing housing 124, and a connection comprising bearing and accessories configured to constrain the relative movement of the second main shaft 125 and the bearing housing 124 to an axial rotation; (5) the support component 169; (6) the connectors 122 and 162, the rotational motion mechanism 161; (7) the mutual connections among the above parts, if any.

The support component 169 is referred to as the support component of the stirring motion mechanism. The stirring motion mechanism produces a planar movement in the cooking container 100 relative to the support component 169. Although this is not a strict requirement, the magnitudes of movements of points on the cooking container may be configured to be in tens of millimeters, anywhere from 10 to 99 millimeters.

The rigid connection of the connector 112 (or of the first link) with the cooking container 100 may be substituted by a flexible connection or other types of connection. The first link, second link, third link or fourth link described above may be substituted by a first solid component, a second solid component, a third solid component and respectively a fourth solid component. A solid component may comprise a rigid part or rigid component, or an elastic part or elastic component, or both rigid and elastic parts.

It should be noted that the axes of the shaft 132 and the shaft 131 may be configured to parallel to each other. The distance between the two parallel axes may be kept fixed in some applications or adjustable in some other applications; where the distance may further be configured to be properly small (less than tens of millimeters).

It should be noted that the axes of the shafts 131, 132, 126 and 125 in the cooking sub-apparatus 110 may be configured to intersect at a same point, instead of being configured to be parallel to each other; and the angle between the axes of the shafts 131 and 132 is configured to be smaller than the angle between the shafts 126 and 125. The angle between the shafts 131 and 132 may be quite small, no more than several degrees in many applications. In this case, the stirring motion mechanism in the cooking sub-apparatus 110 produces a cyclic, spherical motion in the cooking container 100 and the connector 112, if ignoring elastic and other deformations.

For the purpose of the present patent application, shafts and bearing housings are considered to be rigid components. It should be noted that a rigid component is rigid only in relative terms, in comparison with elastic objects such as spring or rubber. There is no absolute rigid component in our world.

Figure 5:
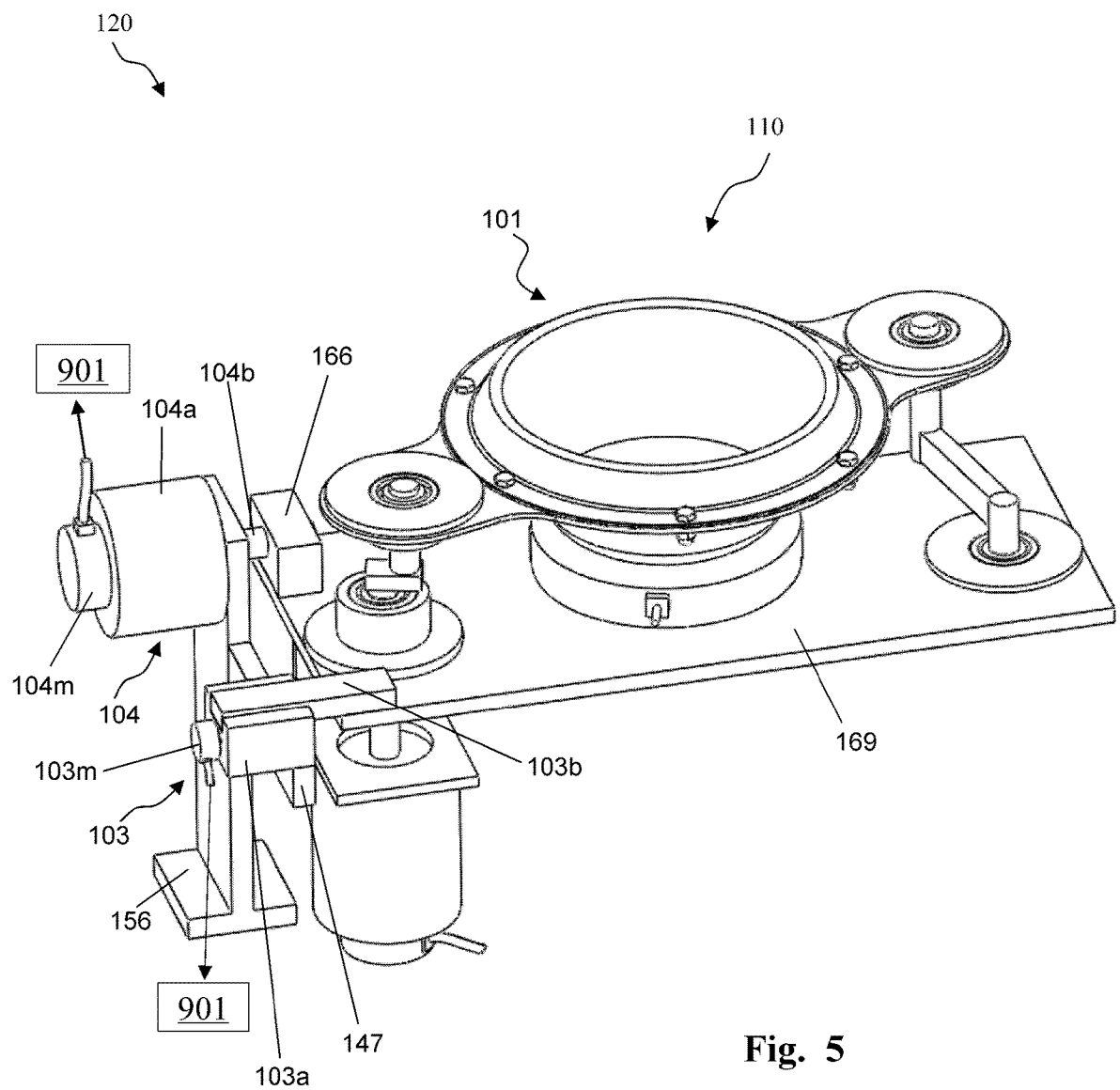
FIG. 5 shows an aerial view of a cooking apparatus comprising the cooking sub-apparatus of FIG. 4.

Referring to FIG. 5, a cooking apparatus 120 comprises the cooking sub-apparatus 110 and an unloading motion mechanism 104, wherein the unloading motion mechanism 104 comprises a moving member 104b and a stationary member 104a. The unloading motion mechanism 104 is driven by a motor 104m. The moving member 104b is fixedly connected to the support component 169 of the stirring motion mechanism via a connector 166, and the stationary member 104a is fixedly connected to the ground by a rigid connector 156. The unloading motion mechanism 104 may produce a back-and-forth motion of the moving member 104b and hence of the support component 169, between a first end-position and a second end-position, relative to the stationary member 104a (or equivalently, relative to the rigid connector 156). The unloading motion mechanism 104 is driven by a motor 104m, which is connected to the computer system 901 via wires or by wireless means, and the computer system 901 may be configured to control the timing and speed of the unloading motion mechanism 104.

The unloading motion mechanism 104 may be substituted by other type of motion mechanism, e.g., a combination motion mechanism comprising rotational motion sub-mechanisms and/or linear motion sub-mechanisms.

At the first end-position of the support component 169 in the back-and-forth rotation, the axis of the first rotational mechanism is vertical, while the cooking container 100 is at the upright position. At the second end-position of the support component 169 in the back-and-forth rotation, the cooking container 100 is turned at an angle as to dispense a cooked food held in the cooking container. The angular degree between the first end-position and the second end-position is usually between 90 degrees and 180 degrees.

It should be noted that said unloading motion mechanism 104 may be substituted by a motion mechanism configured to move the cooking container 100 directly.

The cooking apparatus 120 further comprises a braking mechanism. Said braking mechanism comprises a horizontal motion mechanism 103 comprising a moving member 103b and a stationary member 103a. The stationary member 103a is fixedly connected to the rigid connector 156 by a connector 147. The horizontal motion mechanism 104 may produce a back-and-forth horizontal linear motion of the moving member 103b, between a first end-position and a second end-position, relative to the stationary member 103a (or equivalently, relative to the rigid connector 156). The horizontal motion mechanism 103 is driven by a motor 103m, which is connected to the computer system 901 via wires or by wireless means, and the computer system 901 may be configured to control the timing and speed of the horizontal motion mechanism 103.

When the support component 169 of the cooking sub-apparatus 110 is at the first end position, and when the moving member 103b in the braking mechanism is at the first end position, the moving member 103b may touch and press on the support component 169. Thus, the support component 169 is limited by the moving member 103b; and the support component 226 of the cooking sub-apparatus 110 is braked by the braking mechanism from moving the moving member 103b horizontally.

When the support component 169, at the first end-position, is braked by the braking mechanism, the cooking container 100 may be able to hold food or food ingredients for cooking and the stirring motion mechanism may be able to produce a motion in the cooking container 100 as to stir, mix or distribute the food or food ingredients contained in the cooking container 100. When a cooked food is completed, the moving member 103b of the braking mechanism may be moving to the second end-position, and the support component 169 of the cooking sub-apparatus 110 may be rotated in the upward direction, and thus the support component 169 and the cooking container 100 may be rotated by the unloading motion mechanism as to dispense the cooked food from the cooking container 100.

It should be noted that the cooking apparatus 120 comprises: the cooking sub-apparatus 110 comprising the cooking container 100, and the stirring motion mechanism comprising the support component 169, wherein the stirring motion mechanism is configured to produce a cyclic planar motion in the cooking container 100 relative to the support component 169, as to stir, mix or distribute the food or food ingredients contained in the cooking container 100; the heating device 168, wherein the heating device 168 is mounted on the support component 169, wherein the heating device 168 is configured to heat the cooking container 100 during a cooking process.

It should also be noted that the cooking apparatus 120 further comprises the rigid connector 156 and the unloading motion mechanism configured to rotate (or otherwise move) the support component 169 relative to the rigid connector 156 between a first end position and a second end position, and hence the cooking container 100 is rotated relative to the rigid connector 156 between a first end position and a second end position. In the first end position, the support component 169 is so positioned that the cooking container 100 is positioned upright as to be able to hold food ingredients; and when the support component 169 is rotated to the second end position, the cooking container 100 is turned as to be able to dispense cooked food from the cooking container 100. From the first end position to the second end position, the axis of the cooking container 100 is turned by a certain fixed angle which can optionally be any constant chosen between 75 to 180 degrees, or in the most common applications chosen between 80 to 120 degrees.

It should be noted that the above discussed unloading motion mechanism in the cooking apparatus 120 may be substituted by an unloading motion mechanism comprising a rotational motion mechanism comprising a moving member and a stationary member. The moving member is fixedly connected to the support component 169 of the stirring motion mechanism, and the stationary member is fixedly connected to the ground by the rigid connector 156. The rotational motion mechanism may produce a back-and-forth motion of the moving member and hence of the support component 169, between a first end-position and a second end-position, relative to the stationary member (or equivalently, relative to the rigid connector 156). The rotational motion mechanism is driven by a motor.

Furthermore, the rotational motion mechanism may comprise a built-in braking mechanism configured to brake the rotation of the moving member, and hence the rotation of the moving member is braked or stopped when the support component 169 is at the first end position, and when the stirring motion mechanism in the cooking sub-apparatus 110 is producing a motion in the cooking container 100. The braking mechanism of the rotational motion mechanism may comprise the electric braking of the following types: rheostatic or dynamic braking; plugging or reverse current braking; regenerative braking, etc.

Alternatively, any of the above discussed braking mechanisms of the cooking apparatus 120 may be substituted by a mechanism comprising a C-face power-off brake, or C-face power-off brake with heavy duty enclosures, or double C-face power-off brakes, pneumatic or hydraulic brakes, shaft mounted brake, tooth brake, trailer brake, clutch brake, centrifugal brake, or caliper brake, etc. Any known braking technique may be used here to substitute the braking mechanism in the cooking apparatus 120.

It should be noted the rigid connector 156 may be referred to as a support component of the cooking apparatus 120.

Figure 6A:
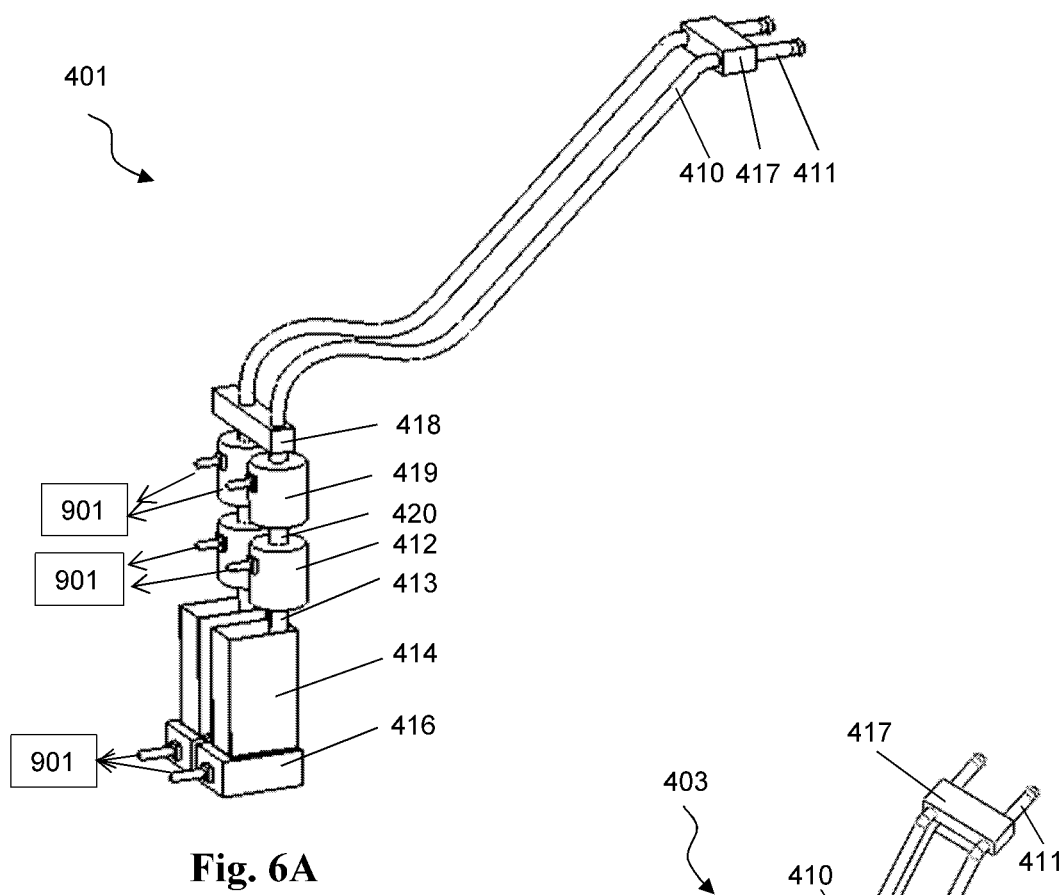
FIG. 6A shows an aerial view of a liquid dispensing sub-mechanism.

Referring to FIG. 6A, a liquid dispensing sub-mechanism 401 comprises: a plurality of liquid pipes 411, 413 and 420; a plurality of flexible pipes 410; a plurality of flowmeters 419; a plurality of liquid pumps 412; a plurality of electronic balances 416; a plurality of liquid containers 414. Each liquid container 414 is configured to contain a liquid ingredient, e.g., cooking oil, vinegar, or water. Each liquid pipe 411 is connected to a flexible pipe 410. Each flowmeter 419 is connected to a pair of corresponding pipes 420 and 410. Each pump 412 is connected to a pair of corresponding pipes 420 and 413; and said pipe 413 is inserted into a corresponding liquid container 414, so that the pump can pump liquid from the liquid container and the flowmeter can measure the flow of the corresponding pipes. Each container 414 is positioned on an electronic balance 416, so that the electronic balance 416 can weigh the corresponding container 414. Connectors 417 and 418 are configured to fixedly connect the pipes to improve rigidity or stability of the pipes. The pumps 412, flowmeters 419, and electronic balances 416 are connected by wired or wireless means to the computer system 901, so that the computer system may control the timing and amount of liquid to be drawn from the corresponding liquid container. The connector 417 fixedly connects the pipes 411 to improve rigidity or stability of the pipes.

Figure 6B:
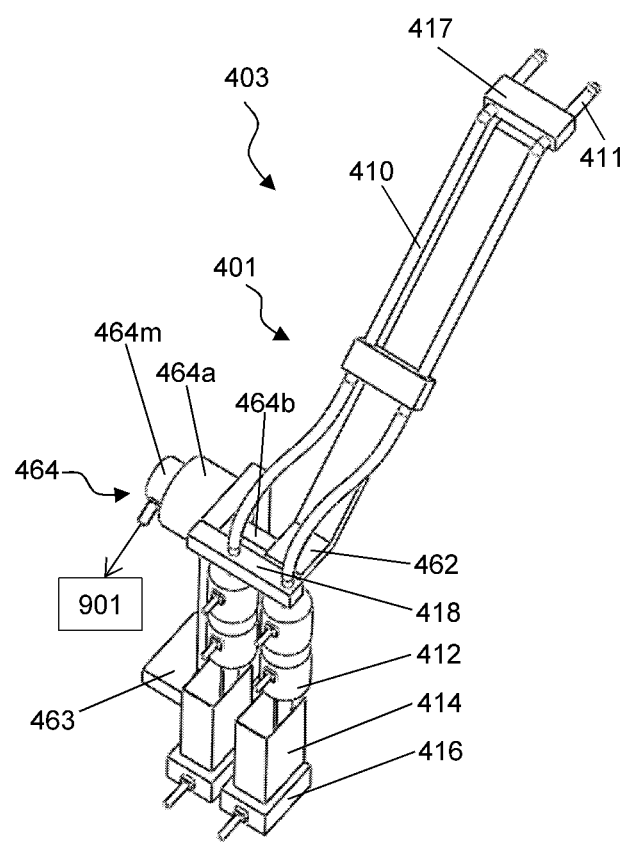
FIG. 6B shows an aerial view of a liquid dispensing apparatus comprising the liquid dispensing sub-mechanism

Referring to FIG. 6B, a liquid dispensing apparatus 403 comprises: a liquid dispensing sub-mechanism 401; a rotational motion mechanism 464 comprising a moving member 464b and a stationary member 464a. The moving member 464b is fixedly connected to the connector 417 of the liquid dispensing sub-mechanism 401 via a connector 462, and the stationary member 464a is fixedly connected to the ground via a rigid component 463 referred to as a support component. The rotational motion mechanism 464 may produce a back-and-forth motion of the moving member 464b and hence of the connectors 462 and 417, between a first end-position and a second end-position, relative to the stationary member 464a (or equivalently, relative to the rigid connector 463). The pipes 410 of the liquid dispensing sub-mechanism 401 are attached to the connector 462. The connector 418 of the liquid dispensing sub-mechanism 401 is fixedly connected to the rigid component 463. The rotational motion mechanism 464 is driven by a motor 464m, which is connected to the computer system 901 via wires or by wireless means, and the computer system 901 may be configured to control the timing and speed of the rotational motion mechanism 464. The rotational motion mechanism 464 may be substituted by other type of motion mechanism.

It should be noted the flowmeters 419, the liquid pumps 412, the electronic balance 416 of the liquid dispensing sub-mechanism 401 are configured to be fixedly connected to the ground via connectors, wherein the connectors are not showing in FIGS.

Figure 6C:
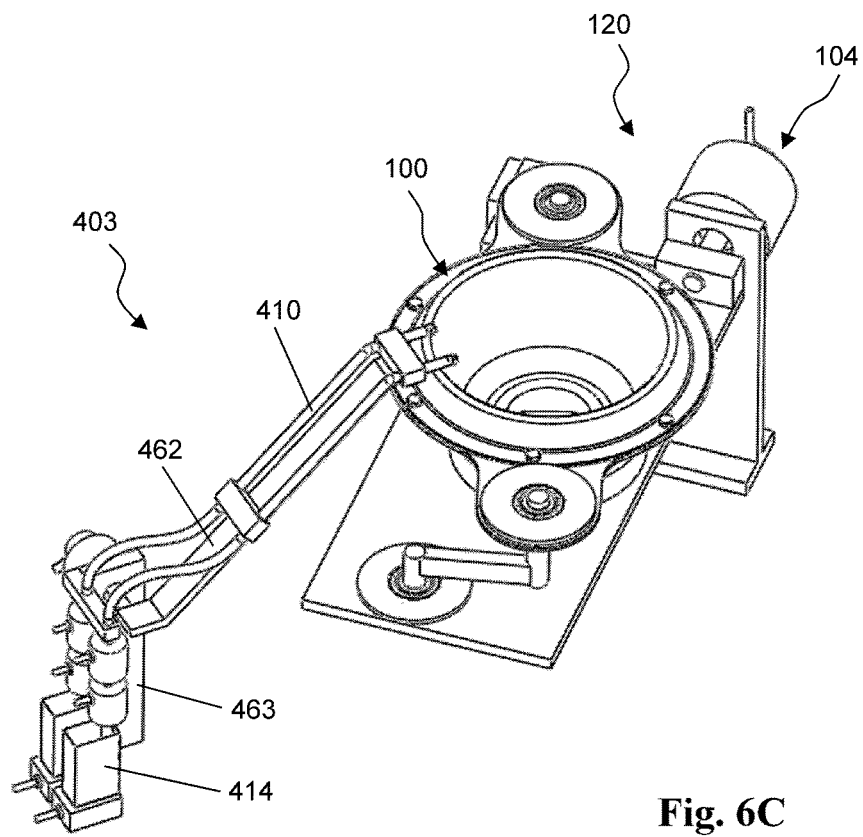
FIGS. 6C-6D show aerial views of the relative positions of the cooking apparatus of FIG. 5 and the liquid dispensing apparatus.
Figure 6D:
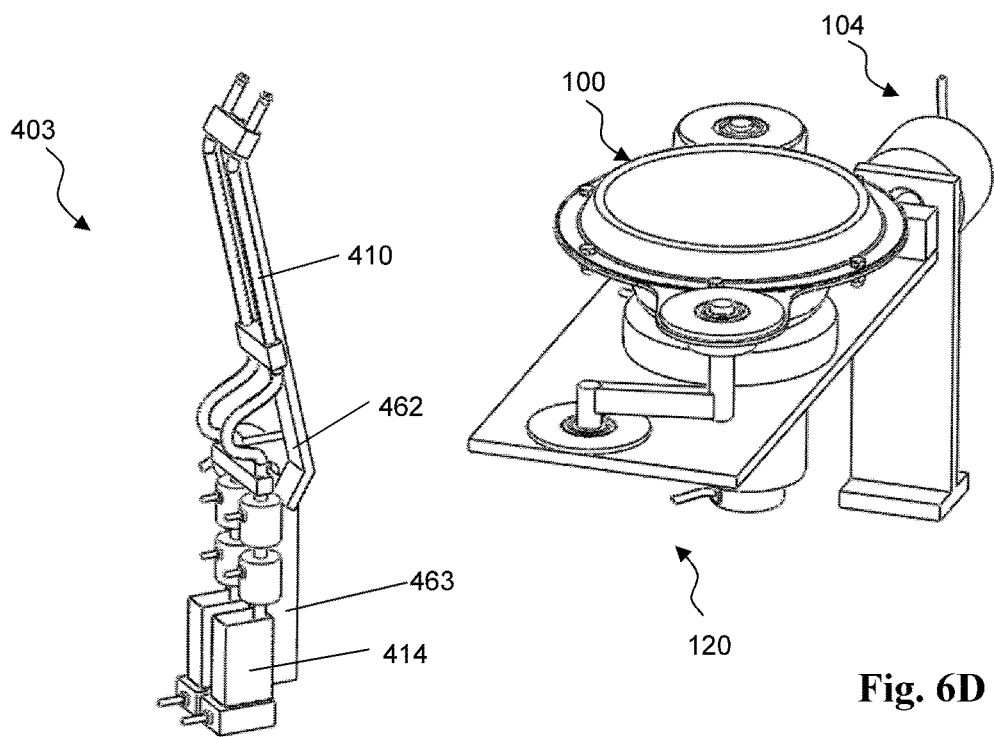

FIGS. 6C-6D show the relative positions of the above liquid dispensing apparatus 403 and the cooking container 100 of a cooking apparatus 120. At a first end-position of the connector 462 (in the back-and-forth rotation produced by the rotational motion mechanism 464), the open end of the pipes 411 is to be positioned above the cooking container 100 when the cooking container 100 is at the upright position (see FIG. 6C), so that the liquid may be flowed into the cooking container 100. The liquid dispensing sub-mechanism 401 of the liquid dispensing apparatus 403 is used to dispense a plurality of liquid ingredients into the cooking container 100 of a cooking apparatus 103 when the connector 462 is at the first end-position and the cooking container 100 is at the upright position.

When the connector 462 is rotated to the second end-position, the components 462 and 411 are all rotated by an angle, away from the cooking container 100. The angular degree between the first end-position and the second end-position may be about 90 degrees, although this is not a strict requirement.

Figure 7A:
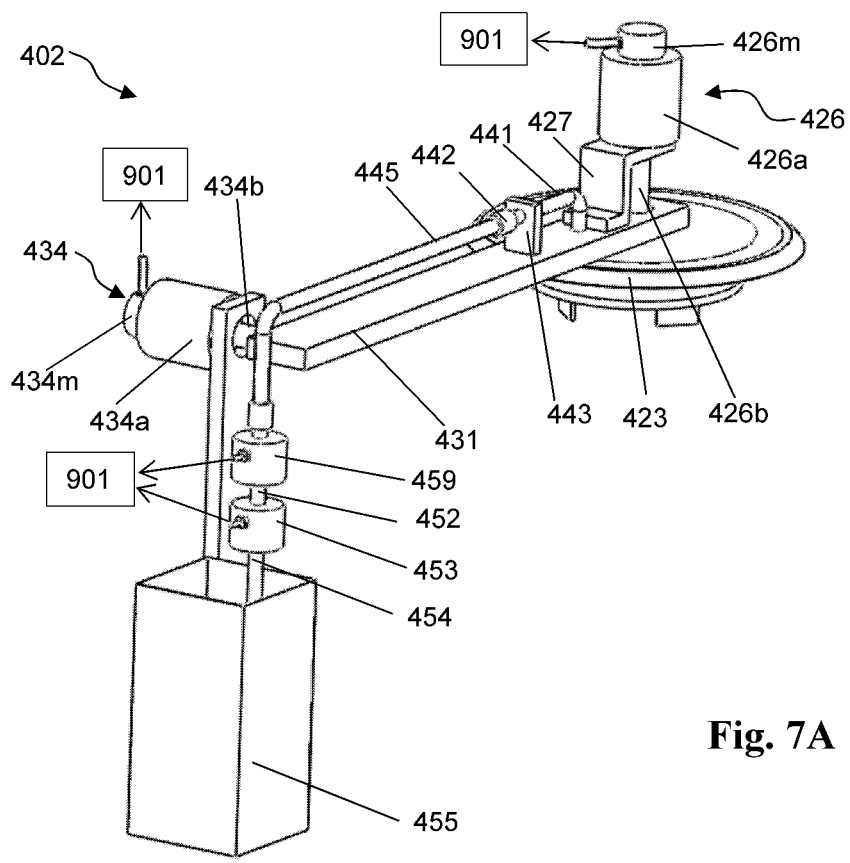
FIGS. 7A-7B show aerial views of a cleaning apparatus.
Figure 7B:
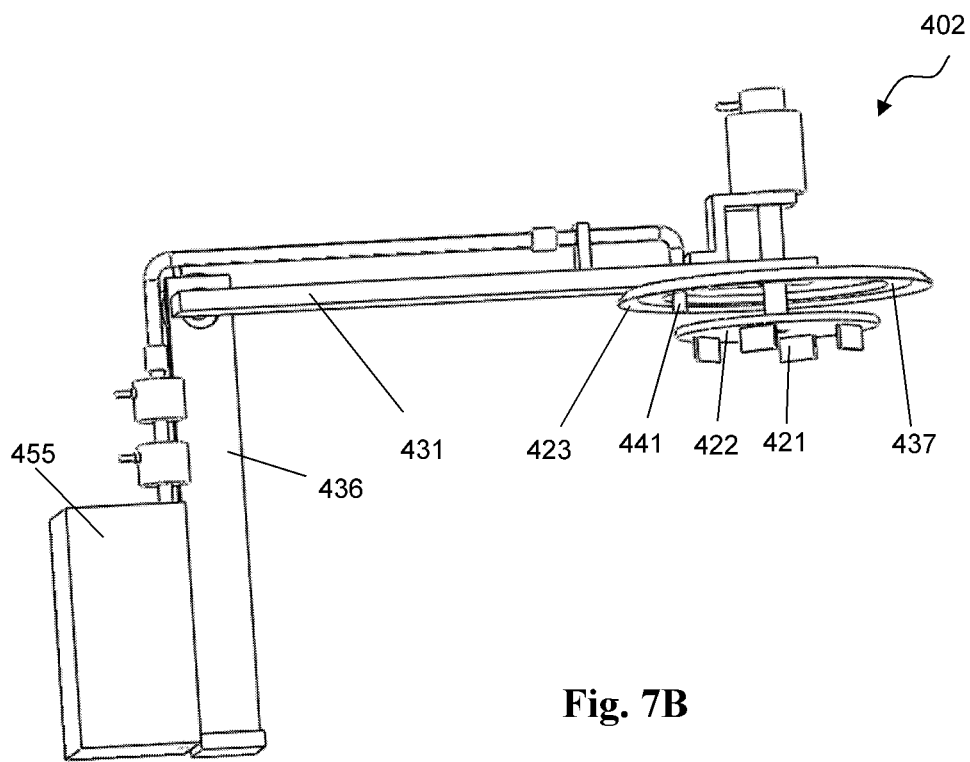

Referring to FIGS. 7A-7B, a cleaning apparatus 402 comprises: a rigid component 431 referred to as a support component; a plurality of stirrers 421 which are joined together with a rigid component 422, which is constrained to rotate relative to the rigid component 425; a cover 423 which is fixedly attached to the rigid component 431; a shaft 424 which is constrained to rotate relative to the rigid component 431; and a rotational motion mechanism 426 comprising a moving member 426b and a stationary member 426a. The moving member 426b is rigidly or fixedly connected to the rigid component 422, and the stationary member 426a is fixedly connected to the rigid component 431 by a rigid connector 427. Thus, the rotational motion mechanism 426 can produce a rotation of stirrers 421 relative to the stationary member 426a (or equivalently, relative to the rigid component 431). A seal 437 in the shape of a ring is attached on the cover 423, wherein the axis of the seal 437 is concentric with the cover 423. The rotational motion mechanism 426 is driven by a motor 426m, which is connected to the computer system 901 via wires or by wireless means, and the computer system 901 may be configured to control the timing and speed of the rotational motion mechanism 426. The rotational motion mechanism 426 may be substituted by other type of motion mechanism. The stirrers 421 may comprise blades or other shapes.

The cover 423 is fixedly connected to the support component 431. The stirrers 421 are optionally rotationally symmetric around the axis of rotation produced by the rotational motion mechanism 426. The stirrers 421 are to be configured to stir clearing liquid (e.g. water) in a cooking container; see below.

The cleaning apparatus 402 further comprises a rotational motion mechanism 434 comprising a moving member 434b and a stationary member 434a. The moving member 434b is fixedly connected to the support component 431, and the stationary member 434a is fixedly connected to the ground via a rigid component 436 referred to as a support component. The rotational motion mechanism 434 may produce a back-and-forth motion of the moving member 434b and hence of the support component 431, between a first end-position and a second end-position, relative to the stationary member 434a (or equivalently, relative to the rigid component 436). The rotational motion mechanism 434 is driven by a motor 434m, which is connected to the computer system 901 via wires or by wireless means, and the computer system 901 may be configured to control the timing and speed of the rotational motion mechanism 434. The rotational motion mechanism 434 may be substituted by other type of motion mechanism.

The cleaning apparatus 402 further comprises: pipes 441 which optionally inflexible (not a strict requirement), 452 and 454; a flexible pipe 445; pipe connectors 442; a connector 443; a liquid pump 453; and a flowmeter 459. The pipe 441 is connected to the pipe 445 by the pipe connector 442; and the other end of the pipe 441 is open. The flowmeter 459 is connected to the pipes 445 and 452. The liquid pump 453 is connected to the pipes 452 and 454. The pipe 454 is connected to a liquid source 455, e.g., tap water, water heater (usually connected to tap water), or water tank. The connector 443 fixedly connects the support component 431 and the pipe 441. The liquid pump 453 is configured to pump liquid from the liquid source 455 to the exit at the open end of the pipe 441. The flowmeter 459, the liquid source 455, and a base component of the liquid pump 453 are fixedly connected the ground. The liquid pump 453 is connected to the computer system 901, so that the computer system may control the timing and amount of liquid to be drawn from the liquid source.

Figure 7C:
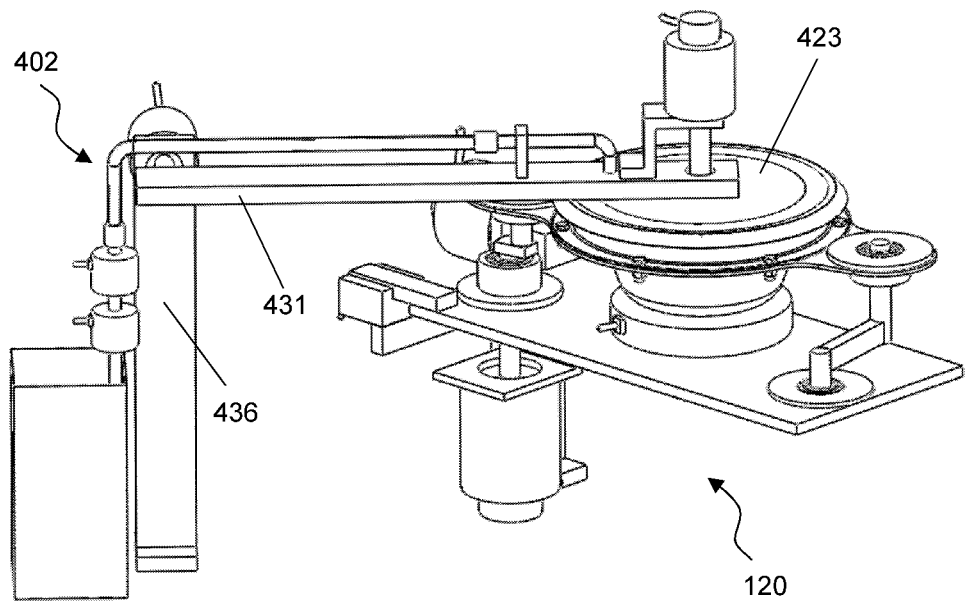
FIGS. 7C-7D show aerial views of the relative positions of the cleaning apparatus and the cooking apparatus of FIG. 5.
Figure 7D:
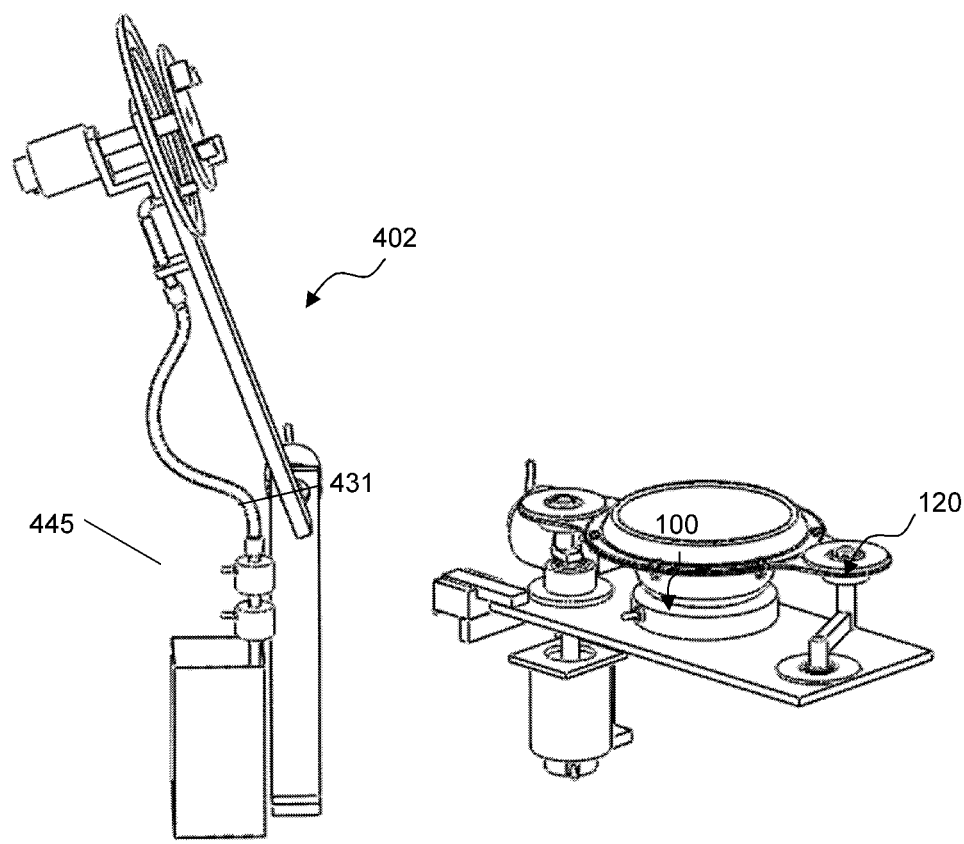

FIGS. 7C-7D show the relative positions of the above cleaning apparatus 402 and the cooking container 100 of the cooking apparatus 120. At a first end-position of the support component 431 (in the back-and-forth rotation produced by the rotational motion mechanism 434), the axis of the rotational mechanism (which comprises the shaft 131 and the bearing housing 115) is vertical and the open end of the pipe 441 is to be positioned above the cooking container 100 when the cooking container 100 is at the upright position (see FIG. 7C), so that liquid may be flown into the cooking container 100. The liquid may be used to clean the cooking container 100.

The rotational motion mechanism 426 is configured to drive a one-way rotation of the stirrers 421 to wash the inner surface of the cooking container, while the cover 423 seals the cooking container. Liquid may be partially trapped by the stirrers 421, while the rotating stirrers may pressure the liquid to flow towards the axis of the rotational motion mechanism 426, hence toward the center of the cooking container, thus build a pressure in the liquid therein.

When the support component 431 is rotated to the second end-position, the components 421, 422, 423, 424, 425, 426 and 427 are all rotated by an angle, away from the cooking container. The angular degree between the first end-position and the second end-position may be about 90 degrees, although this is not a strict requirement.

The liquid in the liquid source 455 may comprise hot water or other liquid suitable for cleaning a cooking container.

Figure 8A:
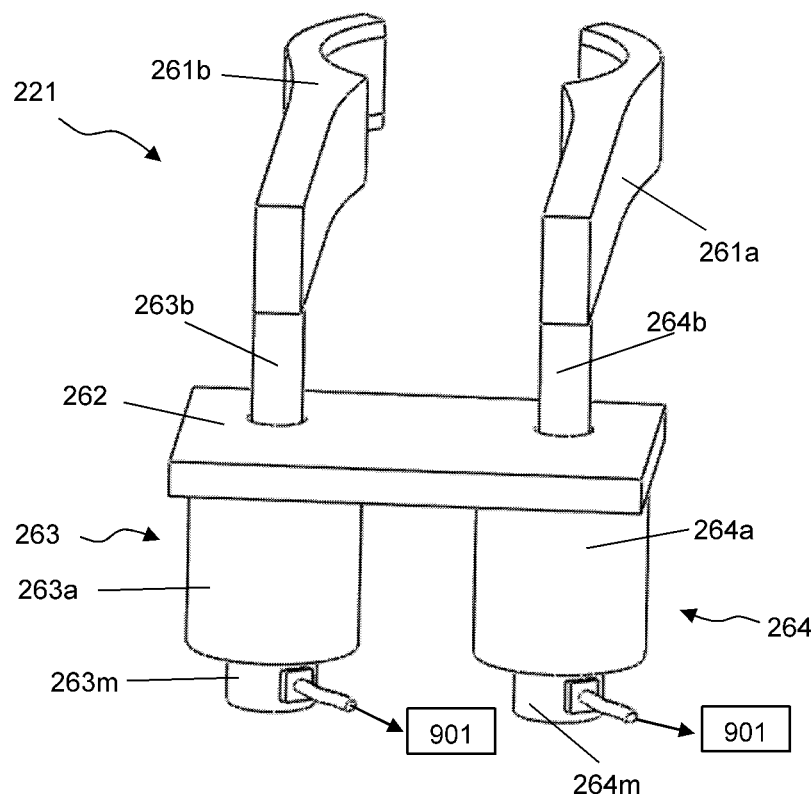
FIG. 8A shows an aerial view of a gripping mechanism.

Referring to FIG. 8A, a gripping mechanism 221 comprises: grippers 261a and 261b which can optionally be rigid or elastic components; rotational motion mechanisms 263 and 264. The rotational motion mechanism 263 comprises a stationary member 263a and a moving member 263b; and the rotational motion mechanism 263 is configured to produce a rotation of the moving member 263b relative to the stationary member 263a. The rotational motion mechanism 264 comprises a stationary member 264a and a moving member 264b; and the rotational motion mechanism 264 is configured to produce a rotation of the moving member 264b relative to the stationary member 264a. The stationary members 263a and 264a are fixedly connected to a support component 262. The gripper 261a is rigidly or fixedly connected to the moving member 264b. The rotational motion mechanism 264 can produce a rotation of the gripper 261a around the axis of the rotational motion mechanism 264 relative to the stationary member 264a. Similarly, the gripper 261b is rigidly or fixedly connected to the moving member 263b. The rotational motion mechanism 263 can produce a rotation of the gripper 261b around the axis of the rotational motion mechanism 263 relative to the stationary member 263a. As the gripper 261a or 261b is rigidly connected to the moving member 264b or respectively 263b, the rotational motion mechanism 264 or 263 can produce a rotation of the gripper 261a or respectively 261b. The axis of rotation of the rotational motion mechanism 264 is parallel to the axis of rotation of the rotational motion mechanism 263, and the rotational motion mechanisms 264 and 263 are configured to rotate the respective grippers 261a and 261b in opposite directions simultaneously. Thus, the grippers 261a and 261b can be rotated anti-synchronously around a pair of parallel axes. Each of the grippers 261a and 261b is rotated between a first end-position and a second end-position. At the first end-positions, the grippers 261a and 261b may together grip a container or other object. At the second end-positions, the grippers 261a and 261b can open up and release the container or object. The motion mechanisms 263 or 264 is driven by a motor 263m or respectively 264m. The gripping mechanism 221 may be connected to the computer system 901 in the sense that the motors 263m and 264m are connected to the computer system 901 via wires or by wireless means, and the computer system 901 may be configured to control the motions of the grippers 261a and 261b produced by the motion mechanisms 263 and 264. Thus, the gripping mechanism 221 may be controlled by the computer system 901 to grip or loosen a container or other object.

Figure 8B:
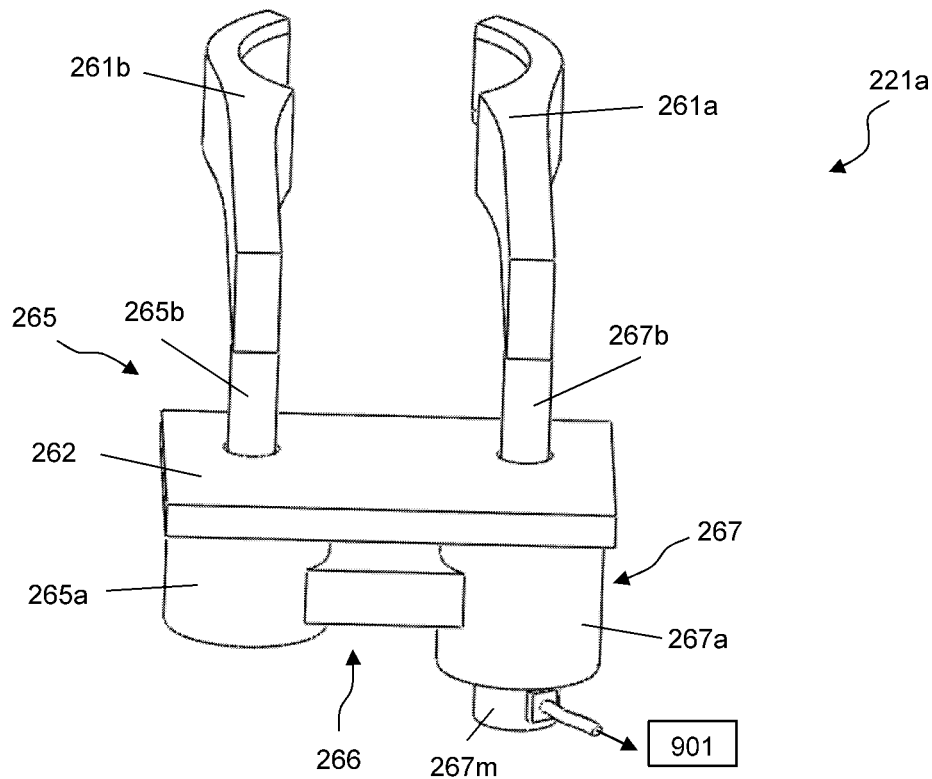
FIG. 8B shows an aerial view of a gripping mechanism.

Referring to FIG. 8B, a gripping mechanism 221a comprises: grippers 261a and 261b which are optionally rigid or elastic components; a rotational motion mechanism 267 comprising a stationary member 267a and a moving member (a shaft) 267b; a rotational mechanism 265 comprising a first mating part 265a and a second mating part (a shaft) 265b which is constrained to rotate relative to the first mating part 265a. The rotational motion mechanism 267 is configured to produce a rotational motion of the moving member 267b relative to the stationary member 267b. The stationary members 267a and the first mating part 265a are rigidly or fixedly connected to a support component 262. The gripper 261a is rigidly or fixedly connected to the moving member 267b. The gripper 261b is rigidly or fixedly connected to the second mating part (a shaft) 265b. The axis of rotation of the rotational motion mechanism 267 and the axis of the rotational mechanism 265 are configured to be parallel to each other. A transmission mechanism 266 is configured to connect the rotational motion mechanism 267 and the rotational mechanism 265, so that a rotation of the shaft 267b relative to the stationary member 267a is transmitted to an anti-synchronous rotation of the shaft 265b. Thus, the grippers 261a and 261b can be rotated anti-synchronously around a pair of parallel axes. Each of the grippers 261a and 261b is rotated between a first end-position and a second end-position. At the first end-positions, the grippers 261a and 261b may together grip a container or other object. At the second end-positions, the grippers 261a and 261b can open up and release the container or object. The motion mechanism 267 is driven by a motor 267m. The gripping mechanism 221a may be connected to the computer system 901 in the sense that the motor 267m is connected to the computer system 901 via wires or by wireless means, and the computer system 901 may be configured to control the motions of the grippers 261a and 261b produced by the motion mechanism 267. Thus, the gripping mechanism 221a may be controlled by the computer system 901 to grip or loosen a container or other object.

For examples of gripping mechanism 221a described above, see FIGS. 39A-39B ("gripping mechanism 701"), or FIGS. 47A-47C ("container gripping mechanism 905"), of U.S. patent application Ser. No. 16/517,705. The entire content of the US patent application is hereby incorporated herein by reference.

Figure 8C:
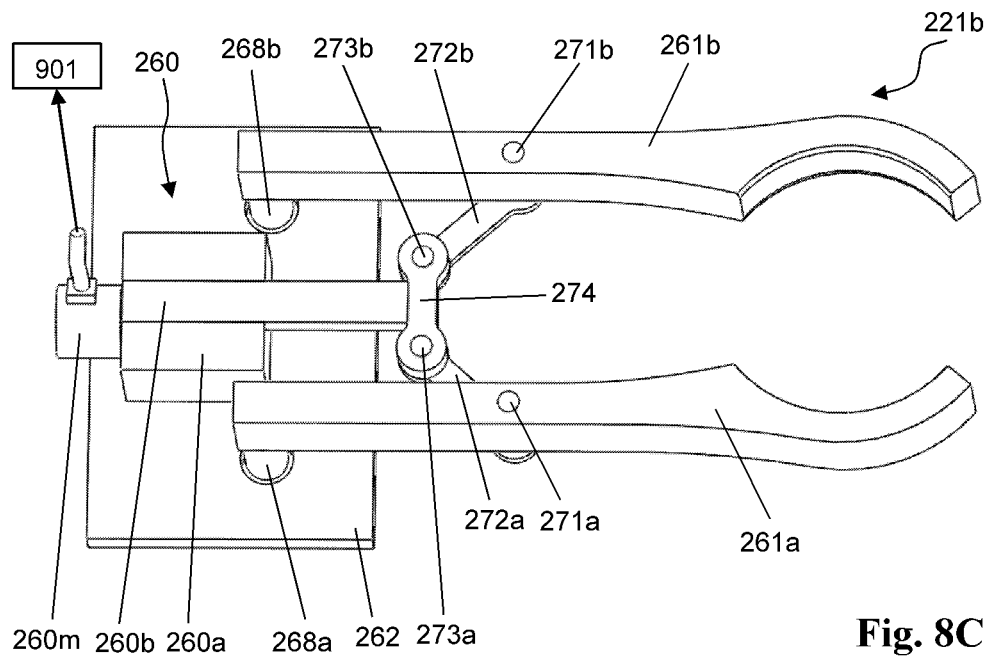
FIG. 8C shows an aerial view of a gripping mechanism.

Referring to FIG. 8C, a gripping mechanism 221b comprises: a support component 262 which is a rigid component; grippers 261a and 261b; a linear motion mechanism 260; a rigid component 274; shafts 273a and 273b; links 272a and 272b; shafts 271a and 271b. The linear motion mechanism 260 comprises a stationary member 260a and a moving member 260b which is configured to move linearly (along a horizontal direction) relative to the stationary member 260a. A pair of shafts 268a and 268b are constrained to rotate relative to the support component 262 respectively around a pair of vertical axes. The shaft 273a (or respectively 273b) is configured to connect the link 272a (or respectively 272b) to the rigid component 274 so that the link 272a (or respectively 272b) is constrained to rotate relative to the rigid component 274 around the axis of the shaft 273a (or respectively 273b). The shaft 271a (or 271b) is configured to connect the link 272a (or respectively 272b) to the gripper 261a (or respectively 261b) so that the gripper 261a (or respectively 261b) is rotatable relative to the link 272a (or respectively 272b). The gripper 261a (or 261b) is rigidly or fixedly connected to the shaft 268a (or respectively 268b). Thus, the gripper 261a (or respectively 261b) is constrained to rotate relative to the support component 262 around the axis of the shaft 268a (or respectively 268b). The parts 268a, 271a, 272a, and 273a are mirror images of the parts 268b, 271b, 272b, and 273b about a vertical plane which is parallel to the direction of the linear motion of the moving member 260b relative to the stationary member 260a; wherein said stationary member 260a is rigidly or fixedly connected to the support component 262. The rigid component 274 is rigidly or fixedly connected to the moving member 260b. Thus, the linear motion mechanism 260 may produce a horizontal motion of the rigid component 274 and hence anti-synchronous rotations in the grippers 261a and 261b. Each of the grippers 261a and 261b is rotated between a first end-position and a second end-position. At the first end-positions, the grippers 261a and 261b may together grip a container or other object. At the second end-positions, the grippers 261a and 261b can open up and release the container or object. The motion mechanism 260 is driven by a motor 260m. The gripping mechanism 221b may be connected to the computer system 901 in the sense that the motor 260m is connected to the computer system 901 via wires or by wireless means, and the computer system 901 may be configured to control the motions of the grippers 261a and 261b produced by the motion mechanism 260. Thus, the gripping mechanism 221b may be controlled by the computer system 901 to grip or loosen a container or other object.

A gripping mechanism may also be referred to as a gripper mechanism.

Figure 8D:
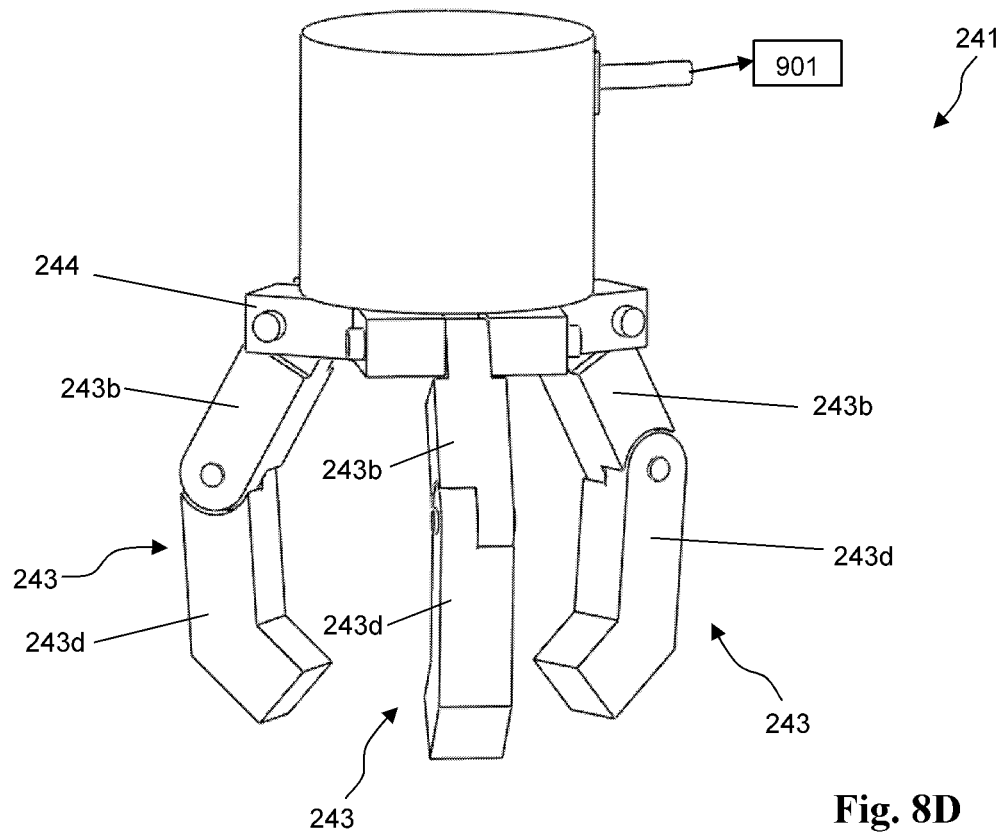
FIG. 8D shows an aerial view of a gripping mechanism

Referring to FIG. 8D, a gripping mechanism 241 comprises a support component (or base component) 244 and a plurality of gripper sub-mechanisms 243 which are referred to as robotic fingers. Each gripper sub-mechanism 243 comprises: grippers 243d and 243b wherein the gripper 243d is rotatable relative to the gripper 243b and the gripper 243b is rotatable relative to the support component 244; a motion mechanism comprising a motor (hidden in Figure) which drives a rotation of the gripper 243d relative to the gripper 243b; a motion mechanism comprising a motor (hidden in figure) which drives a rotation of the gripper 243b relative to the support component 244. (It should be noted that an optional transmission mechanism may be used to link the rotation of the grippers 243d and 243b and then only one motor is needed to drive the rotations of both grippers). The gripping mechanism 241 may be connected to the computer system 901 in the sense that all motors are connected to the computer system 901 via wires or by wireless means, and the computer system 901 may be configured to control the motions produced by the motors in the gripping mechanism 241. The gripping mechanism 241 may be controlled by the computer system 901 to grip or loosen a container or other object.

Figure 8E:
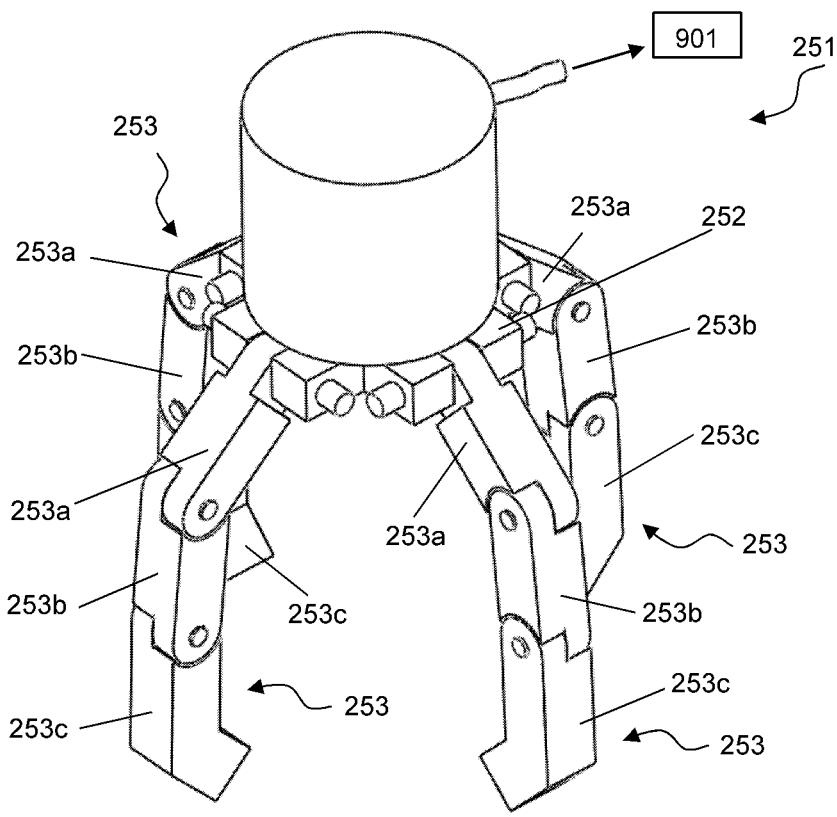
FIG. 8E shows an aerial view of a gripping mechanism.

Referring to FIG. 8E, a gripping mechanism 251 comprises: a support component (or base component) 252 and a plurality of gripper sub-mechanisms 253 which are referred to as robotic fingers. Each gripper sub-mechanism 253 comprises: grippers 253a, 253b and 253c, wherein the gripper 253c is rotatable relative to the gripper 253b, the gripper 253b is rotatable relative to the gripper 253a, and the gripper 253a is rotatable relative to the support component 252; a motion mechanism comprising a motor (hidden in Figure) which drives a rotation of the gripper 253c relative to the gripper 253b; a motion mechanism comprising a motor (hidden in Figure) which drives a rotation of the gripper 253b relative to the gripper 253a; a motion mechanism comprising a motor (hidden in figure) which drives a rotation of the gripper 253a relative to the support component 252. (It should be noted that an optional transmission mechanism may be used to link the rotation of the grippers 253a, 253b and 253c and then only one motor is needed to drive the rotations of both grippers). The gripping mechanism 251 may be connected to the computer system 901 in the sense that all motors are connected to the computer system 901 via wires or by wireless means, and the computer system 901 may be configured to control the motions produced by the motors in the gripping mechanism 251. The gripping mechanism 251 may be controlled by the computer system 901 to grip or loosen a container or other object.

The gripping mechanisms 241 (FIG. 8D) and 251 (FIG. 8E) are commonly referred to as robot hands. The gripper sub-mechanisms 243 and 253 are referred to as robot fingers. In fact, any robot hand may be used as a gripping mechanism for our purposes here. Robot hands may also be referred to as robot end effectors. Similarly, any robot arm may be used as a motion mechanism for our purpose.

Figure 9:
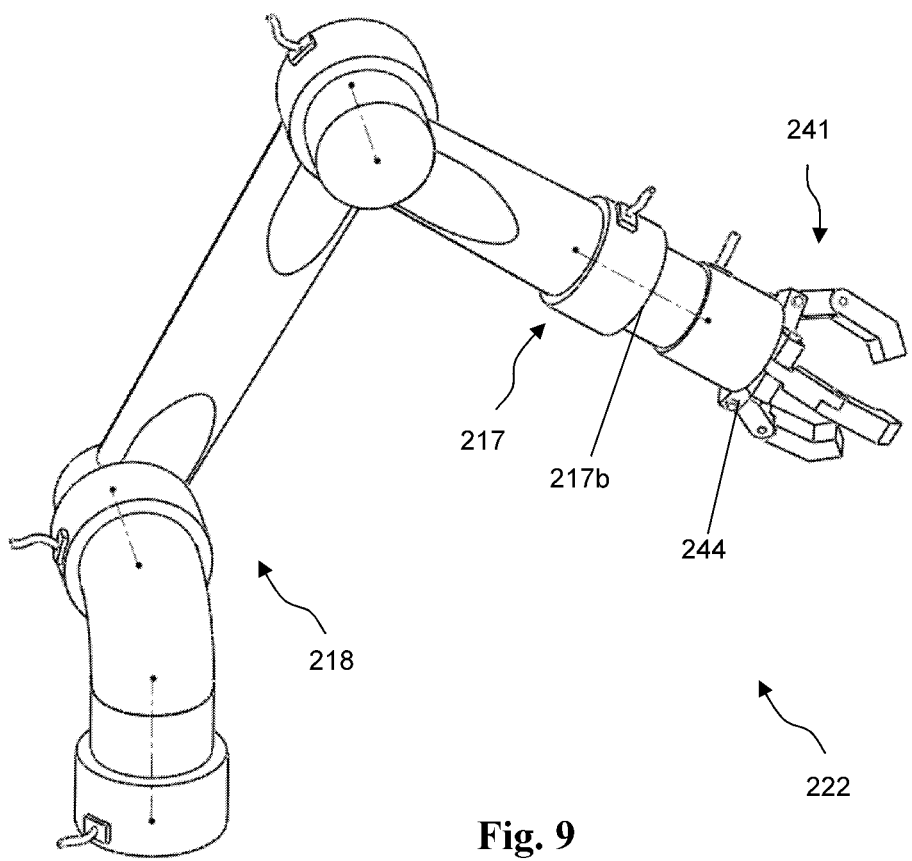
FIG. 9 shows an aerial view of a robotic apparatus.

Referring to FIG. 9, a robotic apparatus 222 comprises a robot arm 218 and a gripping mechanism 241. The gripping mechanism 241 is configured to grip or loosen a container or other object. The support component 244 of the gripping mechanism 241 is fixedly connected to the moving member 217b of the rotational motion mechanism 217 of the robot arm 218, so the robot arm can move the gripping mechanism 241. When the gripping mechanism 241 grips a container or other object, the robotic apparatus 222 can transfer the container or object to another position. The robot arm 218 and the gripping mechanism 241 may be connected to the computer system 901 via wires or by wireless means, and the computer system 901 may be configured to control the motions produced the motion mechanism in the robotic apparatus 222. The robotic apparatus 222 may be controlled by the computer system 901 to grip a container or other object, and then move the container or object, and then release the container or object at a different position. The robotic apparatus 222 may substitute a transfer apparatus to grip and move a container or other object. The robotic apparatus 222 may also substitute a dispensing apparatus to grip and move a container as to dispense food or food ingredients from the container.

It should be noted that the gripping mechanism 241 of the robotic apparatus 222 may be substituted by the gripping mechanism 251 or other gripping mechanism.

It should be noted that the gripping mechanisms 221, 221a, 221b, 241 and 251 are some realizations of gripping mechanisms. They may be substituted by other types of gripping mechanism such as electric gripper, pneumatic gripper, etc.

Figure 10:
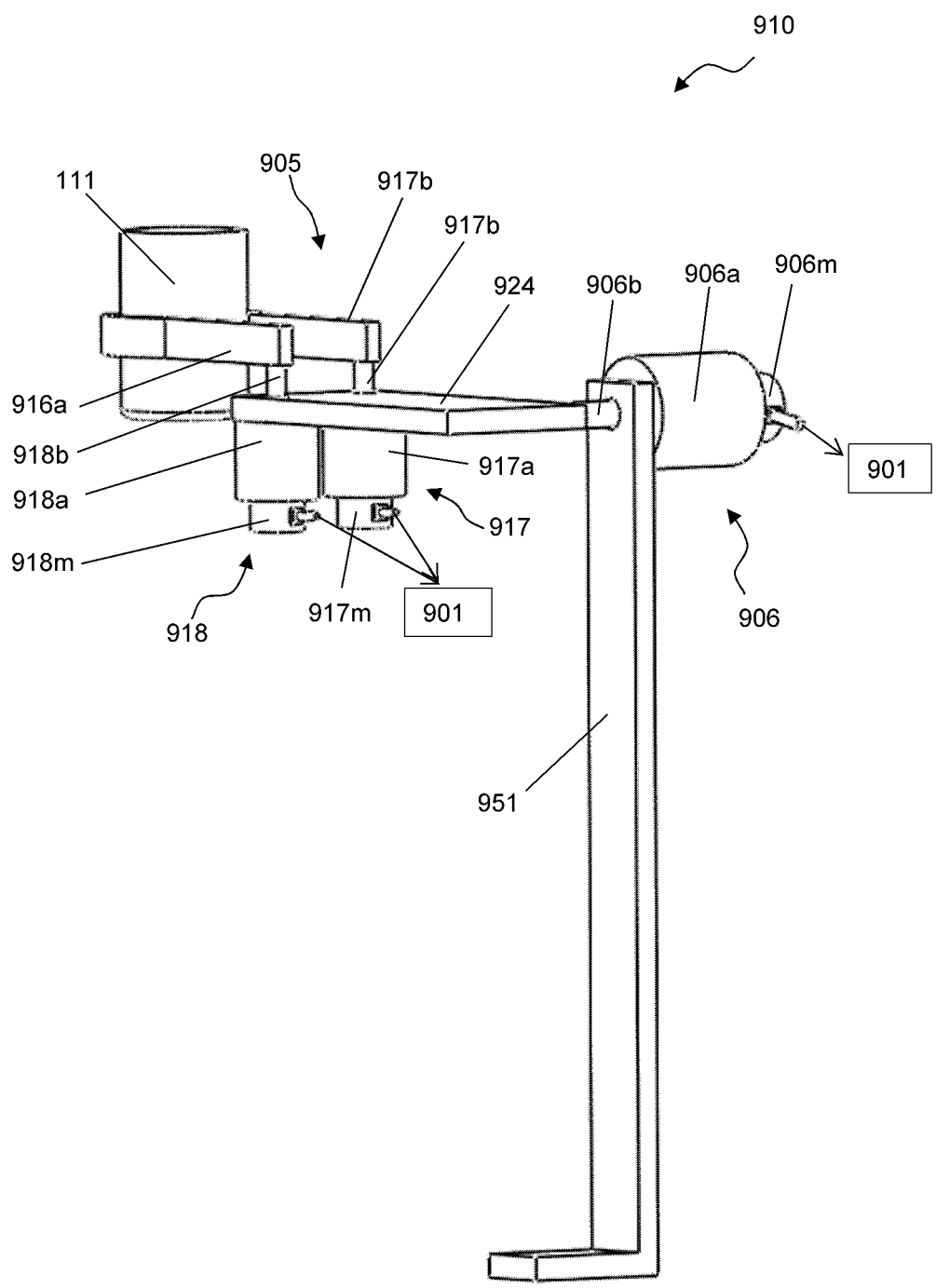
FIG. 10 shows an aerial view of an ingredient dispensing apparatus configured to dispense food ingredients from an ingredient container.

Referring to FIG. 10, an ingredient dispensing apparatus 910 comprises a container gripping mechanism 905 comprising: gripping devices (also referred to as grippers) 916a and 916b; rotational motion mechanism 917 and 918. The gripping device 916a or 916b may comprise a rubber or silica gel or other elastic material. The rotational motion mechanism 918 comprises a stationary member 918a and a moving member 918b. The rotational motion mechanism 917 comprises a stationary member 917a and a moving member 917b. The stationary members 918a and 917a are fixedly connected to a support component 924. The gripping device 916a is rigidly or fixedly connected to the moving member 918b. The rotational motion mechanism 918 can produce a rotation of the moving member 918b and hence of the gripping device 916a relative to the stationary members 918a. Similarly, the gripping device 916b is rigidly or fixedly connected to the moving member 917b. The rotational motion mechanism 917 can produce a rotation of the moving member 917b and hence of the gripping device 916b relative to the stationary members 917a. The axis of rotation of the rotational motion mechanism 918 is parallel to the axis of rotation of the rotational motion mechanism 917, and the rotational motion mechanisms 918 and 917 are configured to rotate the respective gripping devices 916a and 916b anti-synchronously around a pair of parallel axes. Each of the gripping devices 916a and 916b is rotated between a first end-position and a second end-position. At the first end-positions, the gripping devices 916a and 916b may together grip an ingredient container 111. At the second end-positions, the gripping devices 916a and 916b can open up and release the container.

The ingredient dispensing apparatus 910 further comprises a rotational motion mechanism 906 comprising a stationary member 906a and a moving member 906b. The moving member 906b is rigidly or fixedly connected to the support component 924 of the container gripping mechanism 905, and the stationary member 906a is fixedly connected to the ground via a rigid connector 951. The rotational motion mechanism 906 may produce a back-and-forth rotation of the moving member 906b and hence of the support component 924 between a first end-position and a second end-position, relative to the stationary member 906a (or equivalently, relative to the rigid connector 951). The rotational motion mechanism 906, 917 or 918 is driven by a motor 906m, 917m or respectively 918m, which is connected to the computer system 901 via wires or by wireless means, and the computer system 901 may be configured to control the motions produced by the motion mechanisms of the ingredient dispensing apparatus 910. The ingredient dispensing apparatus 910 may be controlled by the computer system 901 to grip an ingredient container 111, and then rotate it a pre-assigned angle (e, g, 150 degrees) as to dispense the food or food ingredients contained in the ingredient container 111.

When the support component 924 of the container gripping mechanism 905 is rotated to the first end-position of the back-and-forth rotation, the gripping devices 916a and 916b in the container gripping mechanism 905 can be rotated to their first end-positions to grip an ingredient container 111, wherein the ingredient container 111 may contain or otherwise hold food or food ingredients. When the ingredient container 111 is gripped, the axis of the gripped ingredient container 111 is configured to be vertical (although this is not a strict requirement). When the ingredient container 111 is being gripped by the container gripping mechanism 905, the computer system 901 would control the rotational motion mechanism 906 to rotate the support component 924 of the container gripping mechanism 905 to the second end-position. This way, the ingredient container 111 and the gripping devices 916a and 916b are rotated with the support component 924 and the food or food ingredients contained in the ingredient container 111 can be dispensed as the ingredient container 111 is turned. The angle of rotation from the first end-position to the second end-position is between 90 and 180 degrees (e.g., 150 degrees). After the dispensing of the food or food ingredients contained or held in the ingredient container 111, the gripped container and (the support component of) the container gripping mechanism 905 may be returned to the first end-position, when the rotational motion mechanism 906 rotates the support component 924 backward.

It should be noted that the ingredient dispensing apparatus 910 comprises:
(1) the support component 924, referred to as a first support component of the ingredient dispensing apparatus 910;
(2) the gripping devices 916a and 916b, each of which is rotatable relative to the first support component, wherein the axes of rotations of the gripping devices relative to the first support component are configured to be mutually parallel;
(3) the rigid connector 951, referred to as a second support component of the ingredient dispensing apparatus 910;
(4) a rotational motion mechanism 906 configured to rotate the first support component 924 relative to the second support component 951, around the (horizontal) axis of the rotational motion mechanism 906;
(5) a gripping mechanism configured to grip and loosen an ingredient container 111.

Figure 11A:
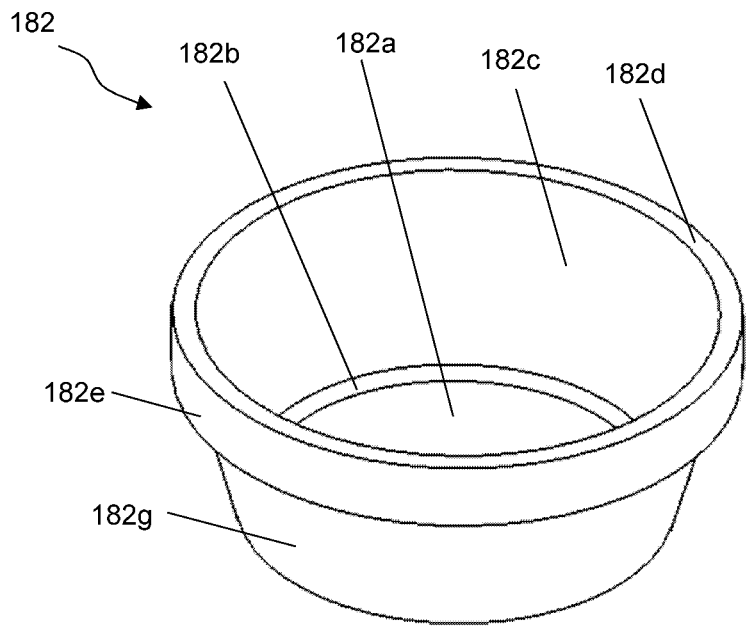
FIG. 11A shows a view of a food container.
Figure 11B:
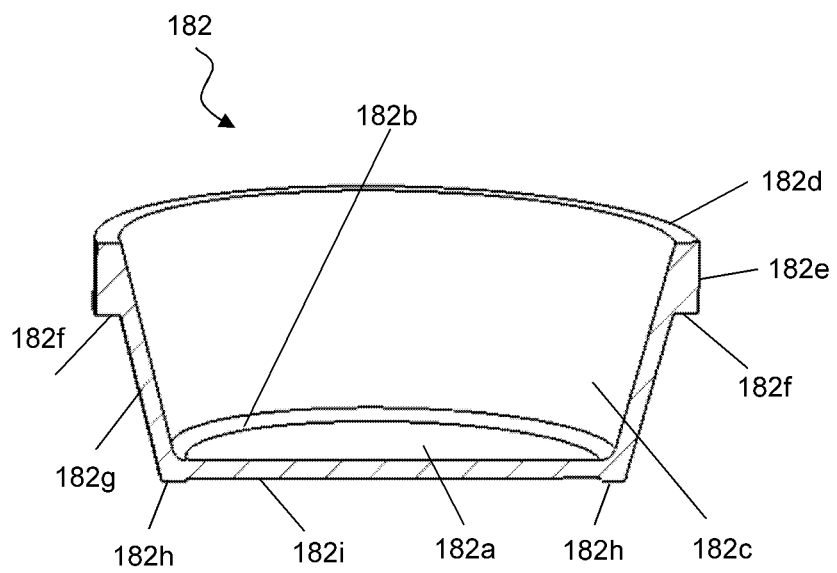
FIG. 11B shows a cut view of the food container.

Referring to FIGS. 11A-11B, a food container 182 in the shape of a bowl is configured to contain a cooked food. The interior surface of the food container 182 comprises an interior flat bottom surface 182a in the shape of a circle, a side surface 182c of conical shape, and a smooth surface 182b between the flat bottom 182a and the side surface 182c. The smooth surface 182b may be a part of a toroidal surface. The exterior surface of the food container 182 comprises a cylindrical surface 182e, a planar ring 182f, a side surface 182g of conical shape, a ring-shaped surface 182h, and an exterior bottom surface 182i. The bottom surface 182i has a flat part in the shape of a circle. The axes of the conical surfaces 182c and 182g, and the axis of the cylindrical surface 182e are configured to coincide with each other. The axis of the conical surface 182c (or 182g) is called the axis of the food container 182. The bottom surfaces 182a and 182i are configured to be perpendicular to the axis of the food container 182. The food container 182 is said to be positioned upright, if the axis of the food container 182 is positioned vertically, and the exterior bottom surface 182i is lower than the interior bottom surface 182a. The food container 182 is configured to hold a cooked food when the food container 182 is positioned upright. The lowest point of the food container 182, when positioned upright, lies in the ring-shaped surface 182h. Although this is not a strict requirement, the food container 182 may be configured to be rotationally symmetric around the axis of the food container 182.

Figure 12A:
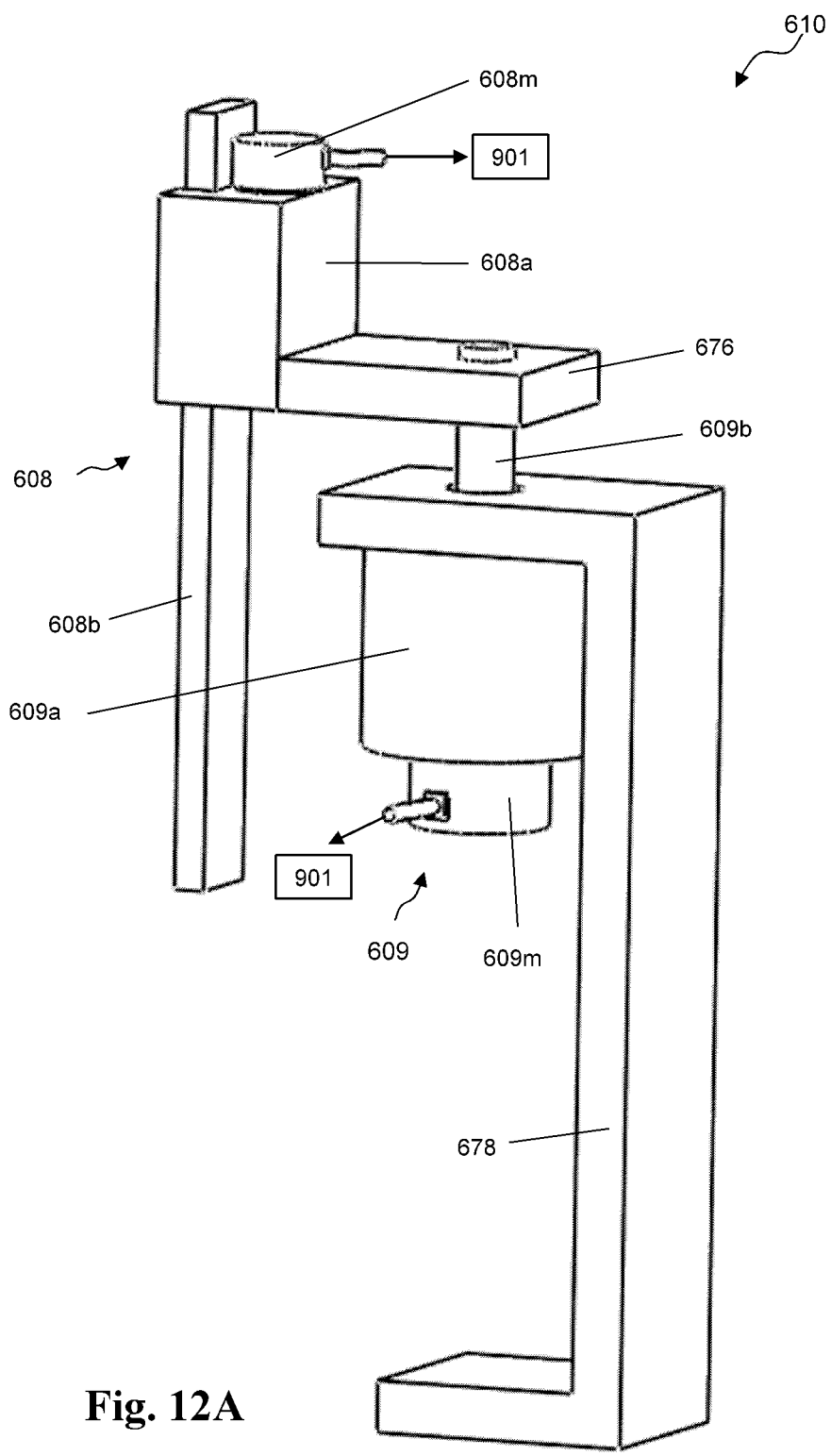
FIG. 12A shows an aerial view of a motion mechanism.

Referring to FIG. 12A, a motion mechanism 610 comprises a vertical motion mechanism 608 comprising a stationary member 608a and a moving member 608b which is configured to be moved vertically and linearly relative to the stationary member 608a. The motion mechanism 610 further comprises a rotational motion mechanism 609 comprising a stationary member 609a and a moving member 609b. The moving member 609b is rigidly or fixedly connected to the stationary member 608a of the vertical motion mechanism 608 via a connector 676, and the stationary member 609a is fixedly connected to the ground via a support component 678. The rotational motion mechanism 609 may produce a back-and-forth rotation of the moving member 609b and hence of the stationary member 608a between a first end-position and a second end-position, relative to the stationary member 609a (or equivalently, relative to the support component 678). The motion mechanism 608 or 609 is driven by a motor 608m or respectively 609m, which is connected to the computer system 901 via wires or by wireless means, and the computer system 901 may be configured to control the motions produced by the motion mechanism 610.

Figure 12B:
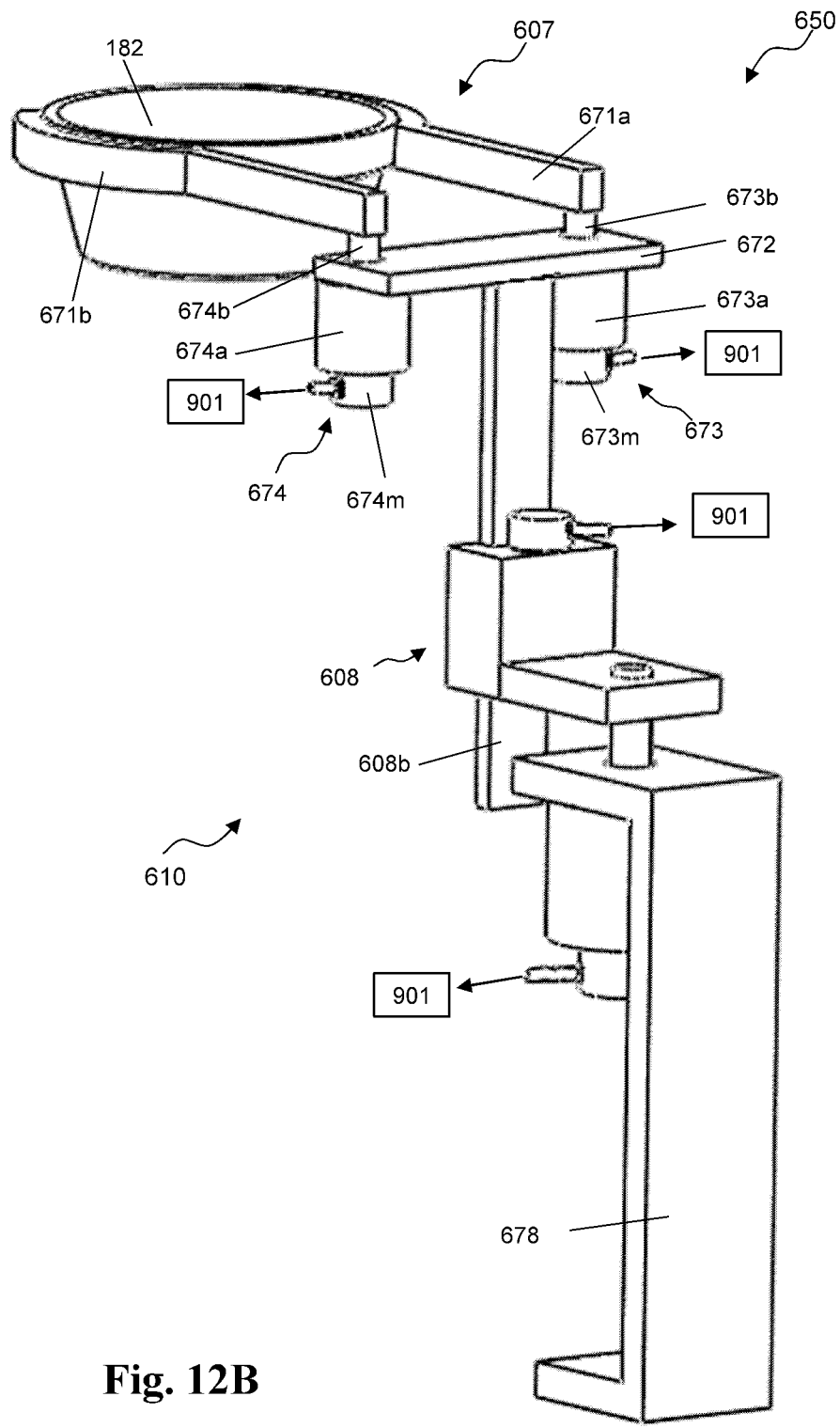
FIG. 12B shows an aerial view of a transfer apparatus.

Referring to FIG. 12B, a transfer apparatus 650 comprises the motion mechanism 610 and a gripping mechanism 607 comprising: gripping devices (also referred to as grippers) 671a and 671b; rotational motion mechanism 673 and 674. The gripping device 671a or 671b may comprise a rubber or silica gel or other elastic material. The rotational motion mechanism 673 comprises a stationary member 673a and a moving member 673b. The rotational motion mechanism 674 comprises a stationary member 674a and a moving member 674b. The stationary members 673a and 674a are fixedly connected to a support component 672. The gripping device 671a is rigidly or fixedly connected to the moving member 673b. The rotational motion mechanism 673 can produce a rotation of the moving member 673b and hence of the gripping device 671a relative to the stationary members 673a. Similarly, the gripping device 671b is rigidly or fixedly connected to the moving member 674b. The rotational motion mechanism 674 can produce a rotation of the moving member 674b and hence of the gripping device 671b relative to the stationary members 674a. The axis of rotation of the rotational motion mechanism 673 is parallel to the axis of rotation of the rotational motion mechanism 674, and the rotational motion mechanisms 673 and 674 are configured to rotate the respective gripping devices 671a and 671b anti-synchronously around a pair of parallel axes. Each of the gripping devices 671a and 671b is rotated between a first end-position and a second end-position. At the first end-positions, the gripping devices 671a and 671b may together grip a food container 182. At the second end-positions, the gripping devices 671a and 671b can open up and release the food container 182. The motion mechanism 673 or 674 is driven by a motor 673m or respectively 674m, which is connected to the computer system 901 via wires or by wireless means, and the computer system 901 may be configured to control the motions produced by the motion mechanisms of the gripping mechanism 607.

The moving member 608b of the vertical motion mechanism 608 is rigidly or fixedly connected to the support component 672 of the gripping mechanism 607. The vertical motion mechanism 608 can produce a vertical linear motion of the moving member 608b and hence of the support component 672 relative to the stationary member 608a. The rotational motion mechanism 609 may produce a back-and-forth rotation of the moving member 609b and hence of the stationary member 608a between a first end-position and a second end-position, relative to the stationary member 609a (or equivalently, relative to the support component 678). Thus, the gripping mechanism 607 and the gripped food container 182 may be moved by a vertical motion, a rotational motion, or the combination of a vertical motion and a rotational motion, as to transfer the food container from one position to another position. The motion mechanism 610 and the gripping mechanism 607 are connected to the computer system 901 via wires or by wireless means, and the computer system 901 may be configured to control the motions produced by the motion mechanisms of the transfer apparatus 650. The transfer apparatus 650 may be controlled by the computer system 901 to grip a food container 182, and then move the food container vertically, and then horizontally, and then release the food container 182 at a different position.

It should be noted that the transfer apparatus 650 comprises the followings:
(1) the gripping mechanism 607 configured to grip or release a food container 182, wherein the gripping mechanism 607 comprises the support component 672 referred to as a first support component of the transfer apparatus 650;
(2) a connector 676 referred to as the second support component of the transfer apparatus 650;
(3) a vertical motion mechanism referred to as a first motion mechanism configured to produce a vertical linear motion in the first support component 672 relative to the second support component 676;
(4) a support component 678 referred to as the third support component of the transfer apparatus 650;
(5) a rotational motion mechanism referred to as a second motion mechanism, configured to produce a rotation of the second support component 676 relative to the third support component 678.

The transfer apparatus 650 may be used to grip a food container 182 which is positioned upright and may move the said food container 182 linearly in vertical direction, or horizontally rotation, or by a combination of these, and then it may transfer the food container 182 at a position which is different from a previous position.

It should be noted that the computer system 901 be configured to dynamically control the rotations and/or speed of the motion mechanisms in the transfer apparatus 650.

Figure 12C:
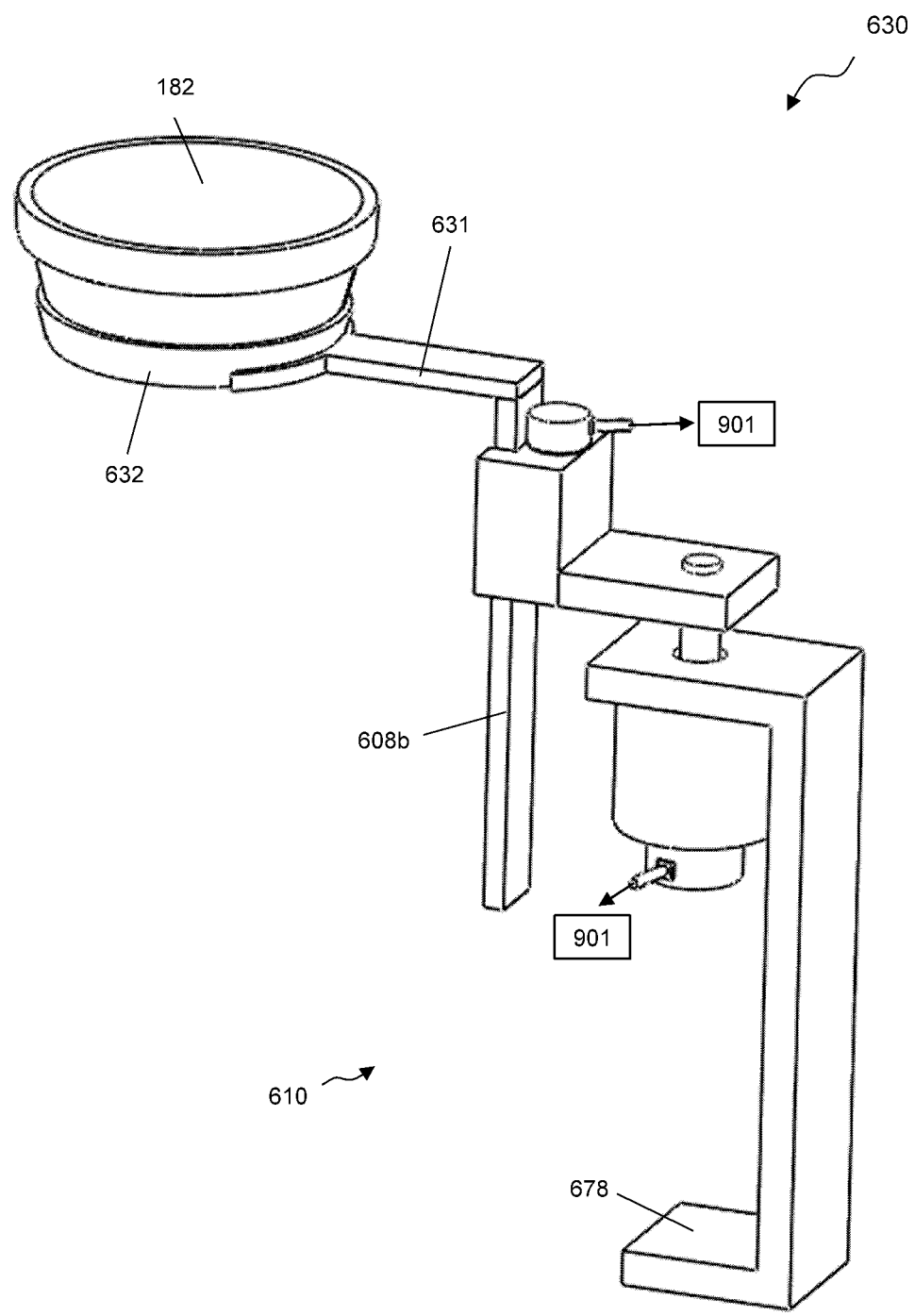
FIG. 12C shows an aerial view of a transport apparatus.

Referring to FIG. 12C, a transport apparatus 630 comprises the motion mechanism 610 and a container holder 632 comprising a solid shape to position or hold a food container 182. The container holder 632 is fixedly or rigidly connected to the moving member 608b of the vertical motion mechanism 608 via a rigid connector 631. The vertical motion mechanism 608 can produce a vertical linear motion of the moving member 608b and hence of the container holder 632 relative to the stationary member 608a. The rotational motion mechanism 609 may produce a back-and-forth rotation of the moving member 609b and hence of the stationary member 608a between a first end-position and a second end-position, relative to the stationary member 609a (or equivalently, relative to the support component 678). The container holder 632 may optionally restrict the movement of the food container 182 when the container holder 632 is moved. Thus, the container holder 632 and the food container 182 may be moved by a vertical motion, a rotational motion, or the combination of a vertical motion and a rotational motion, as to transfer the food container from one position to another position. The motion mechanism 610 is connected to the computer system 901 via wires or by wireless means, and the computer system 901 may be configured to control the motions produced by the motion mechanisms of the transport apparatus 630. A food container 182 can be placed on the container holder 632 and can be moved to a certain position.

Figure 12D:
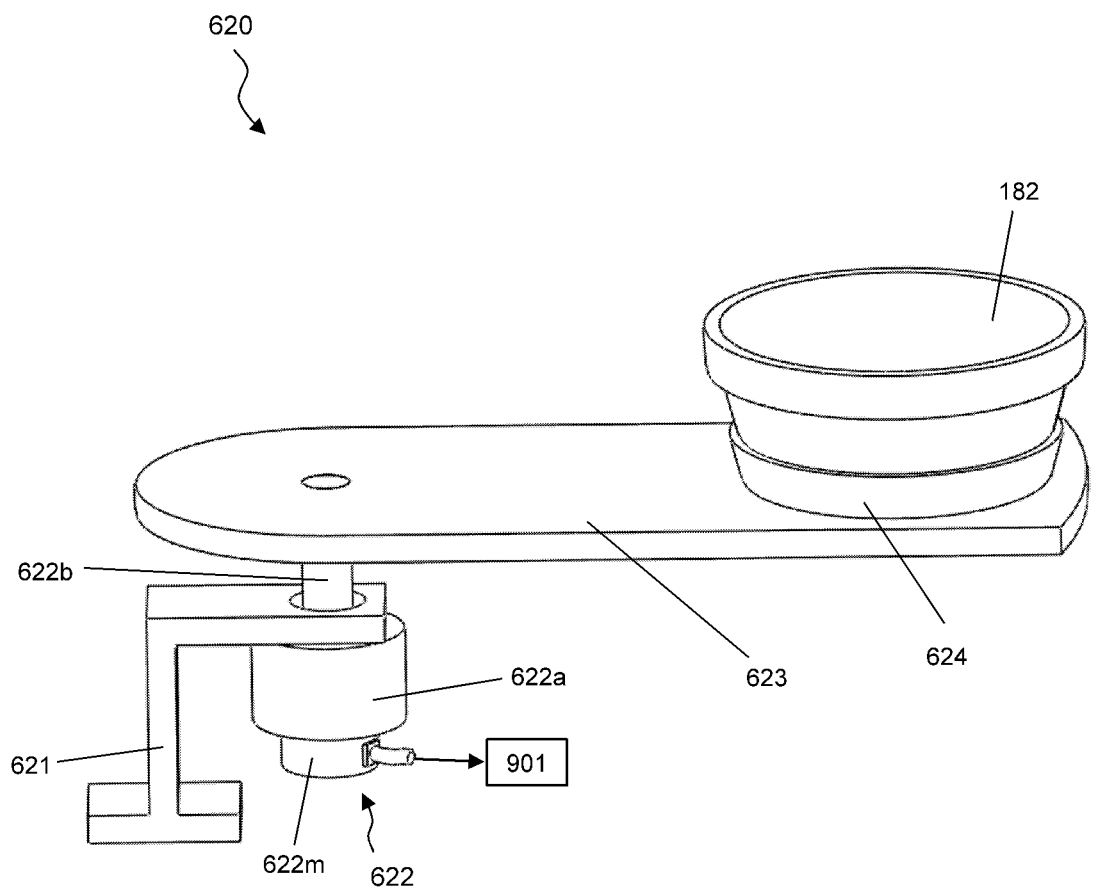
FIG. 12D shows an aerial view of a transport apparatus.

Referring to FIG. 12D, a transport apparatus 620 comprises a container holder 624 and a rotational motion mechanism 622 comprising a stationary member 622a and a moving member 622b. The moving member 622b is rigidly or fixedly connected to the container holder 624 via a rigid connector 623, and the stationary member 622a is fixedly connected to the ground via a support component 621. The rotational motion mechanism 622 may produce a back-and-forth rotation of the moving member 622b and hence of the container holder 624 between a first end-position and a second end-position, relative to the stationary member 622a (or equivalently, relative to the support component 621). The motion mechanism 622 is driven by a motor 622m, which is connected to the computer system 901 via wires or by wireless means, and the computer system 901 may be configured to control the motions produced by the motion mechanism 622 of the transport apparatus 620.

Figure 12E:
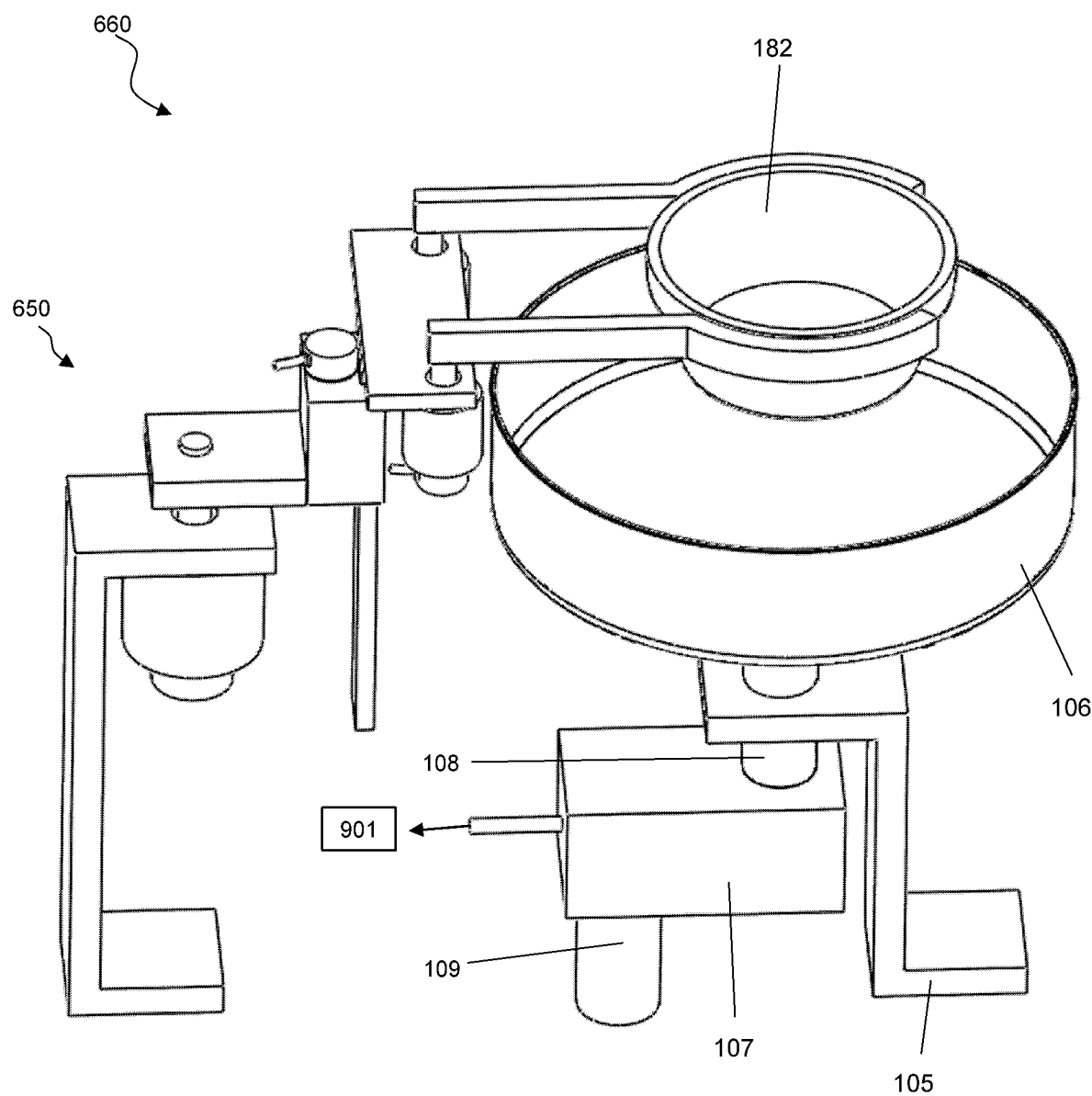
FIG. 12E shows an aerial view of a receiving apparatus comprising the transfer apparatus of FIG. 12B.

Referring to FIG. 12E, a receiving apparatus 660 comprises: a sink 106 and a garbage disposal 107 which is connected to the sink 106 via a pipe 108, right below the sink; and a transfer apparatus 650 (as in FIG. 12B). The sink 106 and the garbage disposal 107 are fixedly connected to the ground via a connector 105; and a pipe 109 is connected to the garbage disposal 107 to flow waste to a sewage or a wastewater tank. The positions of the support component 678 of the transfer apparatus 650 and the connector 105 are fixed relative to each other. When the food container 182 gripped by the gripping mechanism 607 of the transfer apparatus 650 is moved to a receiving position, the cooking container 100 of the cooking apparatus 120 can be rotated to a "dispensing position" by the unloading motion mechanism of the cooking apparatus 120, so that a cooked food held in the cooking container 100 can be dispensed into the food container 182. When the gripped food container 182 is moved away from the receiving position, the cooking container 100 of the cooking apparatus 120, in case it contains wastewater, can be rotated to the dispensing position by the unloading motion mechanism of the cooking apparatus 120, as to dispense the wastewater to the sink 106. The garbage disposal 107 is connected to the computer system 901 via wires or by wireless means, and the computer system 901 may be configured to control the garbage disposal 107.

It should be noted that the transfer apparatus 650 of the receiving apparatus 660 may be substituted by the transport apparatus 630 or 620. The transfer of the food container 182 may be realized by a transfer apparatus or other apparatus which configured to transfer and release a food container to a certain position.

Figure 13A:
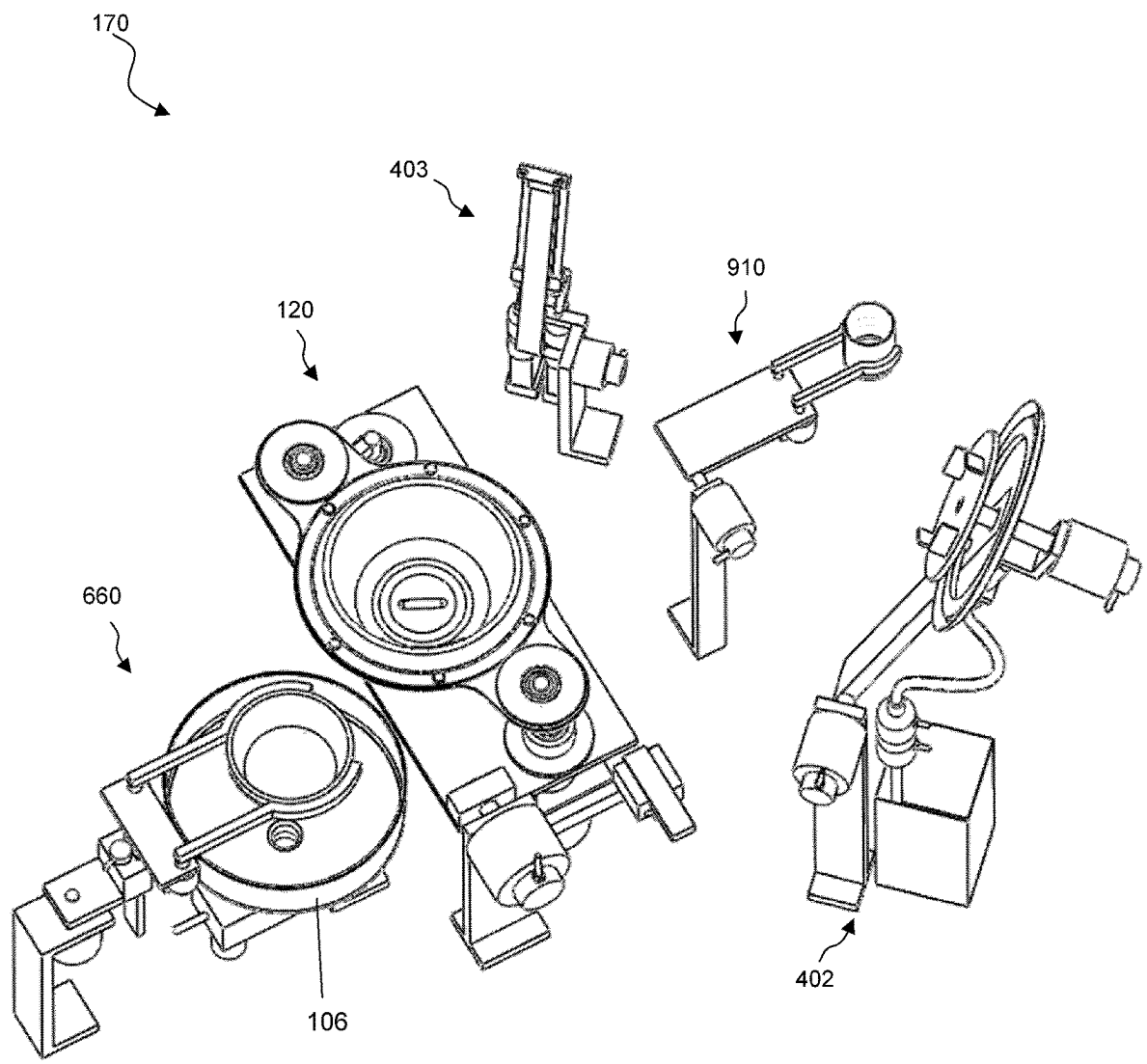
FIGS. 13A-13E show aerial views of a cooking sub-system comprising the cooking apparatus of FIG. 5, the transfer apparatus of FIG. 12B, the ingredient dispensing apparatus of FIG. 10, the cleaning apparatus of FIG. 7A and the liquid dispensing apparatus of FIG. 6B.
Figure 13B:
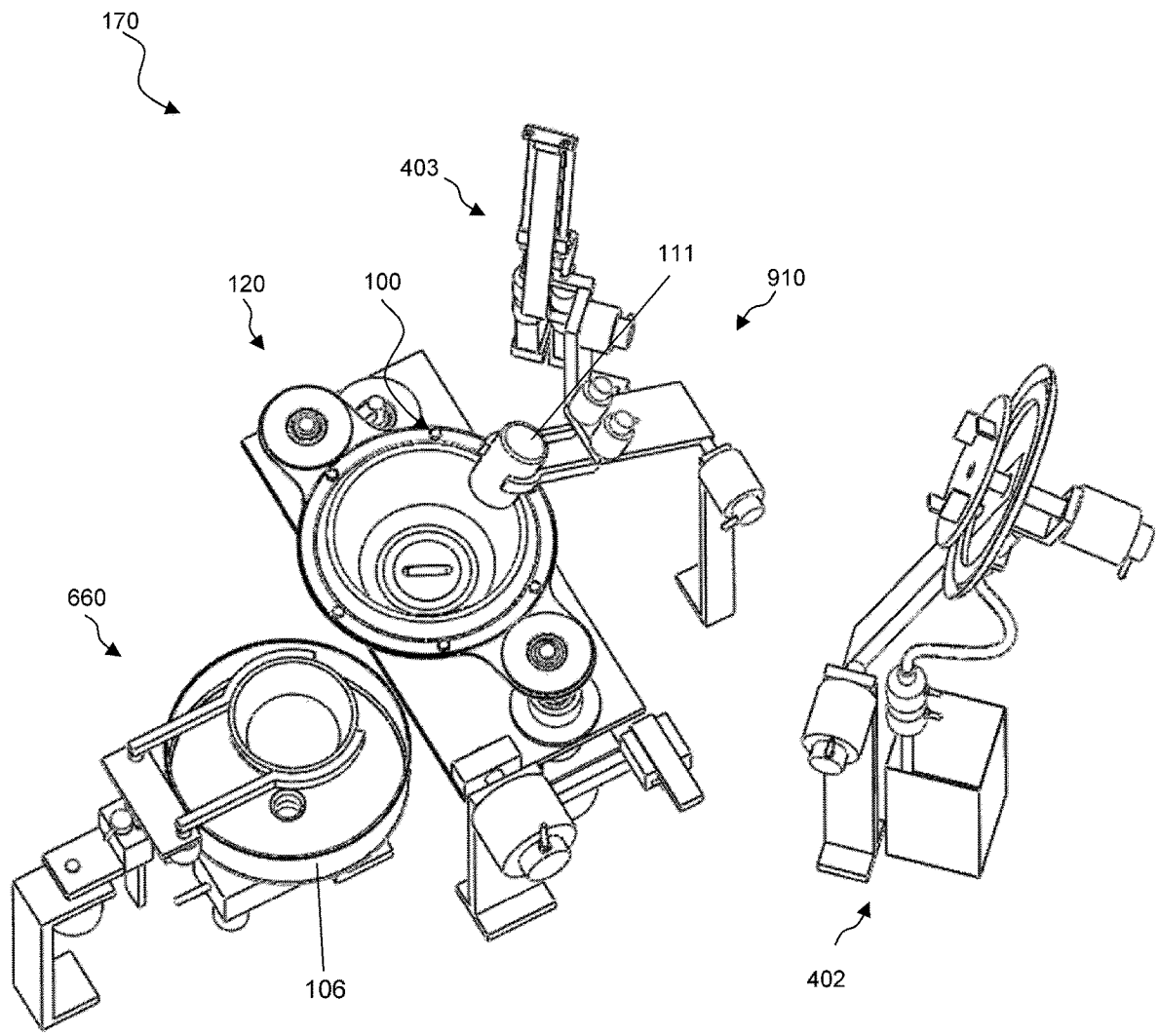
Figure 13C:
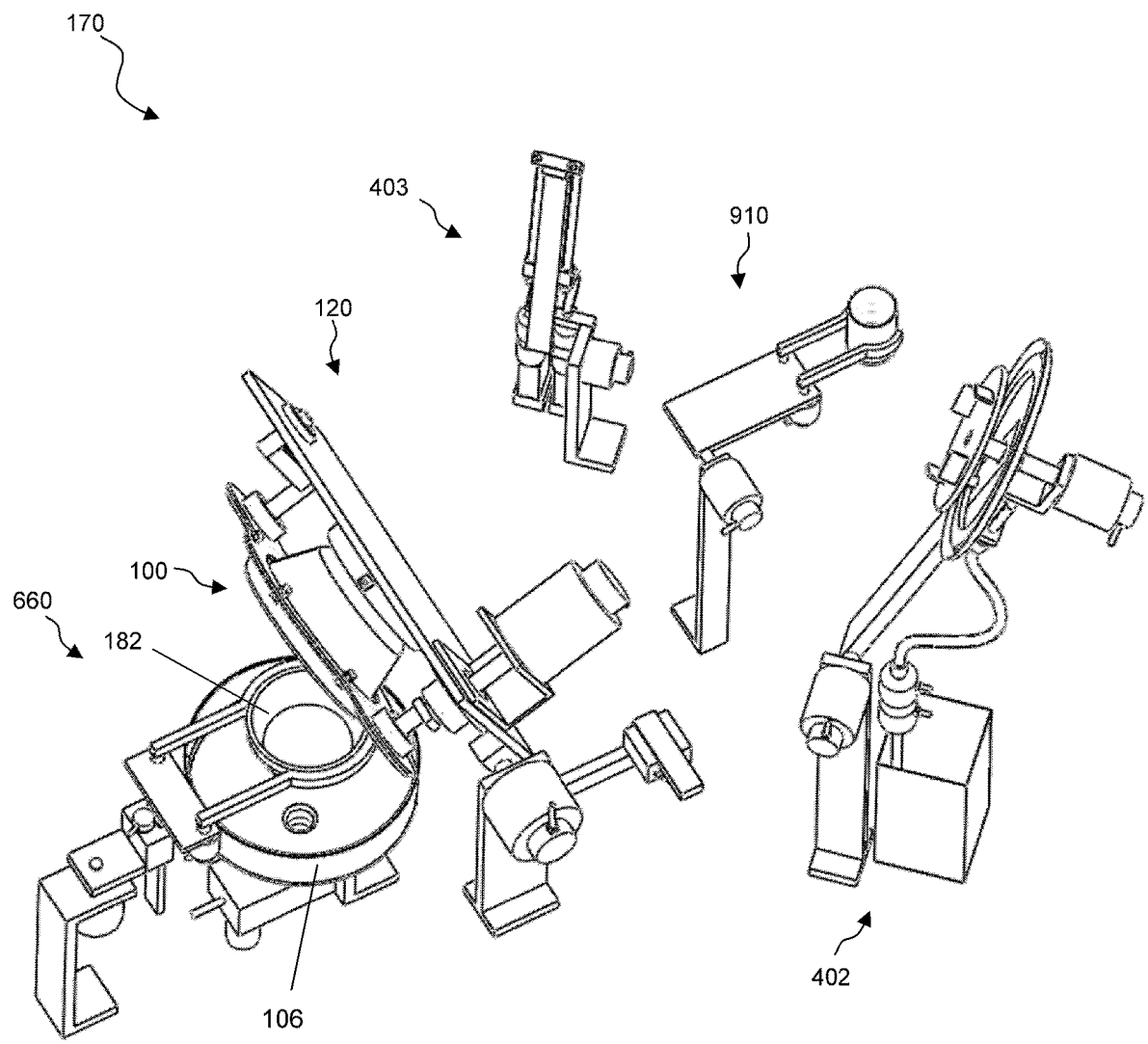

Referring to FIGS. 13A-13C, a cooking sub-system 170 comprises the cooking apparatus 120 and the receiving apparatus 660. The support component 678 of the transfer apparatus 650 is configured to be rigidly or fixedly connected to the support component 156 of the cooking apparatus 120 (the connectors are not shown in figure). Since the support component 169 of the cooking apparatus 120 is rotated from the first end position to the second end position, a cooked food or wastewater in the cooking container 100 may be dispensed into a food container 182 or respectively the sink 106. It should be noted that wastewater may be present in the cooking container 100 after a cleaning using water, as discussed below.

The cooking sub-system 170 further comprises a cleaning apparatus 402 (as in FIG. 7A). The support component 436 of the cleaning apparatus 402 is configured to be rigidly or fixedly connected to the support component 156 of the cooking apparatus 120 (the connector is not shown in figure, but can be easily done; for example, both the support component 156 and the support component 436 may be fixedly connected to the ground).

When the support component 169 of the cooking sub-apparatus 110 is at the first end position, the moving member 103b in the braking mechanism may be sled as to a position as to touch and press on the support component 169. Thus, the support component 169 is limited by the moving member 103b; and the support component 169 of the cooking sub-apparatus 110 is braked by the braking mechanism from moving the moving member 103b horizontally.

When the support component 169, at the first end position, is braked by the braking mechanism, the cooking container 100 may be able to hold food or food ingredients for cooking and the stirring motion mechanism may be able to produce a motion in the cooking container 100 as to stir, mix or distribute the food or food ingredients contained in the cooking container 100. When a cooked food is completed, the moving member 103b of the braking mechanism may be sled backward to another position, and the support component 169 of the cooking sub-apparatus 110 may be rotated in the upward direction, and thus the support component 169 and the cooking container 100 may be rotated by the unloading motion mechanism as to dispense the cooked food from the cooking container 100.

The cleaning apparatus 402 may clean the cooking container 100 when the cover 423 and the support component 431 are rotated to the first end position, right above the cooking container 100, and when the support component 169 of the cooking apparatus 120 is rotated to the first end position relative to the support component 156, and when the cooking container 100 is moved to a certain fixed position by the stirring motion mechanism of the cooking sub-apparatus 110 of the cooking apparatus 120.

Figure 13D:
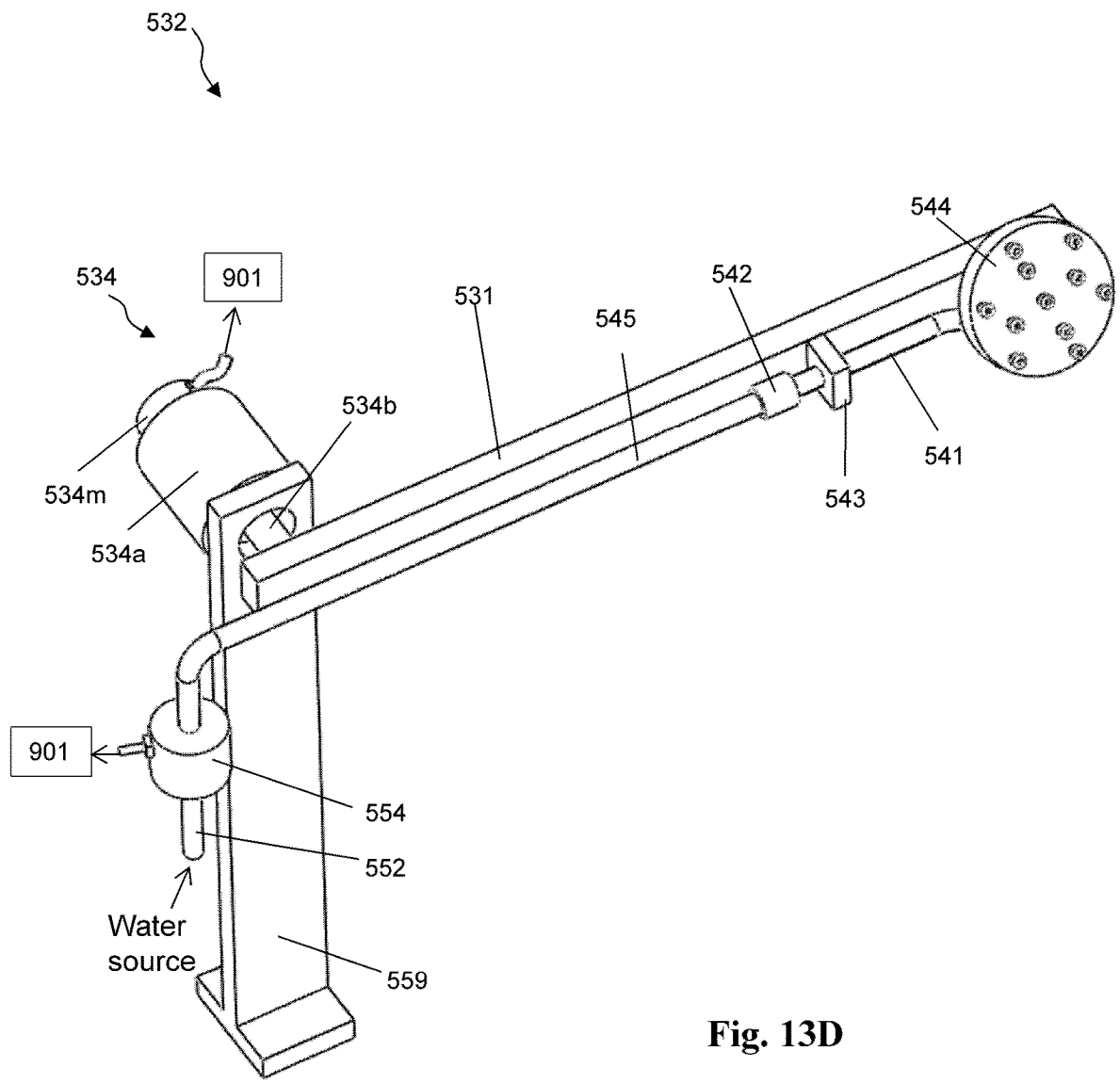
Figure 13E:
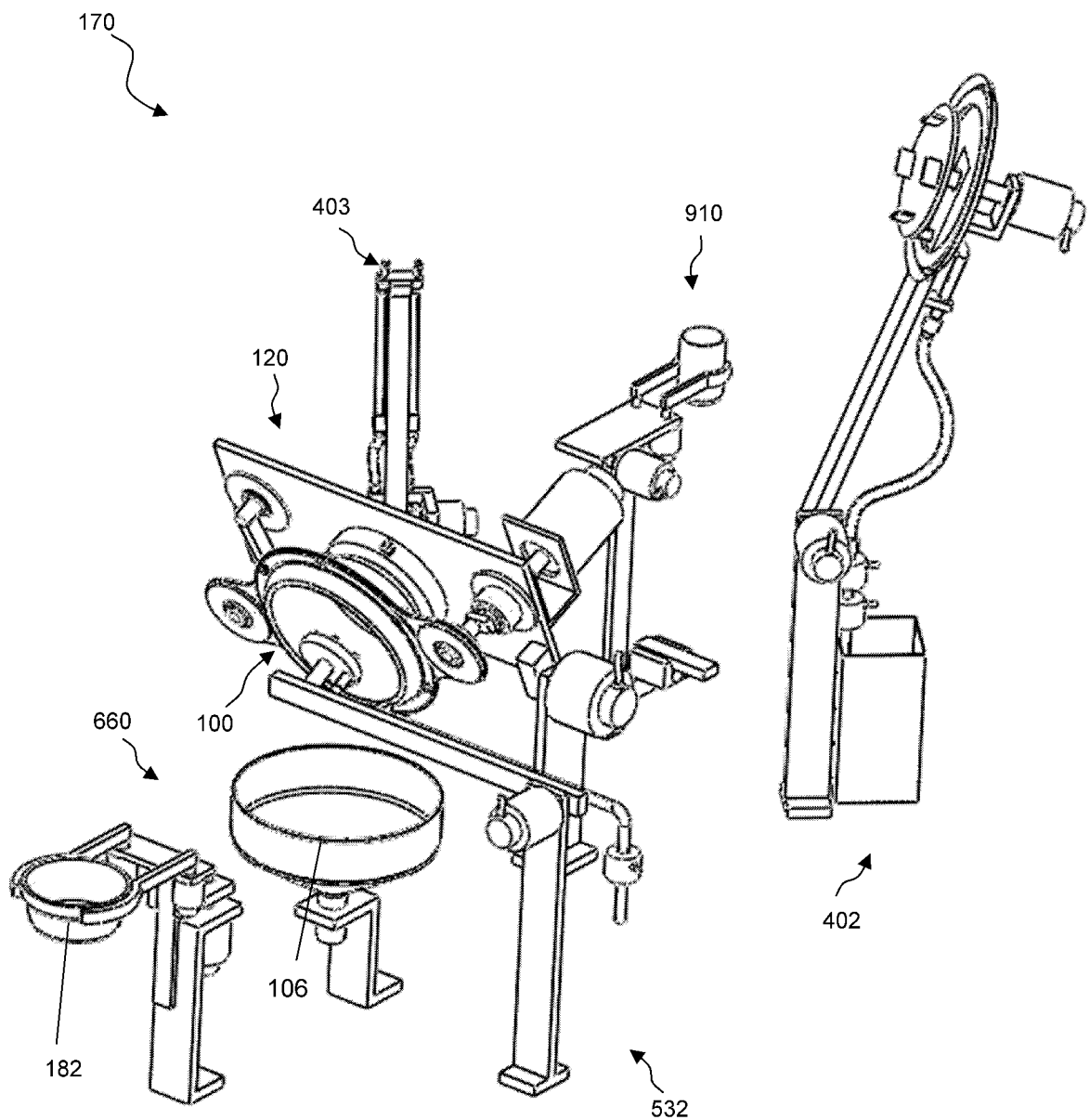

Referring to FIGS. 13D-13E, the cooking sub-system 170 further comprises a (second) cleaning apparatus 532 comprising sprays 544, water pipes 541, 552, and a flexible pipe 545, wherein the pipe 541 is connected to the pipe 545 by a pipe connector 542, and the pipe 541 is connected to the sprays 544. The water pipes 552, 545 and 541 are configured to flow water from a water source (e.g., tap water or water tank) to the sprays 544. Valves 554 are configured to control the timing of the water flow to the sprays 544. The sprays 544 are configured to spray water onto the cooking container 100 as to clean the cooking container after a cooked food is dispensed from the cooking container and the cooking container is at the dispensing position, as in FIG. 13E. Then, the sprayed water may wash the cooking container and then drop into the sink 106 which is underneath the cooking container. (It should be noted that valves 554 may be substituted by pumps.) Some flow sensors (not shown in figure) are used to monitor the flow rate in the pipes 552 and 545. The valves and flow sensors are all connected to the computer system 901 so that the water flow in the pipes 545 and 541 may be controlled.

The cleaning apparatus 532 further comprises: a rigid component 531; a rotational motion mechanism 534 comprising a moving member 534b and a stationary member 534a which is constrained to rotate relative to the stationary member 534a. The moving member 534b is fixedly connected to the rigid component 531, and the stationary member 534a is fixedly connected to the ground via a rigid component 559 referred to as a support component. The rotational motion mechanism 534 may produce a back-and-forth rotation of the moving member 534b and hence of the rigid component 531, relative to the stationary member 534a (or equivalently, relative to the rigid component 559). The motion mechanism 534 is driven by a motor 534m, which is connected to the computer system 901 via wires or by wireless means, and the computer system 901 may be configured to control the motions produced by the motion mechanism 534.

The connector 543 and the sprays 544 are fixedly connected to the rigid component 531, and the rotational motion mechanism 534 can produce a back-and-forth rotation of the rigid component 531 relative to the rigid component 559. Thus, the rotational motion mechanism 534 can produce a back-and-forth rotation of the sprays 554 relative to the rigid component 559. When a cooked food is dispensed from the cooking container 100 and the cooking container is at the dispensing position, and the food container 182 containing the cooked food is transferred to a different position, the valves 554 control the flow of water to the pipe 541 and spray it by the sprays 544 to clean the cooking container 100, and the motion mechanism 534 can control the sprays 544 to rotate back-and-forth relative to the rigid component 559 as to spray water all over the cooking container 100. Then, the sprayed water may wash the cooking container 100 clean, and then drop into the sink 106 which is underneath the cooking container 100.

The cleaning apparatus 402 of the cooking sub-system 170 may also clean the cooking container 100 in six steps, as follows.

Step 1, the unloading motion mechanism in the cooking apparatus 120 (which is part of the cooking sub-system 170) moves the support component 169 (of the stirring motion mechanism) to the first end position relative to the support component 156, so that the cooking container 100 is positioned upright.

Step 2, the support component 431 of the cleaning apparatus 402 is rotated to and braked at the first end position relative to the support component 436 of the cleaning apparatus 402, and the cooking container 100 is moved by the stirring motion mechanism to a certain position. The seal 437 of the cleaning apparatus 402 is configured to press on the top edge of the cooking container 100, so that the water in the cooking container 100 could not flow through the space between the top edge of the cooking container 100 and the cover 423. It should be noted that the cooking container 100 in the above position should be best rotationally symmetric around the axis of the rotational motion mechanism 426.

Step 3, the cleaning apparatus 402 dispenses clean water (often heated) into the cooking container 100 from the liquid source 455 through the pipes.

Step 4, the stirrers 421 of the cleaning apparatus 402 are fast rotated by the motion mechanism of the cleaning apparatus, as to stir the water in the cooking container 100 to wash the inner surface of the cooking container 100. During this step, the water could not flow to the outside of the cooking container 100 under the sealing of the seal 437.

Step 5, the support component 431 is rotated to the second end position and be braked.

Step 6, the unloading motion mechanism of the cooking apparatus 120 moves the support component 169 to the second end position relative to the support component 156, so that the axis of the cooking container 100 is turned, and the wastewater in the cooking container 100 may be dumped into the sink 106 of the receiving apparatus 660 as explained before.

The cooking sub-system 170 further comprises a liquid dispensing apparatus 403 (as in FIG. 6B). The support component 463 of the liquid dispensing apparatus 403 is configured to rigidly connect to the support component 156 of the cooking apparatus 120 (the rigid connection is not shown in figure, but it is elementary to construct it, e.g., by mounting the support component 156 and the support component 463 rigidly on the ground). When the connector 462 is rotated to the first end position relative to the support component 463, and when the cooking container 100 of the cooking apparatus 120 is rotated to the first end position relative to the support component 156 of the cooking apparatus 120, the top edge of the cooking container 100 is configured to be on a horizontal plane. When the connector 462 is rotated to the first end position relative to the support component 463 (in the back-and-forth rotation produced by the rotational motion mechanism 464), the open end of the pipes 411 of the liquid dispensing apparatus 403 is to be positioned above the cooking container 100 when the cooking container 100 is at the upright position, so that the liquid dispensing apparatus 403 can dispense the liquid into the cooking container 100. The liquid dispensing sub-mechanism 401 of the liquid dispensing apparatus 403 is used to dispense a plurality of liquid ingredients into the cooking container 100 of a cooking apparatus 120 when the connector 462 is at the first end-position and the cooking container 100 is at the upright position. When the connector 462 is rotated to the second end-position, the connector 462 is rotated by an angle, away from the cooking container 100. The angular degree between the first end-position and the second end-position may be about 90 degrees, although this is not a strict requirement.

The cooking sub-system 170 further comprises an ingredient dispensing apparatus 910 (as in FIG. 10). The support component 951 of the ingredient dispensing apparatus 910 is rigidly connected to the support component 156 of the cooking apparatus 120 (though the connection is not shown in figure; it is quite elementary to build the connection). As explained before, the ingredient dispensing apparatus 910 is configured to grip and then rotate an ingredient container (of several sizes), e.g. an ingredient container 111, while rotating the support component 924 of the container gripping mechanism 905 between a first end position and a second end position relative to the support component 951.

Before the start of a cooking process of a food using food ingredients from an ingredient container, the support component 431 of the cleaning apparatus 402 needs to be rotated to the second end position relative to the support component 436, and the support component 169 of the cooking apparatus 120 needs to be rotated to the first end position relative to the support component 156 of the cooking apparatus 120. Next, the connector 462 of the liquid dispensing apparatus 403 is rotated to the second end position relative to the support component 463 of the liquid dispensing apparatus 403. Then, the support component 924 of the container gripping mechanism 905 (of the ingredient dispensing apparatus 910) may be rotated from the first end position to the second end position relative to the support component 951 of the ingredient dispensing apparatus 910, and the gripped ingredient container, if any, is rotated together with the support component 924, and the food or food ingredients contained in the gripped ingredient container are configured to be dispensed into the cooking container 100. The cooking container 100 of the cooking apparatus 120 is at an upright position during the process.

It should be further noted that braking mechanism 103 may be used to reduce vibrations (or other non-rigid motions, errors or allowances) of the support component 169, and to enhance the stability of the support component 169, when the support component 169 is at the first end position relative to the support component 156, and when the stirring motion mechanism produces a motion of the cooking container 100 as to stir, mix or distribute the food or food ingredients held in the cooking container 100.

In the cooking sub-system 170, after a food in the cooking container 100 of the cooking apparatus 120 is cooked, the connector 462 of the liquid dispensing apparatus 403 is rotated to the second end position relative to the support component 463 of the liquid dispensing apparatus 403. Next, the support component 169 of the cooking apparatus 120 is rotated to the second end position relative to the support component 156, as to dispense the cooked food into a food container 182 gripped by the transfer apparatus 650 of the receiving apparatus 660. Next, the support component 169 of the cooking apparatus 120 is rotated back to the first end position relative to the support component 156, so the cooking container 100 is positioned upright. Next, the support component 431 of the cleaning apparatus 402 is rotated to the first end position relative to the support component 436 of the cleaning apparatus 402, so that the cleaning apparatus may pour water into the cooking container 100 and clean the cooking container 100. Next, the support component 431 is rotated back to the second end position. Meanwhile, the transfer apparatus 650 of the receiving apparatus 660 transfers the food container 182 containing the food to other apparatus so that there are no other components above the sink 106. Next, the support component 169 is rotated to the second end position relative to the support component 156, as to unload the wastewater in the cooking container 100 to the sink 106. Then, the support component 169 is rotated back to the first end position relative to the support component 156.

The support component 156 of the cooking apparatus 120 may be referred to as a support component of the cooking sub-system 170.

Figure 14A:
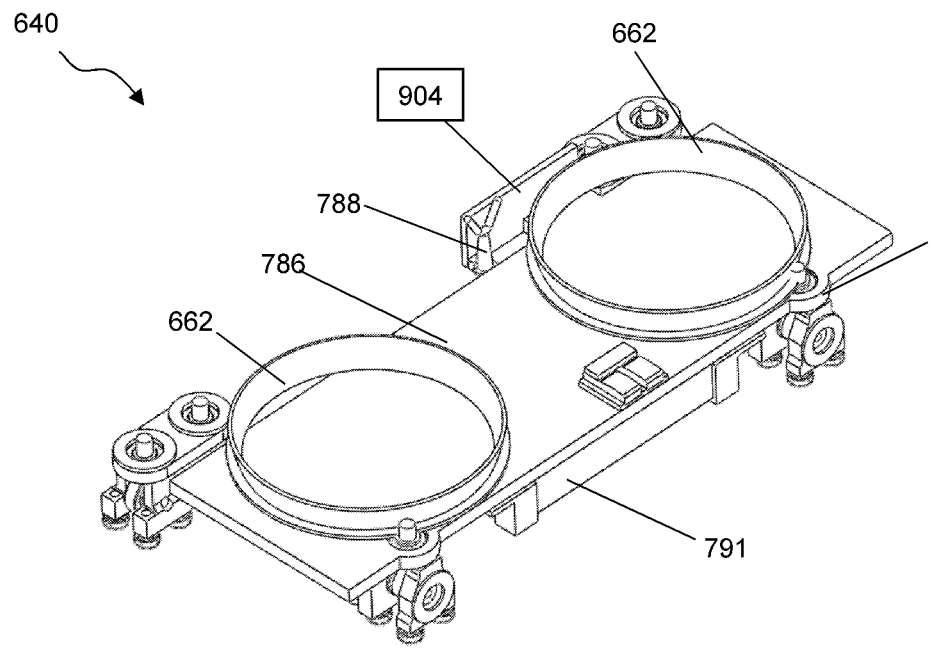
FIG. 14A show an aerial view of a vehicle.
Figure 14B:
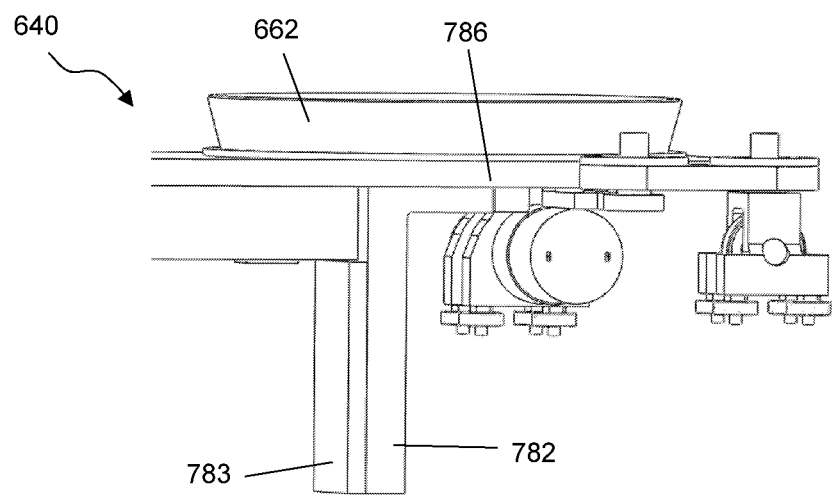
FIG. 14B shows an aerial view of a part of the vehicle.

Referring to FIGS. 14A-14B, a vehicle 640 comprises: a support component 786 as a main frame; a computer 904; a plurality of wheels; motors which drives the rotations of some of the wheels; a rechargeable battery 791; etc. The vehicle 640 further comprises: a rigid connector 782 comprising a vertical part and horizontal part; a magnet 783 configured to fixedly mounted on the vertical part of the rigid connector 782. The horizontal part of the rigid connector 782 is rigidly connected to the support component 786.

The vehicle 640 further comprises: container holders 662 each comprising a solid shape configured to position or hold a food container 182. The container holders 662 are fixedly connected to the support component 786. Each container holder 662 on a vehicle 640 may hold a food container 182 so that the movement of said food container may be restricted or limited when the vehicle 640 is moving. Thus, the vehicle 640 may carry and transport one or more food containers.

It should be noted that the vehicle 640 may move on a pair of curved rail tracks whose widths are smaller than the widths of straight rail tracks. The vehicle 640 can carry and transport a plurality of food containers. When the vehicle 640 moves, then the vehicle 640 can transport the food containers held by the container holders of the vehicle 640.

The container holders 662 are also referred to as holders. It should be noted that a container holder 662 in the vehicle 790 may be substituted by a solid shape which can position or hold a food container.

Figure 14C:
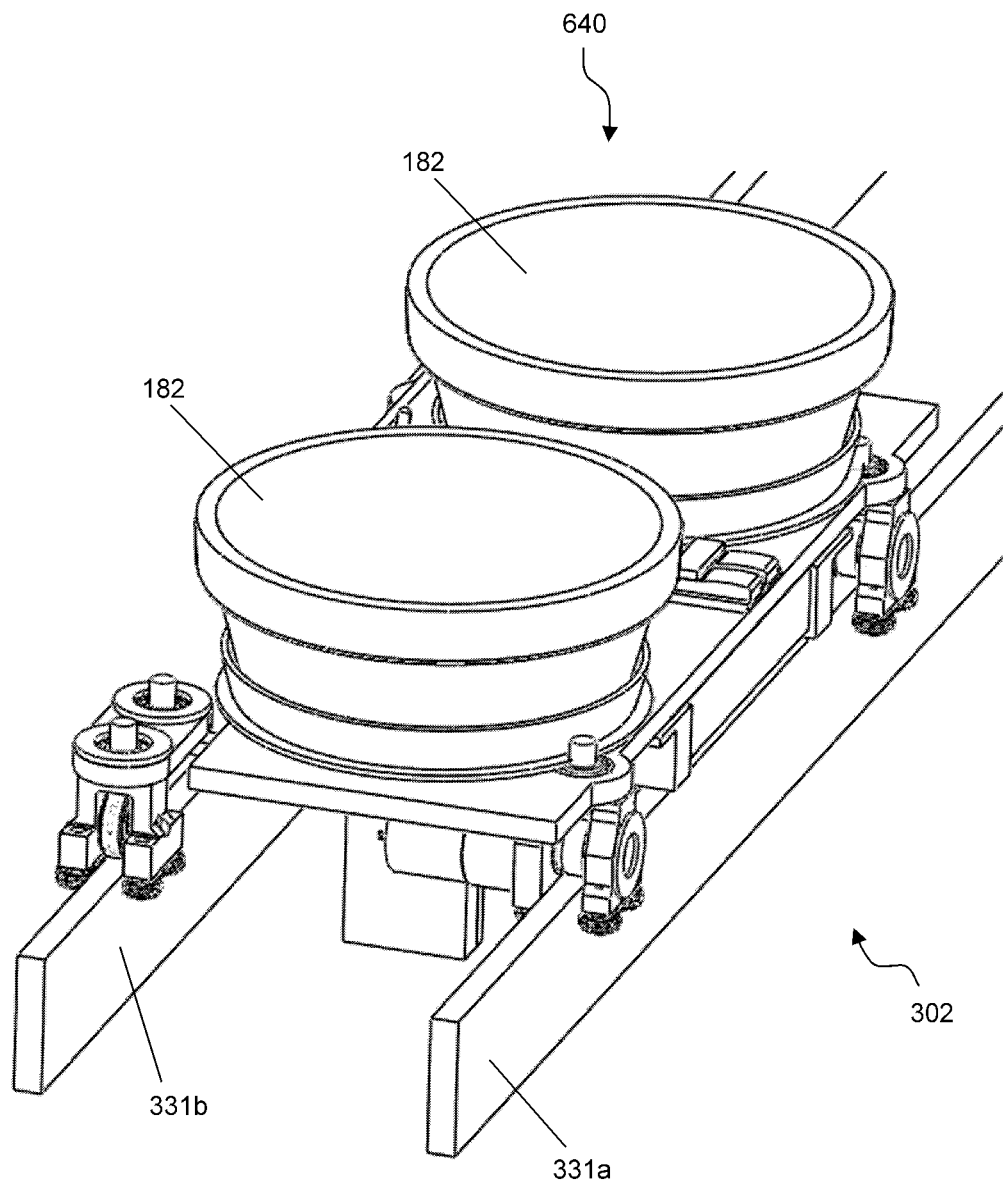
FIG. 14C shows an aerial view of a transport system which includes vehicle on tracks.

Referring to FIG. 14C, a food container transport system 302 comprises a track comprising pairs of rail tracks 331a and 331b and a plurality of vehicles 640. The rail tracks 331a and 331b of the food container transport system 302 may be fixedly connected to the ground by known techniques. The vehicle 640 is configured to move on a pair of rail tracks 331a and 331b. Some of the wheels are configured to move on and touch the top surface of the rail track 331a. Some other wheels may move on and touch the side surface of the rail track 331b. The computer 904 is connected to the computer system 901 via wireless means, and the computer system 901 is configured to control the timing and speed of the vehicles 640.

The vehicles 640 is similar to vehicles described in U.S. patent application Ser. Nos. 16/517,705 and 16/997,933. The entire contents of these applications are hereby incorporated herein.

It should be noted that the vehicle 640 may move on a pair of curved rail tracks. The vehicle 640 can carry and transport a plurality of food containers. When the vehicle 640 moves, then the vehicle 640 can transport the food containers held by the container holders 662 of the vehicle 640. The food container transport system 302 is configured to transfer food containers from station to station.

It should be noted that the vehicles 640 may be substituted by vehicles which are not moved on rails or tracks.

Figure 15A:
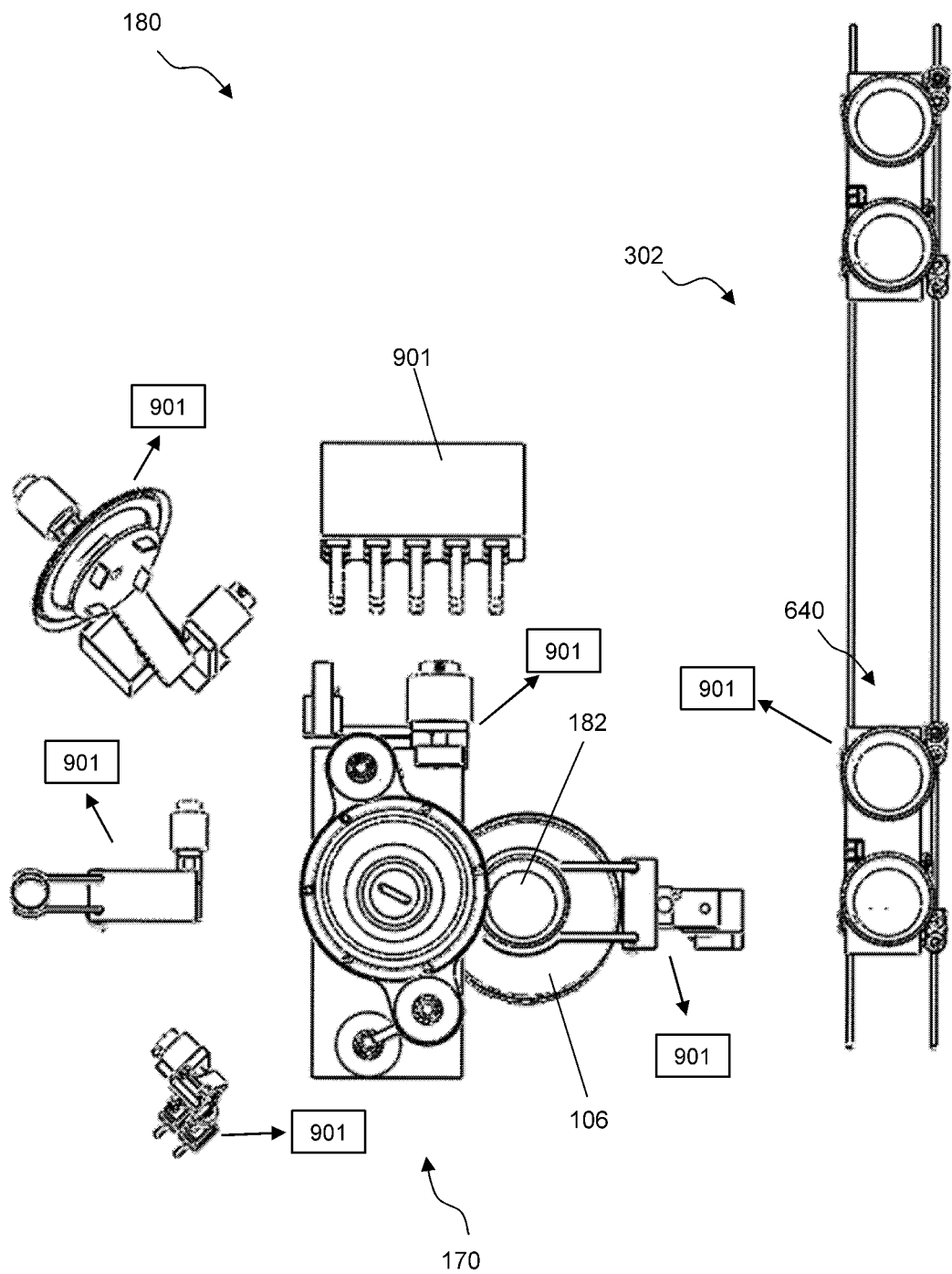
FIG. 15A shows a plane view of our cooking system.
Figure 15B:
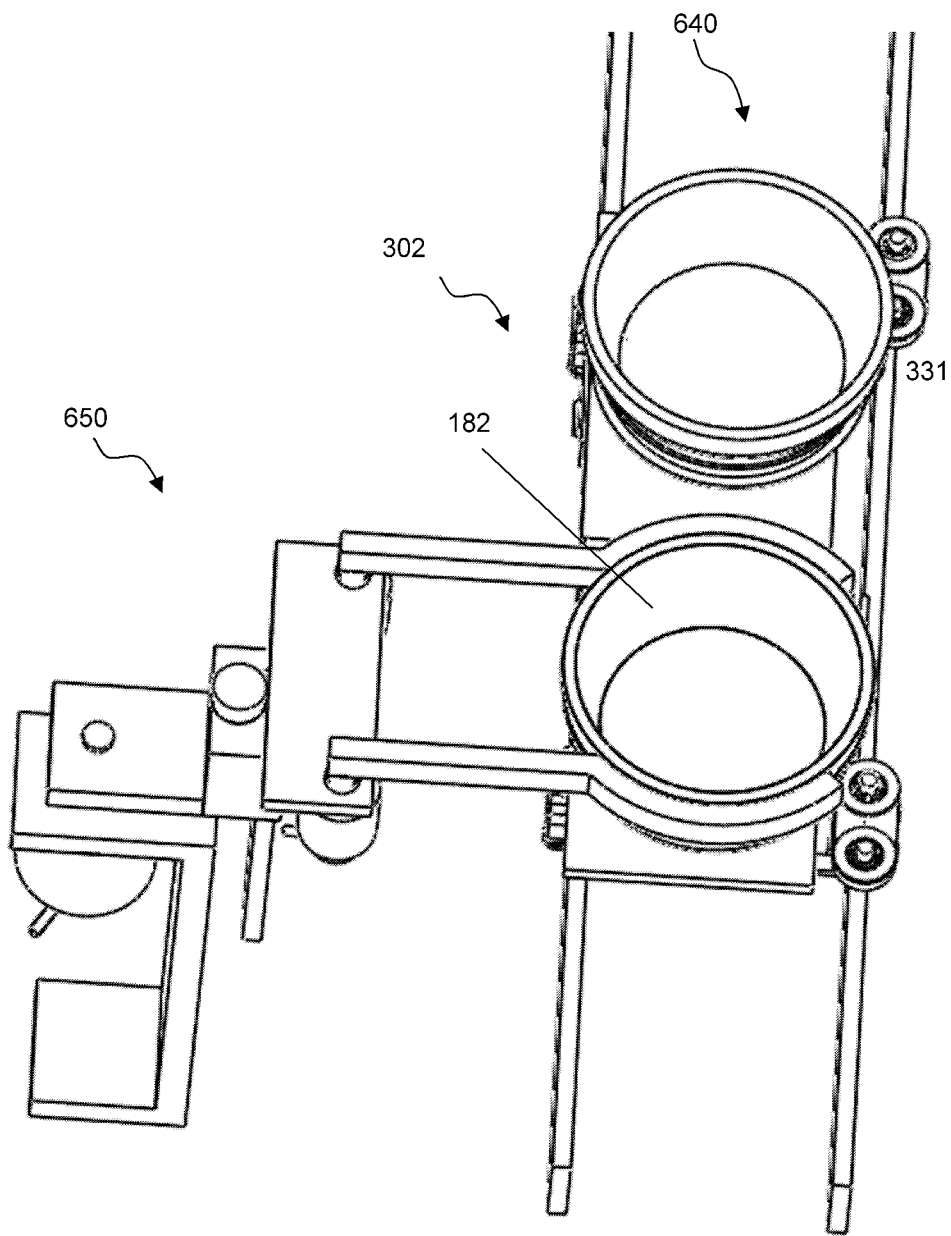
FIG. 15B shows an aerial view of parts of the cooking system.

In some embodiments, referring to FIGS. 15A-15B, a cooking system 180 comprises the cooking sub-system 170 and the food container transport system 302. The rail tracks 331a and 331b of the food container transport system 302 are configured to be rigidly connected to the support component 156 of the cooking sub-system 170 (the connections are not shown in figures but can be easily done; for example, the rail tracks 331a and 331b and the support component 156 may be fixedly connected to the ground).

As explained earlier, a cooked food in the cooking container 100 of the cooking system 180 may be dispensed into a food container 182 gripped by the transfer apparatus 650 of the receiving apparatus 660. Then, the transfer apparatus 650 may transfer the food container 180 to a container holder 662 of a vehicle 640 of the food container transport system 302. The vehicle 640 of the food container transport system 302 may transport the food container 182 to an area accessible by another transfer or transport apparatus, or accessible by a human.

The cooking system 180 further comprises the computer system 901 (as seen in FIG. 1). Some i/o ports of the computer system 901 are connected to the electrical or electronic devices, which can be encoders, pressure sensors, proximity switches, micro switches, infrared sensors, temperature sensors, etc., in the various apparatuses of the cooking system 180 via wires or by wireless means. Some other i/o ports of the computer system 901 are connected via wires to the electrical or electronic devices, which may comprise motors, stoves, refrigeration apparatus, etc., in the various apparatuses of the cooking system 180. In other words, the computer system 901 is configured to control the functions of apparatus of the cooking system 180 as to cook a food by sending signals to the electrical or electronic devices. The computer system 901 may control the electrical or electronic devices and may also record the signals of the electrical or electronic devices at designated times.

In the cooking system 180, the transfer apparatus 650 of the receiving apparatus 660 may be substituted by the transport apparatus 630 or 620 (as shown in FIG. 12C or respectively 12D). In fact, the receiving apparatus 660 may be substituted by any solid which is fixedly connected to the ground or to a support component, provided that the solid is made of a material with the shape which can position or hold a specific food container. The shape of such said solid depends on the shape of the food container. The structural requirement for such said solid is known to any experts of structural engineering. For example, a dining table (or a device with a horizontal upper surface) may position or hold a food container such as food plate or bowl.

More transport systems are described in U.S. patent application Ser. No. 16/997,196. The entire content of the application is hereby incorporated herein. Moreover, any other type of transport system may substitute the transport system 302 for our applications.

Note that the cooking system may be combined with the storage system 560 of FIGS. 20A-24 of U.S. patent application Ser. No. 16/517,705 and similar storage system disclosed of U.S. patent application Ser. No. 16/997,933. The entire contents of these application are incorporated herein by reference.

It should be noted that a LINUX (or other) server (or workstation) equipped with a MySQL (or other) database (and/or a web server with access to the database), may be used to communicate with and control the computer system 901, The recipes may be stored in the database, and a new order may also be input into the database. A program in the server may read the database in every time interval (of duration of some milliseconds), and once a new order is read, the program then schedules the dishes in the order to be cooked at the plurality of cooking apparatus. The server then sends instructions (per recipes stored in the database) to microcontrollers which in turn control the various motors, and/or heaters, and/or other devices. On the other hand, the readings of sensors sent to the computer system 901 may be further communicated to the server, and a program may monitor the information for any possible malfunction. In addition, the information may possibly be used in the control of the various devices as mentioned above.

A motor in the present patent application may be an AC or DC motor, stepper motor, servo motor, inverter motor, pneumatic or hydraulic motor, etc. A motor may optionally further comprise a speed reducer, encoder, and/or proximity sensor.

While this document contains many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination.

A rigid component described in the present patent application can be any type of solid component which has some degree of rigidity in an application, and there is no strict or quantitative requirement for the degree of rigidity. It should be noted that there is no perfect rigid component in our world, as there are always elastic, thermal, and other deformations in any physical subject. A rigid component may comprise one or more of the following: a bar, a tube, a beam, a plate, a board, a frame, a structure, a bearing housing, a shaft. A rigid component can be made by metal such as steel or aluminum, or a mixture of metals, an alloy, a reasonably rigid plastic, a wood, or by other materials, or by a combination of different types of materials.

Similarly, a rigid connection of two or more components can be a connection which has some degree of rigidity in an application, and there is no strict quantitative requirement for the degree of rigidity. A rigid connection may be a welding of two or more metal components. A rigid connection may be a bolting of two or more components; and so on. Clearly, a typical connection of a shaft and a bearing housing by a bearing (and accessories), for example, is not a rigid connection, since the shaft can rotate relative to the bearing housing.

Most common bearings are ball bearings and roller bearings. However, a bearing in the present patent application can be of any type.

A support component described in the present patent application can be any type of rigid component. A support component may be moved or fixed relative to the ground.

Only a few examples and implementations are described. Other implementations, variations, modifications and enhancements to the described examples and implementations may be made without deviating from the spirit of the present invention. For example, the term cooking container is used to generally refer to a device for containing or holding food ingredients during cooking. For the purpose of present patent application, a cooking container can be a wok, a pot, a pan, a basket, a bowl, a cookware, a container, a board, a rack, a net, or any object used to contain or otherwise hold food or food ingredients during a cooking process. The cooking also is not limited to any particular ethnic styles. The cooking may include but is not limited to frying (including stir frying), steaming, boiling, roasting, baking, smoking, microwaving, etc. The cooking apparatus may or may not use a heater.

Similarly, a food container, ingredient container, or container, can be a bowl, a plate, a cup, a jar, a bottle, a flat or curved board, a basket, a net, a wok, a pan, or any object used to contain or otherwise hold a food or food ingredients. A container can have a rather arbitrary geometric shape. It is possible that different ingredient containers may have different shapes. It is possible that different food containers may have different shapes. It is possible that different cooking containers may have different shapes. It is possible that different cookware may have different shapes.

A gripper is a device used to touch and grip an object such as a container. A gripper can be a rigid or elastic object as in FIGS. 8A-8E. In this patent application, a gripper may be pneumatic gripper, which is an actuating device that uses compressed air as power to pinch or grip an object. A gripper may be a vacuum chuck.

A gripping mechanism can be any mechanism that can be used to grip an object. A gripping mechanism may comprise a gripper such as a vacuum chuck. A gripping mechanism may alternatively comprise a plurality of rigid or elastic grippers which are moved to grip an object. A gripping mechanism may comprise a robot hand. In fact, any robot hand may be used as a gripping mechanism for our purposes.

A motion mechanism can be any mechanism that can be used to produce a movement of an object, which may be a component of the motion mechanism or an object that is rigidly or fixedly connected to a component of the motion mechanism. A motion mechanism may produce a linear motion of a component. A motion mechanism may produce a rotation of a component. A motion mechanism may comprise a robot arm. A motion mechanism may be a combination motion mechanism comprising a plurality of motion sub-mechanisms. A motion mechanism may comprise: a crank rod mechanism; eccentric motion mechanism; etc. A motion mechanism may comprise one or more the following parts: motor; encoder; shaft; coupling; bearing housing; bearings and accessories; gear and rack; screw rod and screw nut; cylinder; hydraulic cylinder; electromagnet; cam; eccentric shaft; Geneva mechanism, etc. Motion mechanisms can be more complex and the motions produced by a motion mechanism can be a planar motion, a spherical motion, an oscillatory or vibratory motion, see e.g., U.S. patent application Ser. Nos. 16/997,196, 15/706,136 (in this application a motion mechanism may be referred to as a transport mechanism), Ser. Nos. 15/801,923, 15/798,357. The entire contents of these applications are hereby incorporated herein by reference.

It should be noted that the linear motion produced by the linear motion mechanism may be a linear motion between two end-positions or a linear motion with multiple stop positions. Any robot arm may be used as a gripping mechanism for our purposes.

It should be noted that the linear motion produced by the linear motion mechanism may be a linear motion between two end-positions or a linear motion with multiple stop positions. Any robot arm may be used as a motion mechanism for our purposes.

A transfer apparatus can be any apparatus that can be used to transfer an object (such as a container) from one position to another. A transfer apparatus may comprise: a gripping mechanism comprising a support component and one or more grippers; and a combination motion mechanism which is a combination of a plurality of motion sub-mechanisms, said combination motion mechanism being configured to move the support component of the gripping mechanism. A transfer apparatus may comprise a robot arm and a gripping mechanism. A robot comprising a combination of a robot arm and a robot hand may be used as a transfer apparatus for our purposes.

An ingredient dispensing apparatus can be any apparatus that can be used to dispense food or food ingredients from an ingredient container into a cooking container. A typical dispensing apparatus of food or food ingredients may comprise: a gripping mechanism configured to grip an ingredient container, and a motion mechanism configured to move a (support) component of gripping mechanism. More examples in U.S. Pat. No. 10,455,987 and U.S. patent application Ser. No. 15/798,357. In particular, a robot comprising a robot hand and robot arm may be used as an ingredient dispensing apparatus. This is often used in prior art.

A food dispensing apparatus can be any apparatus that can be used to dispense a cooked (or semi-cooked) food from a cookware into another container. A food dispensing apparatus may comprise a motion mechanism which moves the cookware. A food dispensing apparatus may alternatively comprise a robotic apparatus comprising a robot arm and robot hand that moves the cookware, and this is often the case when the cookware is not fixedly connected to another motion mechanism.

There is a difference between transfer apparatus and ingredient (or food) dispensing apparatus: a transfer apparatus usually keeps a gripped container in an upright position or nearly vertical, while a dispensing apparatus may turn a gripped container upside down or by some angle of say, 90 to 180 degrees.

Each vertical motion mechanism as described above may be substituted by a motion mechanism which can produce a linear or non-linear motion in an upward or downward direction, wherein an upward direction needs not to be exactly vertical. It can have an inclination angle between 0 and 90 degrees. Same applies to each horizontal motion mechanism described above.

A liquid dispensing apparatus can be any apparatus that can be used to dispense a liquid ingredient from a container into a cooking container. A liquid dispensing apparatus may comprise liquid pipes, a liquid pump, a valve, and/or flow sensors, etc. More examples in U.S. Pat. No. 10,455,987.

A cooking apparatus can be any apparatus comprising a cookware. A cooking apparatus may optionally further comprise a motion mechanism configured to move the cookware. The motion mechanism may optionally comprise a motion sub-mechanism configured to move the cookware as to stir food or food ingredients in the cookware. The motion mechanism may optionally comprise a motion sub-mechanism configured to move the cookware as to dispense a cooked (or semi-cooked) food from the cookware. A cooking apparatus may optionally comprise a transfer apparatus configured to move the cookware. Said transfer apparatus may optionally grip and turn the cookware as to dispense a cooked (or semi-cooked) food from the cookware. Examples of cooking apparatuses are given in U.S. Pat. No. 10,455, 987 and U.S. patent application Ser. Nos. 16/997,196, 15/706,136, 16/155,895, 15/801,923, and 15/869,805, the entire disclosures of which are hereby incorporated herein by reference.

A cleaning apparatus can be any apparatus that can be used to clean an object, e.g., a funnel, or a container such as cooking container, food container, or ingredient container. A cleaning apparatus comprises a liquid source (e.g., tap water, or a water tank) and a liquid pipe to flow the liquid from the source to the object; wherein the liquid flow may be controlled by a valve, a liquid pump, and/or by other known techniques; wherein the liquid may be referred to as a cleaning liquid, such as hot water, for the purpose of cleaning the object. In some applications, the liquid may be sprayed on the object by high speed but this is not a requirement. A cleaning apparatus may optionally further comprise a stirrer which is rotated to stir the cleaning liquid in the object, e.g., a container, which is cleaned by the cleaning apparatus. A cleaning apparatus may optionally comprise a motion mechanism configured to move the water pipes and stirrers away from or towards the object, which is cleaned or respectively to be cleaned by the cleaning apparatus.

A cooking station can be any system comprising a cooking apparatus. A cooking station may optionally comprise an ingredient dispensing apparatus, a liquid dispensing apparatus, and/or a cleaning apparatus. A cooking apparatus by itself may be considered as a cooking station.

A transport system can be any system that can be used to transfer a container (such as, an ingredient container, a food container, or a cooking container). In some applications (but not always), a transport system can move a container after said container is placed on a member of the transport system. For example, a transport system may include a plurality of vehicles each configured to carry and transport a container; wherein the vehicles may optionally move on rail tracks. A transport system may optionally comprise a rotating turntable, or a cyclic motion mechanism, a chain, and/or a belt. Examples of transport system are given in U.S. Pat. No. 10,455,987 and U.S. patent application Ser. Nos. 15/798,357, 16/997,933, and 16/155,895, the entire disclosures of which are hereby incorporated herein by reference. A transport system may only comprise a transfer apparatus.

A container holder is a solid which has an adequate shape as to position or hold a container of a certain shape.

A container transfer apparatus can be any transfer apparatus used to move a container to a (different) member of a transport system. The container transfer apparatus can optionally be a part of said transport system.

A storage apparatus means a storage.

A braking mechanism means a brake. The braking mechanisms disclosed above may be substituted by other types of brakes in the known techniques.

A heater for the purpose of cooking in the known technique may substitute any stove and heater disclosed in the present application.

Control by a computer or computer system of a motor, an actuator, a heater, or electrical or electronic devices are in the known technique.

In our patent application, a computer system may or may not comprise a network. A computer system may be a single computer in some simpler applications.

For the purpose of the present patent application, a connection of a computer (or computer system) and an electric or electronic component may compromise a wired and/or wireless connection between the computer (or computer system) and the electric or electronic device, as to allow the computer to communicate with said electric or electronic component. A connection of a computer (or computer system) and a mechanism or apparatus may comprise a wired and/or wireless connection between the computer (or computer system) and some (or all) of the electric or electronic components of the mechanism or apparatus as to allow the computer to communicate with said electric or electronic components.

What is claimed is:

1. A cooking system comprising:
    a computer;
    a plurality of ingredient containers each configured to store food ingredients;
    a plurality of food containers each configured to contain or hold a cooked food;
    a receiving apparatus comprising a transfer apparatus configured to grip and move one of the plurality of food containers, said transfer apparatus comprising:
        a gripping mechanism comprising support component and one or more grippers, said gripping mechanism being configured to grip the food container; and
        a motion mechanism configured to move the support component of the gripping mechanism, said motion mechanism comprising a motor or other driving mechanism; and
    a cooking apparatus comprising:
        a cooking container configured to contain or otherwise hold food or food ingredients;
        a stirring motion mechanism comprising:
            a support component; and
            a motor or other driving mechanism;
            wherein the stirring motion mechanism is configured to produce a motion of the cooking container relative to the support component as to stir or mix the food or food ingredients held by the cooking container; and
        an unloading motion mechanism comprising a motor, said unloading motion mechanism being configured to move the support component of the stirring motion mechanism and thus move the cooking container as to dispense a cooked food from the cooking container to one of the plurality of food containers which is gripped by the transfer apparatus of the receiving apparatus.

2. The cooking system of claim 1, wherein the receiving apparatus further comprises a sink configured to help dispose wastewater.

3. The cooking system of claim 1, further comprising a pipe configured to flow water to the cooking container for the purpose of cleaning the cooking container.

4. The cooking system of claim 3, further comprising a spray configured to spray water to the cooking container as to clean the cooking container.

5. The cooking system of claim 1, further comprising an ingredient dispensing apparatus configured to move one of the plurality of ingredient containers as to dispense the food ingredients from the ingredient container to the cooking container, said ingredient dispensing apparatus comprising:
    a gripping mechanism comprising a support component and one or more grippers, said gripping mechanism being configured to grip said ingredient container; and
    a motion mechanism configured to move the support component of the gripping mechanism, said motion mechanism comprising a motor or other driving mechanism.

6. The cooking system of claim 5, wherein the gripping mechanism comprises robot figures, wherein the motion mechanism of the ingredient dispensing apparatus comprises a robot arm.

7. The cooking system of claim 1, wherein the unloading motion mechanism is configured to turn the support component of the stirring motion mechanism and turn the cooking container.

8. The cooking system of claim 1, wherein the cooking apparatus further comprises a brake configured to brake the support component of the stirring motion mechanism as to keep the support component from moving.

9. The cooking system of claim 1, further comprises a liquid dispensing apparatus configured to dispense a liquid ingredient to the cooking container.

10. The cooking system of claim 1, wherein the stirring motion mechanism comprises:
    a first rotational mechanism comprising a first rigid component and a second rigid component which is constrained to rotate relative to the first rigid component, wherein the first rigid component is connected to the cooking container;

a second rotational mechanism comprising a first rigid component and a second rigid component which is constrained to rotate relative to the first rigid component;

wherein the first rigid component of the second rotational mechanism is configured to be connected to the second rigid component of the first rotational mechanism;

wherein the motor or other driving mechanism of the stirring motion mechanism is configured to drive the rotation of the first rigid component of the second rotational mechanism relative to the second rigid component of the second rotational mechanism.

11. The cooking system of claim 1, further comprising a transport system configured to move one of the plurality of food containers from the receiving apparatus to a location away from the receiving apparatus.

12. The cooking system of claim 1, further comprising one or more vehicles each configured to move one of the plurality of food containers.

13. The cooking system of claim 12, further comprising rail tracks, wherein said one or more vehicles are configured to move on the rail tracks.

14. The cooking system of claim 1, wherein the computer is configured to store a list of food items and a cooking program for cooking a food item, said program being configured to allow the computer to control the motors of said stirring motion mechanism, said unloading motion mechanism, and said motion mechanism of said transfer apparatus which are connected to the computer.

15. A cooking system comprising:
one or more food containers, each configured to hold a cooked food;
a receiving apparatus comprising:
 a sink configured to receive wastewater from said cooking container of the cooking apparatus;
 a cyclic motion apparatus configured to move one of the one or more food containers, said cyclic motion apparatus comprising:
  one or more container holders, each comprising a solid shape configured to position or hold one of the one or more food containers;
  a motion mechanism comprising a motor or other driving mechanism, said motion mechanism being configured to produce a cyclic motion in the one or more container holders; and
a cooking apparatus comprising:
 a cooking container configured to contain or otherwise hold food or food ingredients;
 a stirring motion mechanism configured to produce a motion of the cooking container to stir or mix the food or food ingredients held by the cooking container, said stirring motion mechanism comprising:
  a support component; and
  a motor or other driving mechanism; and
 an unloading motion mechanism comprising a motor, said unloading motion mechanism being configured to move the support component of the stirring motion mechanism and hence move the cooking container as to dispense a cooked food from the cooking container to one of the one or more food containers while said food container is positioned on or held by one of the one or more container holders of the receiving apparatus.

16. The cooking system of claim 15, further comprising a transfer apparatus configured to move one of the one or more food containers from the cyclic motion apparatus to a location away from the cyclic motion apparatus, said transfer apparatus comprising:
a gripping mechanism comprising a support component and one or more grippers, said gripping mechanism being configured to grip one of the one or more food containers; and
a motion mechanism configured to move the support component of the gripping mechanism, said motion mechanism comprising a motor or other driving mechanism.

17. The cooking system of claim 16, wherein the motion mechanism of the transfer apparatus comprises:
a first motion sub-mechanism comprising a moving member which is connected to the support component of the gripping mechanism, a stationary member, and a motor or driving mechanism configured to move the moving member relative to the stationary member; and
a second motion sub-mechanism comprising a motor or driving mechanism, said second motion sub-mechanism being configured to move the stationary member of the first motion sub-mechanism.

18. A cooking system comprising:
a computer;
a cooking apparatus comprising:
 a cooking container configured to be able to hold food or food ingredients;
 a heater or stove configured to heat the food or food ingredients in the cooking container;
 a stirring motion mechanism configured to move the cooking container as to stir, mix or distribute food or food ingredients contained in the cooking container, said stirring motion mechanism comprising:
  a support component; and
  a motor or other driving mechanism; and
 an unloading motion mechanism configured to move the support component of the stirring motion mechanism and hence move the cooking container to dispense a cooked food from the cooking container into a food container in the receiving apparatus, said unloading motion mechanism comprising a motor or other driving mechanism;
a plurality of ingredient containers, each configured to store food ingredients; and
an ingredient dispensing apparatus configured to grip and move one of the plurality of ingredient containers as to dispense the food ingredients from the ingredient container to the cooking container, said ingredient dispensing apparatus comprising:
 a gripping mechanism comprising a support component and one or more grippers, said gripping mechanism being configured to grip said ingredient container; and
 a motion mechanism configured to move the support component of the gripping mechanism, said motion mechanism comprising a motor or other driving mechanism.

* * * * *